US012637209B2

(12) United States Patent
Shaanan

(10) Patent No.: US 12,637,209 B2
(45) Date of Patent: *May 26, 2026

(54) BLADE PITCH DETECTION FOR AN AERIAL VEHICLE

(71) Applicant: Unmanned Aerospace LLC, La Jolla, CA (US)

(72) Inventor: Gad Shaanan, La Jolla, CA (US)

(73) Assignee: Unmanned Aerospace LLC, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/238,095

(22) Filed: Jun. 13, 2025

(65) Prior Publication Data

US 2026/0125153 A1     May 7, 2026

Related U.S. Application Data

(63) Continuation of application No. 18/811,379, filed on Aug. 21, 2024, now Pat. No. 12,351,301.

(51) Int. Cl.
B64C 27/57          (2006.01)
B64C 27/59          (2006.01)

(52) U.S. Cl.
CPC .............. B64C 27/57 (2013.01); B64C 27/59 (2013.01)

(58) Field of Classification Search
CPC ....... B64C 27/021; B64C 27/57; B64C 27/59; B64C 29/0033; B64C 29/0075; B64C 27/28; B64D 45/0005

(Continued)

(56) References Cited

U.S. PATENT DOCUMENTS 11,661,182 B2 *     5/2023   Shaanan ............. B64C 29/0033
                                                   244/7 A
2004/0245376 A1    12/2004   Muren
                             (Continued)

FOREIGN PATENT DOCUMENTS

CN          118025477 A   *   5/2024   ............. B64C 27/32
CN       118 270 234 A       7/2024
GB         2 388 095 A      11/2003

OTHER PUBLICATIONS

Machine Translation of CN-118025477-A, Wu M, May 14, 2024 (Year: 2024).*

(Continued)

*Primary Examiner* — Richard Green
*Assistant Examiner* — Katherine June Walter
(74) *Attorney, Agent, or Firm* — Knobbe, Martens, Olson & Bear LLP

(57)          ABSTRACT

A blade pitch detection apparatus for an aircraft having a lower rotor hub assembly and an upper rotor hub assembly, the upper rotor hub assembly including a blade pitch adjustment linkage configured to maintain the rotor blades at a first blade pitch while a rotational velocity of the upper rotor hub assembly is below a threshold and to maintain the rotor blades at a second blade pitch while the rotational velocity is above a threshold. The pitch detection apparatus includes a magnet coupled to a component of the blade pitch adjustment linkage and a sensor coupled to a component of the lower rotor hub assembly and configured to generate a signal in the presence of the magnet. Processing circuitry in communication with the sensor can determine whether the plurality of rotor blades are at the first blade pitch or the second blade pitch based on the signals.

14 Claims, 48 Drawing Sheets

(58) Field of Classification Search
USPC .......................................... 73/114.26, 514.31
See application file for complete search history.

(56) References Cited

U.S. PATENT DOCUMENTS

| | | | | |
|---|---|---|---|---|
| 2005/0122095 A1 * | 6/2005 | Dooley | ..................... | G01P 3/49 |
| | | | | 73/514.31 |
| 2018/0370624 A1 * | 12/2018 | Seale | .................. | B64C 29/0033 |
| 2022/0119102 A1 | 4/2022 | Shaanan | | |

OTHER PUBLICATIONS

International Search Report and Written Opinion mailed on Apr. 10, 2025 in PCT Application No. PCT/US2025/013254, in 25 pages.

* cited by examiner

Side-view of one motor at the extreme limits of its tilting angle

Two servos to tilt the motors independently in a continuous linear fashion between 30 degrees backward and 120 degrees forward.

z-axis 150 degrees x-axis (Aircraft nose)

TEETER-TOTTER PIVOT POINT

SYNCHRONIZATION LINKAGES

PIVOT POINT ON SHAFT ALLOWING
ROTOR HEAD TO TEETER-TOTTER

NO PITCH

SHAFT

SYNCHRONIZATION LINKAGES
FOLDED CLOSED

BLADE ANGLE OF
ATTACK AT ZERO

NO PITCH

BLADE ANGLE OF ATTACK AT ZERO

PIVOT POINT ON SHAFT ALLOWING ROTOR HEAD TO TEETER-TOTTER

SHAFT

PITCH

EXTENDED

SYNCHRONIZATION LINKAGES EXTENDED

ROTOR ANGLE OF ATTACK GREATER THAN ZERO

PITCH

EXTENDED

ROTOR ANGLE OF ATTACK
GREATER THAN ZERO

ROTOR ORIENTATION TRACK

ARM 2

SYNCHRONIZATION LINKAGES

ARM 1

SYNCHRONIZATION LINKAGES

A

SYNCHRONIZATION LINKAGES

INNER CYLINDER

GAS SPRING

OUTER CYLINDER

ARM APERTURE

BLADE LOCK MECHANISM

BLADE

DETAIL A
ROTOR ORIENTATION TRACK

PIVOT POINT ON SHAFT ALLOWING ROTOR HEAD TO TEETER-TOTTER

SMALL GEAR

MOTOR

SHAFT

LARGE GEAR WITH ONE-WAY BEARING

BLADE

DISK BRAKE

SERVO

CALIPER

100

310

136r

136l

150

150

100

136r

136l

BLADE PITCH DETECTION FOR AN AERIAL VEHICLE

CROSS-REFERENCE TO RELATED APPLICATIONS

This application is a continuation of U.S. application Ser. No. 18/811,379, filed Aug. 21, 2024, titled "BLADE PITCH DETECTION FOR AN AERIAL VEHICLE," which is incorporated by reference in its entirety.

FIELD

The present disclosure relates generally to manned or unmanned aircraft, and more particularly to aircraft capable of vertical and horizontal flight.

BACKGROUND

A helicopter is an aircraft in which lift and thrust are supplied by one or more horizontal rotors. The advantages of a helicopter include its ability to hover and to take off and land vertically. However, among other things, a helicopter suffers from its relatively poor operating energy efficiency compared to fixed-wing aircraft.

A gyroplane (also known as a gyrocopter or autogyro) is an aircraft that uses an unpowered rotor in autorotation to develop lift. Autorotation is a rotor state in which the rotor derives from the freestream 100% of the power required to rotate it, and the resulting rotation provides lift. In a gyrocopter, forward thrust is typically provided by an engine-driven propeller. However, like a fixed-wing aircraft, a gyrocopter cannot take off and land vertically.

In the case of a gyroplane, as the aircraft goes down the runway and gathers speed, the overhead rotor's shaft is tilted backwards allowing the wind to blow though the rotor in order to start turning. As the rotor reaches a certain RPM, that very rotor becomes a "virtual wing" for the gyrocopter providing lift. Once it reaches the desired RPM, the gyrocopter is ready for takeoff. As the gyrocopter gains speed in the air the angle of attack of the rotor head (virtual wing) is reduced by moving the shaft forward, increasing speed and reducing drag. A gyrocopter does not have the ability to achieve vertical takeoff because it does not have a variable pitch rotor. The pitch of the blades of a gyrocopter is typically zero. In addition to being able to tilt the shaft forwards and backwards, a gyrocopter can also tilt the shaft/rotor head to starboard and port, providing aileron like maneuverability. Also, for a gyrocopter to fly in a stable manner, it has a unique rotor head assembly that can teeter totter on the shaft allowing the blades freedom of movement as they rotate.

A helicopter has a fixed vertical shaft with swash plates and links to the rotor head, allowing the pilot to modify the pitch of the rotor blades, generating lift. Further, it has a propeller mounted vertically at the end of a boom (or a ducted fan), creating a thrust to counter the torque generated by the motor that drives the rotor head.

In the case of a helicopter the blades drive the air from the top downwards creating thrust and lift. In the case of a gyrocopter the air flows through the blades upwards spinning them and creating lift.

SUMMARY

In a first aspect, an aircraft includes a rotor assembly having a lower rotor hub assembly and an upper rotor hub assembly rotatably coupled to the lower rotor hub assembly, and a blade pitch detection apparatus. The upper rotor hub assembly includes a central section and a blade pitch adjustment linkage coupling a plurality of rotor blades to opposite ends of the central section, the blade pitch adjustment linkage configured to maintain the plurality of rotor blades at a first blade pitch while a rotational velocity of the upper rotor hub assembly is slower than a first rotational velocity threshold and to maintain the plurality of rotor blades at a second blade pitch while the rotational velocity of the upper rotor hub assembly is faster than a second rotational velocity threshold. The blade pitch detection apparatus includes a magnet coupled to a component of the blade pitch adjustment linkage, a sensor coupled to a component of the lower rotor hub assembly and configured to generate a signal in the presence of the magnet, and processing circuitry in communication with the sensor and configured to determine whether the plurality of rotor blades are at the first blade pitch or the second blade pitch based on signals received from the sensor.

In some embodiments, the sensor includes a hall effect sensor.

In some embodiments, the component of the blade pitch adjustment linkage is a movable component that has a first orientation while the plurality of rotor blades are at the first blade pitch and a second orientation while the plurality of rotor blades are at the second blade pitch.

In some embodiments, the movable component is a synchronization pivot arm configured to at least partially synchronize individual blade pitches of the plurality of rotor blades.

In some embodiments, in the first orientation, the magnet repeatedly triggers the sensor to generate the signal while the upper rotor hub assembly is rotating; and in the second orientation, the magnet does not trigger the sensor while the upper rotor hub assembly is rotating.

In some embodiments, the processing circuitry is further configured to determine a rotational speed of the upper rotor hub assembly, based on the signals, while the blade pitch adjustment linkage is in the first orientation.

In some embodiments, the processing circuitry is further configured to determine, based on the determined rotational speed, a pitch transition rotational speed at which the blade pitch begins to transition from the first blade pitch to the second blade pitch.

In some embodiments, the processing circuitry is further configured to determine an operational status of a biasing element of the blade pitch adjustment linkage by comparing the pitch transition rotational speed to an intended transition speed, a range of intended transition speeds, or one or more previously determined pitch transitional rotational speeds.

In some embodiments, the aircraft further includes a rotational speed detection apparatus including a second magnet coupled to a component of the upper rotor hub assembly and a second sensor in communication with the processing circuitry, the second sensor coupled to a component of the lower rotor hub assembly and configured to generate a second signal in the presence of the second magnet.

In some embodiments, the component of the upper rotor hub assembly is fixed relative to the upper rotor hub assembly.

In some embodiments, the second magnet repeatedly triggers the sensor to generate the second signal while the upper rotor hub assembly is rotating and while the plurality of rotor blades are at either the first blade pitch or the second blade pitch.

In some embodiments, the processing circuitry is configured to determine that the plurality of rotor blades are at the first blade pitch in response to a similarity between a first rotational speed calculated based on the signals from the sensor and a second rotational speed calculated based on the second signals from the second sensor.

In some embodiments, the processing circuitry is configured to determine that the plurality of rotor blades are at the second blade pitch in response to a discrepancy between a first rotational speed calculated based on the signals from the sensor and a second rotational speed calculated based on the second signals from the second sensor.

In some embodiments, the processing circuitry is configured to determine that the plurality of rotor blades are at the first blade pitch in response to repeatedly receiving the signals from the sensor.

In some embodiments, the processing circuitry is configured to determine that the plurality of rotor blades are at the second blade pitch in response to failing to receive at least a threshold number of signals from the sensor over a predetermined time period.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

DETAILED DESCRIPTION

Figure 1:
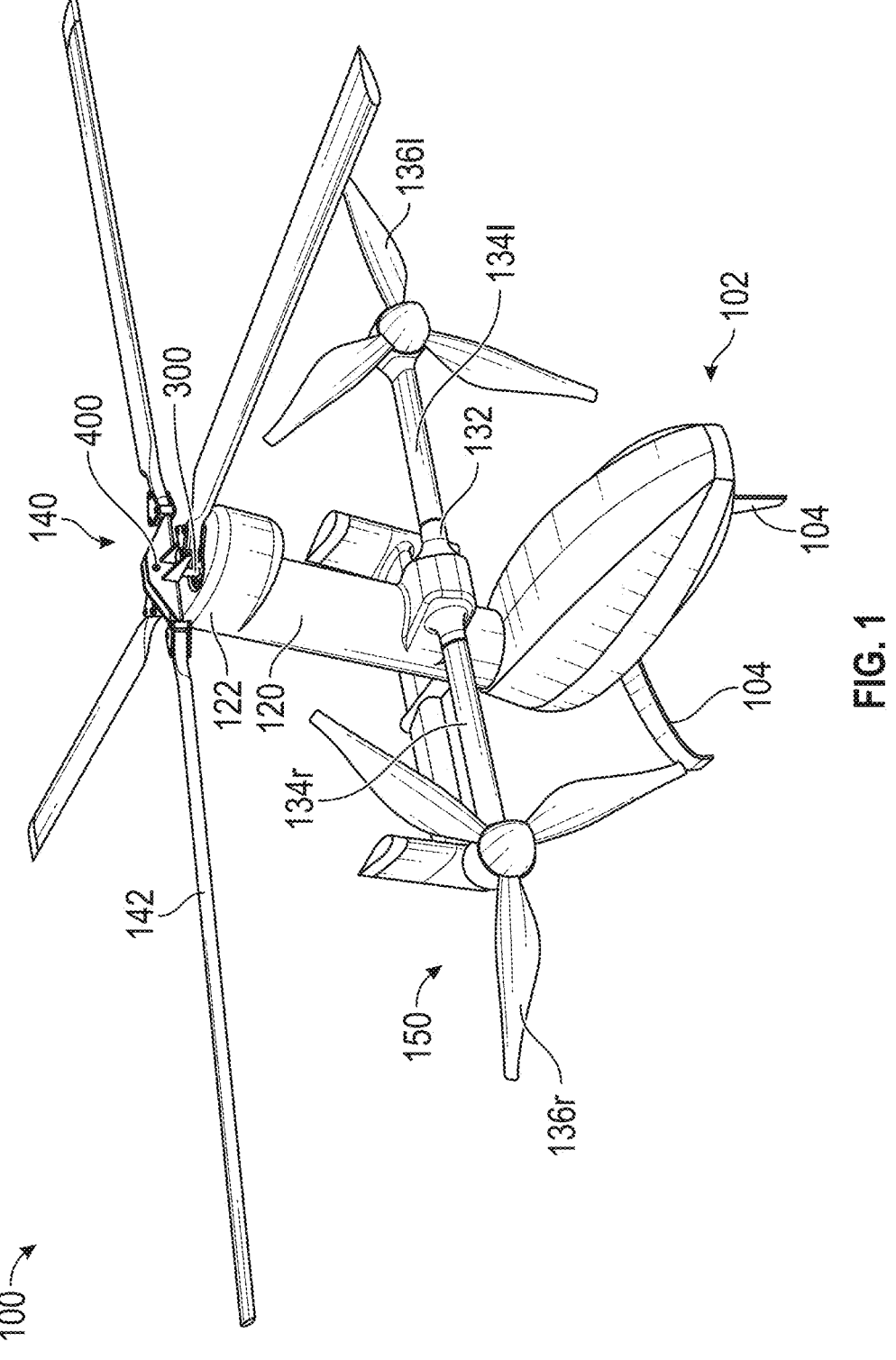
FIG. 1 depicts an isometric view of an aircraft in accordance with an example embodiment of the present technology.

Generally described, embodiments of the present disclosure provide aircraft as well as aircraft systems, components, and control methods providing enhanced flight characteristics relative to existing helicopters, gyroplanes, fixed-wing airplanes, and tiltrotor aircraft. Aircraft disclosed herein may be capable of efficient forward flight, hovering, and/or vertical takeoff and landing (VTOL), as well as transitioning between flight modes in flight. For example, an aircraft in accordance with the present technology may be able to take off vertically from a deployment location, transition to a forward flight mode for generally horizontal flight to a remote location, transition to a vertical flight mode to hover at the remote location for an extended time period, transition to the forward flight mode for generally horizontal flight to a landing location (e.g., the deployment location), and transition again to the vertical flight mode to land at the landing location. Thus, the present disclosure provides aerial vehicles capable of extended data gathering or observation at a relatively distant location beyond the range of a traditional helicopter, without requiring a runway for takeoff and landing.

Some aircraft described herein are further configured to be partially disassembled and may include foldable components to provide a more compact configuration for transportation to or from deployment locations. In one example, a central rotor of the aircraft may include one or more pairs of blades attached to an upper rotor hub assembly. The upper rotor hub assembly may be detachable from a lower rotor hub of the aircraft, and may permit the rotor blades to be folded into a substantially parallel configuration such that the central rotor may be transported in a container approximately the same length as an individual rotor blade, without requiring the rotor blades to be individually separated from the upper rotor hub assembly. When the aircraft is to be deployed again, the central rotor may be conveniently unfolded and attached to the lower rotor hub without requiring additional calibration, alignment, and the like.

Additional benefits of embodiments of aircraft described herein may further include the ability to efficiently and accurately monitor the rotational speed and the pitch angle of rotor blades of an aircraft during flight. For example, an aircraft in accordance with the present disclosure may be able to use one or more proximity sensors such as hall effect sensors and magnets coupled to components of the aircraft that are otherwise still integral to the aircraft, to track the rotational speed and pitch status of the rotor blades with precision. In addition, the sensors may be configured such that a single sensor can detect both a rotational speed and a blade pitch status of the rotor. In some cases, the sensors may further be configured for detection of the exact or approximate rotational speed of the rotor at which a blade pitch transition occurs. Thus, the present disclosure provides aerial vehicles capable of tracking key functional and operational data of the aircraft without added complexity.

FIGS. 1-4 illustrate an example aircraft 100 configured for in-flight transition between vertical and horizontal flight modes. The aircraft 100 includes a fuselage 102, a mast 120 extending generally upward from the fuselage 102, and an empennage 150 disposed aft of the fuselage 102. A tiltable central rotor 140 is rotatably coupled at an upper end of the mast 120. Tiltably mounted proprotors 136l, 136r are rotatably coupled at opposing ends of a boom 132 extending laterally from the mast 120.

The fuselage 102 is a body section of the aircraft 100 and may include an interior volume sized and shaped to hold a payload. For example, the interior volume of the fuselage 102 may be used to contain one or more items being transported by the aircraft 100. In some embodiments, the fuselage 102 may contain one or more reconnaissance or surveillance devices, such as imaging devices (e.g., a visible light camera, infrared camera, thermal camera, still camera, video camera, synthetic-aperture radar, etc.), listening devices, communications devices, or the like. The fuselage 102 may further contain at least some of the control systems for the aircraft 100, such as motor, control surface, or tilt servo controllers, autopilot systems, and the like. For example, in some embodiments, an autopilot system may be connected to proprotor speed and tilt control circuitry such that the autopilot can directly control the speed, direction of rotation, and/or tilt of the proprotors 136l, 136r as pitch, roll, and/or yaw control devices. If the aircraft 100 is configured for operation as a remotely piloted unmanned aerial vehicle (UAV) or drone, the fuselage 102 may also include a communication system to receive control commands from a remote pilot. An undercarriage 104 may be disposed on a side or bottom portion of the fuselage 102 for use during takeoff and landing phases of flight, and may include wheeled landing gear, skids, and/or any other suitable type of undercarriage. The fuselage 102 and the undercarriage 104 may comprise any suitably rigid or semi-rigid materials such as metal, plastic, carbon fiber, wood, fiberglass, etc.

Figure 2:
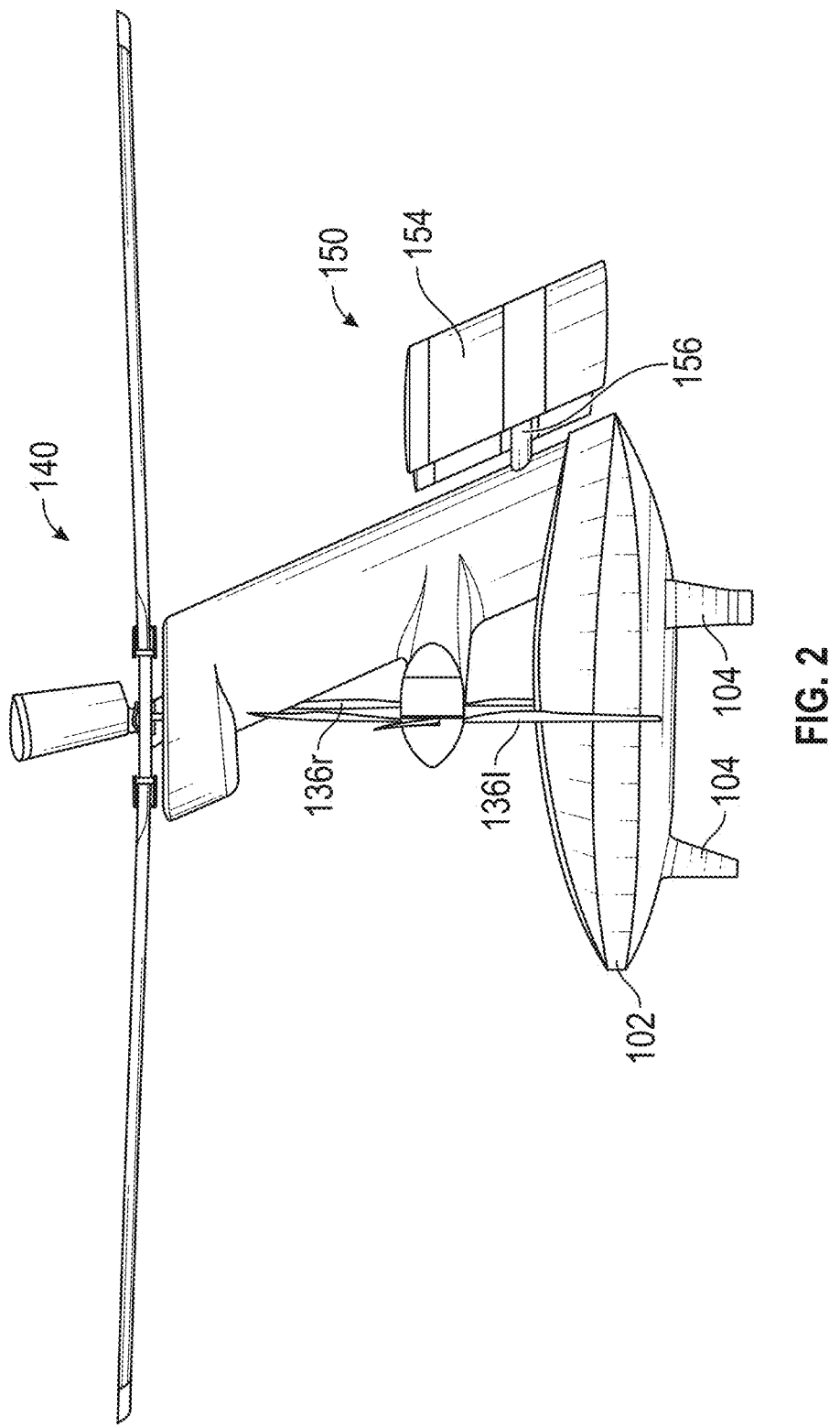
FIG. 2 depicts a side view of the aircraft of FIG. 1.
Figure 3:
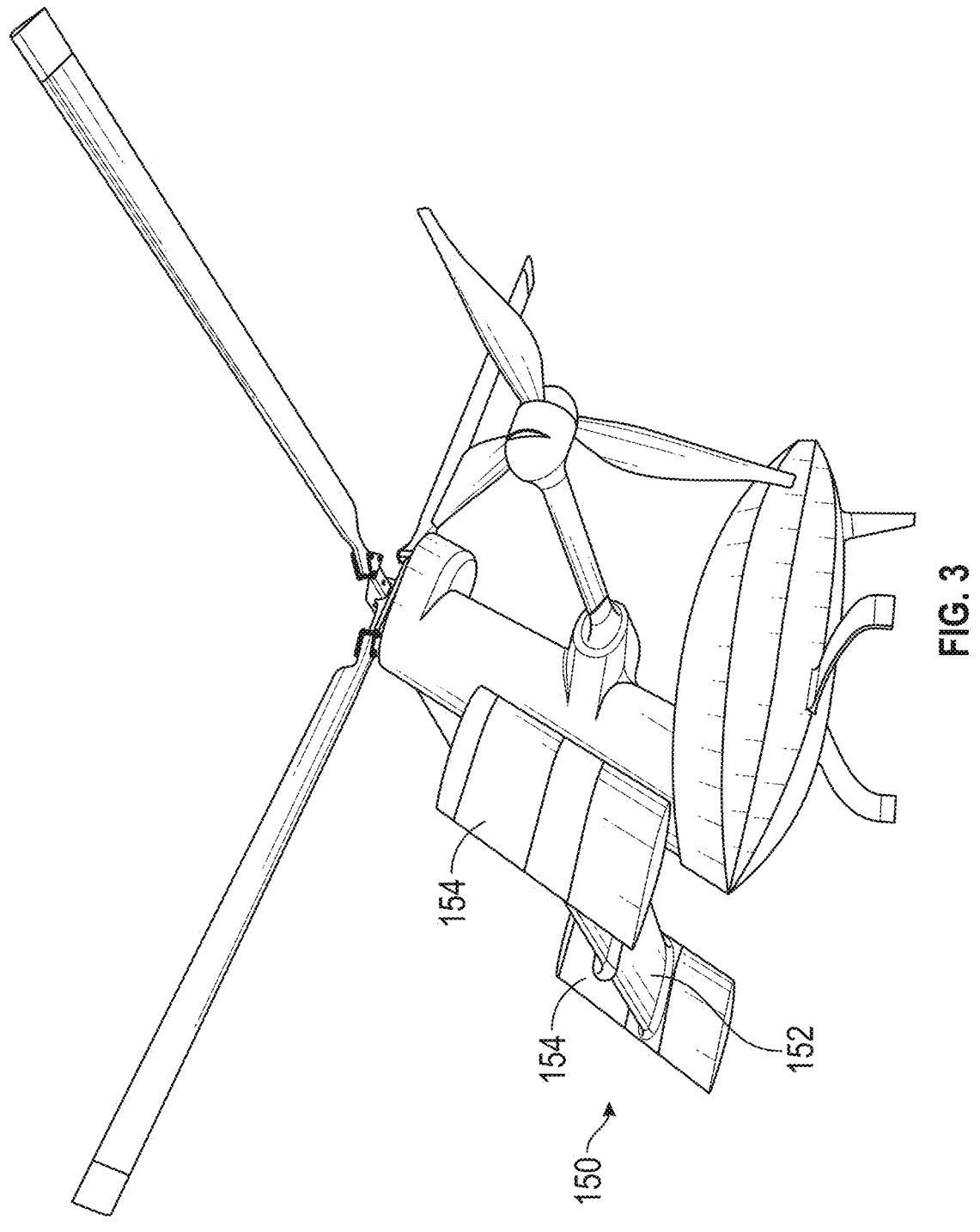
FIG. 3 depicts a rear isometric view of the aircraft of FIGS. 1 and 2.
Figure 4:
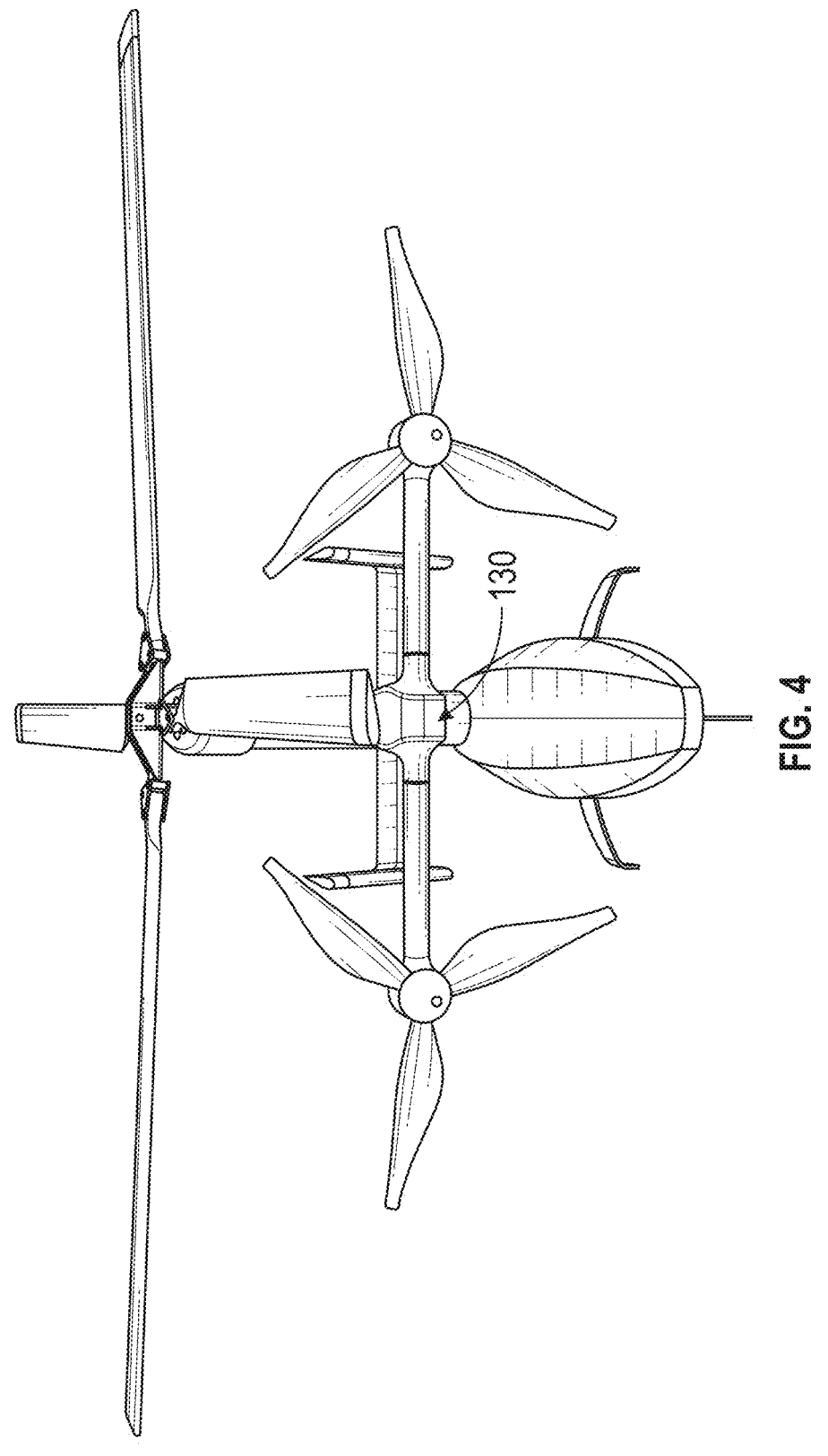
FIG. 4 depicts a top front view of the aircraft of FIGS. 1-3.

The mast 120 extends generally upward from the fuselage 102 and supports the central rotor 140 disposed at an upper end of the mast 120. In some embodiments, such as in the embodiment illustrated in FIGS. 1-4, the mast also includes a forward tilt such that the mast extends upward at a forward angle from the fuselage 102. As shown in FIG. 2, the forward tilt of the mast 120 may advantageously allow the rotational axis of the central rotor 140 to align with the center of gravity of the fuselage 102. In addition, when the proprotors 136l, 136r are tilted upward for vertical/hover flight, the central rotor 140, the longitudinal location of the proprotors 136l, 136r, and the center of gravity of the fuselage 102 are all aligned with a common center of gravity for improved stability in hover or vertical flight. The mast 120 may also serve as a central attachment point for other components of the aircraft 100, including the boom 132, empennage 150, and lower rotor hub 300. The mast 120 may further include an interior volume in which one or more aircraft components may be disposed. In some embodiments, energy storage media such as batteries, hydrogen storage, or the like, may be contained within the mast 120. Placement of batteries or hydrogen storage within the mast 120 may advantageously keep such relatively heavy components close to the center of gravity of the aircraft 100, resulting in improved stability.

The central rotor 140 is rotatably mounted to a top portion of the shaft 120 via a lower rotor hub 300. Rotor blades 142 are fixed to an upper rotor hub assembly 400 coupled to the lower rotor hub 300. The rotor blades 142 may have an airfoil profile configured to enhance the production of lift while the central rotor 140 is spinning. Although the rotor 140 of the example aircraft of FIGS. 1-4 has four rotor blades 142, it will be understood that other numbers of rotor blades 142 may be included. For example, in some embodiments, the rotor 140 may have 2, 3, 4, 5, 6, or more rotor blades 142.

The lower rotor hub 300 is tiltably mounted at the top of the mast 120, for example, on a central rotor control housing 122. The central rotor control housing 122 may include one or more servos configured to provide at least fore and aft tilting of the central rotor 140 (e.g., by tilting the lower rotor hub 300). In some embodiments, the central rotor control housing 122 further includes one or more servos configured to provide lateral tilting of the central rotor 140. The central rotor control housing 122 can also include a rotor motor configured to turn the central rotor 140 during some phases of flight (e.g., during vertical and/or transitional flight modes), as described in greater detail below. In some embodiments, the rotor motor may be configured to turn the central rotor 140 at rotational speeds up to typical gyroplane rotor rotational speeds (e.g., up to approximately 200-600 rpm), which may be slower than typical helicopter rotor rotational speeds (e.g., approximately 400-1500 rpm or more). The rotor motor may be rotationally coupled to the central rotor 140 by a clutch and/or a one-way bearing such that, during forward flight, the central rotor 140 can rotate faster than the rotor motor, and such that the central rotor 140 can continue rotating by autorotation when the rotor motor is not turning.

The proprotors 136l, 136r are configured to provide lift and/or forward thrust, depending on the tilt of the proprotors 136l, 136r. The proprotors 136l, 136r are tiltably mounted at opposite ends of the boom 132. In some embodiments, the boom 132 includes distal arms 134l and 134r, which are individually pivotable along the lateral axis of the boom, such that each proprotor 136l, 136r is independently tiltable by pivoting the distal arms 134l, 134r of the boom 132. Servos and/or other actuators disposed within a proprotor tilt control housing 130 may control pivoting of the distal arms 134l, 134r. As described in greater detail below, each proprotor 136l, 136r can be independently powered by left and right proprotor motors and may be operable at different relative speeds for enhanced maneuverability. For example, as described above, the speed, direction of rotation, and/or tilt of each proprotor 136l, 136r may be independently controlled such as by an autopilot or other control system such that the proprotors 136l, 136r can function as control devices to control roll, pitch, and/or yaw of the aircraft 100 without requiring conventional control surfaces. In another example, attitude of the aircraft may be controlled by controlling the thrust of the proprotors 136l, 136r together in coordination with tilt of the proprotors 136l, 136r. The speeds of both proprotors 136l, 136r may further be adjusted collectively so as to propel the aircraft forward at a range of desired speeds. In some embodiments, the proprotors 136l, 136r may have blades featuring a hybrid shape between a propeller shape and a rotor shape so as to operate efficiently in both forward and vertical/hover flight modes.

The empennage 150 is mounted at a rear portion of the aircraft 100 and includes a horizontal stabilizer 152 and vertical stabilizers 154. A longitudinal tail boom 156 may fix the empennage 150 to the mast 120 or fuselage 102. The horizontal stabilizer 152 and vertical stabilizers 154 provide stability to the aircraft, primarily during horizontal flight. In some embodiments, the empennage 150 may include one or more control surfaces such as an elevator disposed on the horizontal stabilizer 152 and/or rudders disposed on the vertical stabilizers 154. In embodiments having rudders on the vertical stabilizers 154, the vertical stabilizers 154 may be placed at a location within the slipstreams of the propro-tors 136l, 136r to increase rudder effectiveness at low airspeeds. However, it will be understood that in various embodiments, the need for control surfaces may be elimi-nated by the use of independently controllable and tiltable proprotors 136l, 136r as described above.

Figure 5:
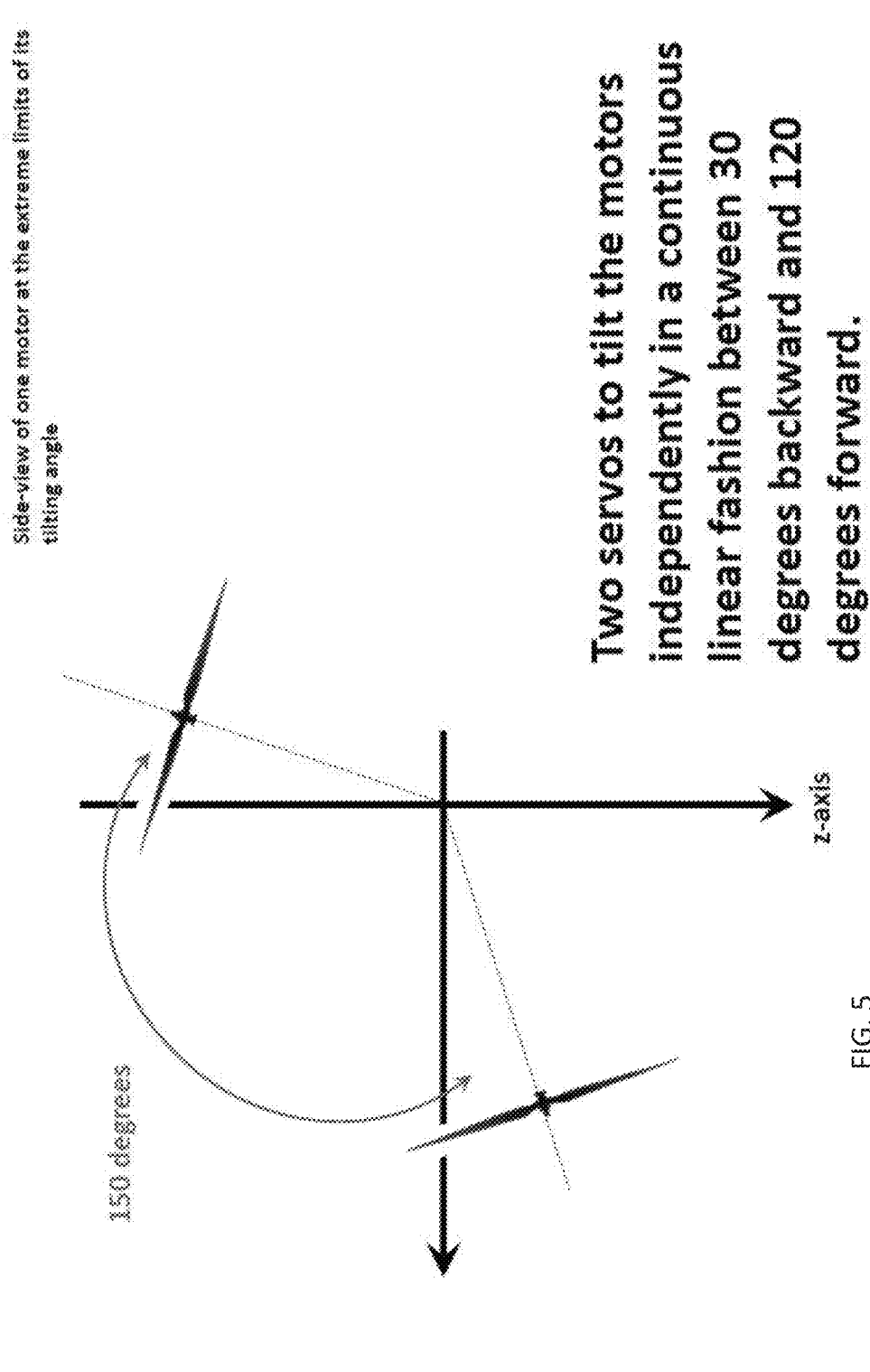
FIG. 5 schematically illustrates an example tilting range of proprotors with respect to the lateral boom of an example aircraft.
Figure 6:
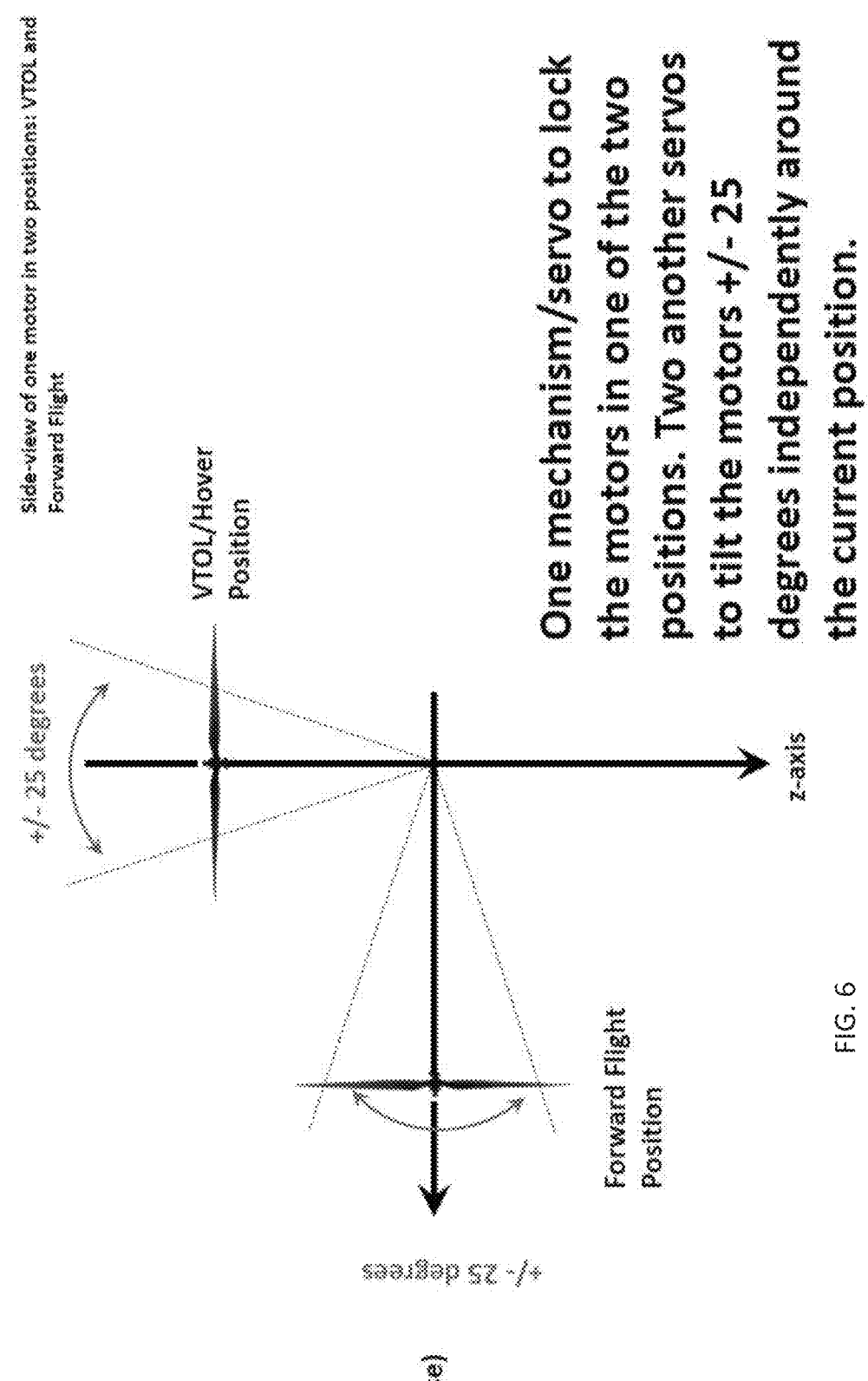
FIG. 6 schematically illustrates example VTOL/hover and forward flight tilt positions of the proprotors.

With reference to FIGS. 5 and 6, and with continued reference to FIGS. 1-4, example flight control systems and methods will now be described. FIG. 5 schematically illus-trates an example tilting range of proprotors 136l, 136r with respect to the lateral boom 132 of the aircraft 100. FIG. 6 schematically illustrates example VTOL/hover and forward flight tilt positions of the proprotors. Each of the proprotors

136l, 136r may have a range of tilt angles of at least 90 degrees, and in some cases up to 150 degrees or more. For example, proprotors 136l, 136r may be tiltable to a VTOL/hover position or range of positions, in which each proprotor 136l, 136r is substantially aligned about a vertical or z-axis to produce an upward lifting force. Proprotors 136l, 136r may further be tiltable to a forward flight or horizontal flight position or range of positions, in which each proprotor 136l, 136r is substantially aligned about a longitudinal or x-axis to produce forward thrust. Within either the VTOL/hover posi-tion or forward flight position, each proprotor 136l, 136r may be independently tiltable within a range of approxi-mately 15 degrees, 20 degrees, 25 degrees, 30 degrees, or more, such as for maneuvering and/or stability as described below. In some embodiments, the proprotors 136l, 136 r can be tilted to any tilt angle between 30 degrees below hori-zontal to 30 degrees aft of vertical, for a full tilt angle range of approximately 150 degrees.

Vertical flight modes, such as VTOL, hovering, may be achieved with the proprotors 136l, 136r in a VTOL/hover position, such as wherein the axis of rotation of each of the proprotors 136l, 136 r is within approximately 30 degrees of vertical. In the VTOL/hover position, the spinning propro-tors 136l, 136r primarily generate an upward lifting force. In addition, the central rotor 140 may also be used during vertical flight modes. The central rotor 140 may be main-tained in a substantially vertical orientation and turned by the rotor motor at a speed sufficient to provide gyroscopic stabilization to the aircraft 100 and produce an additional lifting force in addition to the lift provided by the proprotors 136l, 136r. For example, turning the central rotor 140 at a relatively low rotational speed (e.g., a typical gyroplane rotor rotational speed) can be sufficient to significantly stabilize the aircraft 100. However, in addition to stabilizing the aircraft 100, the central rotor 140 when powered may also create torque effects and gyroscopic precession. In some embodiments, the proprotors 136l, 136r may be differen-tially controlled, and/or may be configured to rotate in a direction opposite the rotation of the central rotor 140, to counteract the torque effect of the central rotor 140. For example, the torque generated by a clockwise turning central rotor 140 may tend to cause the body of the aircraft 100 to spin counterclockwise. To counteract this torque effect, the left proprotor 136l may be tilted slightly forward of vertical while the right proprotor 136r is tilted slightly aft of vertical, such that the proprotors 136l, 136r exert a clockwise torque on the body of the aircraft 100 (e.g., a yawing moment) that counteracts the torque effect of the turning central rotor 140. In some embodiments, a yawing moment may be created by varying the speeds and/or rotational directions of the pro-protors 136l, 136r. For example, rotating proprotor 136l faster than proprotor 136r creates a yawing moment to the right, and rotating proprotor 136r faster than proprotor 136l creates a yawing moment to the left. These methods of generating a yawing moment may be utilized for turning and/or for countering the torque generated when the main rotor is powered.

During vertical flight, such as takeoff, landing, hovering, lateral movement, and/or slow forward or backward flight, differential control of the proprotors 136l, 136r may further be used to maneuver the aircraft 100. As described above, differential tilting, motor speed, or rotational direction of the proprotors 136l, 136r may be used to produce a yawing moment for maneuverability about the vertical axis. Differ-ential rotation speed, rotational direction, and/or tilt of the proprotors 136l, 136r may be used to produce a rolling moment for maneuverability about the longitudinal axis. For example, powering the left proprotor **136*l* at a higher rotational speed relative to the right proprotor 136*r* produces a right or clockwise rolling moment; powering the right proprotor 136*r* at a higher rotational speed relative to the left proprotor 136*l* produces a left or counterclockwise rolling moment. Simultaneous tilting of the proprotors 136*l*, 136*r* forward or aft of vertical, and/or tilting the central rotor 140 forward or aft, produces a pitching moment for maneuverability about the lateral axis. Rolling or pitching the aircraft 100** out of a vertical orientation yields a horizontal component of lift which may be utilized for forward, backward, and/or lateral movement during generally vertical flight.

Horizontal or forward flight, including straight and level flight, climbing, descending, turning, and the like, may be achieved with the proprotors **136*l*, 136*r* in a forward flight position, such as wherein the axis of rotation of each proprotor 136*l*, 136*r* is within approximately 30 degrees of horizontal. In the forward flight position, the spinning proprotors 136*l*, 136*r* primarily generate forward thrust substantially parallel to a direction of flight. During forward flight, the central rotor 140 may be unpowered and turns in free autorotation. Preferably, the central rotor 140 has an upward tilt (e.g. between approximately 1 degree and 20 degrees or more with the higher side of the central rotor 140 oriented toward the direction of flight). In some embodiments, the central rotor 140 is tilted at an angle of approximately 1 to 20 degrees in forward flight. Thus, in forward flight, the aircraft 100 performs substantially as a gyroplane, with the powered proprotors 136*l*, 136*r* generating thrust and the autorotating central rotor 140 providing lift. The empennage 150** provides directional stability during forward flight.

In various embodiments, the empennage 150 may or may not include control surfaces. For example, the horizontal stabilizer 152 may include one or more elevators configured to provide pitch control, and the vertical stabilizers 154 may each include a rudder configured to provide yaw control. In some embodiments, the empennage 150 includes only rudders or only an elevator, and in other embodiments the empennage 150 contains neither rudders nor elevators. Instead, any or all of pitch, yaw, and roll may be controlled by the variable tilt and pitch proprotors. Pitch and/or roll may also be controlled at least in part by tilting of the central rotor 140.

Pitch control in forward flight may be achieved by tilting the central rotor 140 forward or aft. Pitch control in forward flight may also be achieved by simultaneously tilting both proprotors **136*l*, 136*r* higher or lower relative to the longitudinal or x-axis. For example, simultaneous upward tilting of the proprotors 136*l*, 136*r* can produce a nose-up pitching moment, and simultaneous downward tilting of the proprotors 136*l*, 136*r*** can produce a nose-down forward pitching moment.

Roll control in forward flight may be achieved by tilting the central rotor 140 left or right. However, controlling roll by tilting the central rotor 140 requires a lateral tilting mechanism for the central rotor 140. In some embodiments, the lower rotor hub 300 and/or the upper rotor hub assembly 400 may be simplified by providing only fore and aft tilting, and not lateral tilting. In such embodiments, aircraft roll can be achieved based on differential tilting of the proprotors **136*l*, 136*r*. For example, tilting the left proprotor 136*l* slightly upward relative to horizontal and/or tilting the right proprotor 136*r* slightly downward relative to horizontal produces a right or clockwise rolling moment. Tilting the right proprotor 136*r* slightly upward relative to horizontal and/or tilting the left proprotor 136*l*** slightly downward relative to horizontal produces a left or counterclockwise rolling moment.

Yaw control in forward flight may be achieved by providing differential power to the left and right proprotors **136*l*, 136*r*. For example, varying the relative speeds of the proprotors 136*l*, 136*r* such that the left proprotor 136*l* turns at a higher rotational velocity than the right proprotor 136*r* produces a right yawing moment. Varying the relative speeds of the proprotors 136*l*, 136*r* such that the right proprotor 136*r* turns at a higher rotational velocity than the left proprotor 136*l*** produces a left yawing moment.

In various embodiments, turning in forward flight may be achieved by yaw control (e.g., by variable relative proprotor speeds), by roll control only (e.g., by variable relative tilt of the proprotors), or by a combination of yaw control and roll control. In some embodiments, turning with a combination of yaw and roll control may be desirable in order to maintain coordinated flight without sideslip while turning. For example, a right turn may be performed by simultaneously (or substantially simultaneously) tilting the left proprotor **136*l* upward, increasing the rotational speed of the left proprotor 136*l*, tilting the right proprotor 136*r* downward, and/or decreasing the rotational speed of the right proprotor 136*r***.

In addition to vertical and forward flight modes, the aircraft 100 is further capable of transitioning between forward and vertical flight modes while in flight. Maneuvers for transitioning from vertical flight to forward flight, and from forward flight to vertical flight, will now be described. Advantageously, the aircraft of the present disclosure are capable of transitioning seamlessly between flight modes without sacrificing stability or controllability during the transition.

The aircraft 100 may transition from vertical flight to forward flight at various times during a mission, for example, after a vertical takeoff when entering a cruise portion of flight to a remote location, after a period of hovering at the remote location, etc. The transition from vertical flight to forward flight begins with the aircraft 100 configured for vertical flight. In this configuration, the proprotors **136*l*, 136*r* are in the VTOL/hover position illustrated in FIG. 6, and the central rotor 140 may be turning under power while substantially parallel to the proprotors 136*l*, 136*r*. To transition to forward flight, the proprotors 136*l*, 136*r* simultaneously tilt forward into the forward flight position illustrated in FIG. 6. At approximately the same time, the central rotor 140 is tilted rearward (e.g., higher toward the front of the aircraft and lower toward the rear of the aircraft). If the central rotor 140 was powered during the preceding vertical or hovering flight, the rotor motor may continue to turn the central rotor 140 until the aircraft is established in forward flight. If the central rotor 140 was not powered during the preceding vertical or hovering flight, the rotor motor may activate during the transition in order to spin up the central rotor 140 to an appropriate rotational speed to provide lift for forward flight. Once the aircraft 100 is established in forward flight, the rotor motor may be deactivated as the relative airflow against the central rotor 140 becomes fast enough to cause autorotation of the central rotor 140**.

The aircraft 100 may transition from forward flight to vertical flight a various times during a mission, for example, upon arrival at a remote location where the aircraft 100 will hover for a period of time, upon arrival at a landing site, etc. The transition from forward flight to vertical flight begins with the aircraft 100 configured for horizontal flight. In this configuration, the proprotors 136*l*, 136*r* are in the forward flight position illustrated in FIG. 6, and the central rotor 140 is turning by free autorotation as the aircraft travels in forward flight. To transition to vertical flight, the proprotors 136*l*, 136*r* simultaneously tilt upward into the VTOL/hover position illustrated in FIG. 6. The central rotor 140 is tilted forward (e.g., to a level orientation substantially parallel to the proprotors 136*l*, 136*r*). In some embodiments, the proprotors 136*l*, 136 *r* may be tilted beyond vertical, such as between 5 degrees and 30 degrees aft of vertical, if desired to slow the forward airspeed of the aircraft 100. As the airspeed decreases and/or as the central rotor 140 tilts back to a level orientation, the autorotation of the central rotor 140 may decrease and/or stop. The rotor motor may be activated to turn the central rotor 140 to provide additional lift and/or stabilization to the aircraft 100 during the vertical flight phase.

Figure 7:
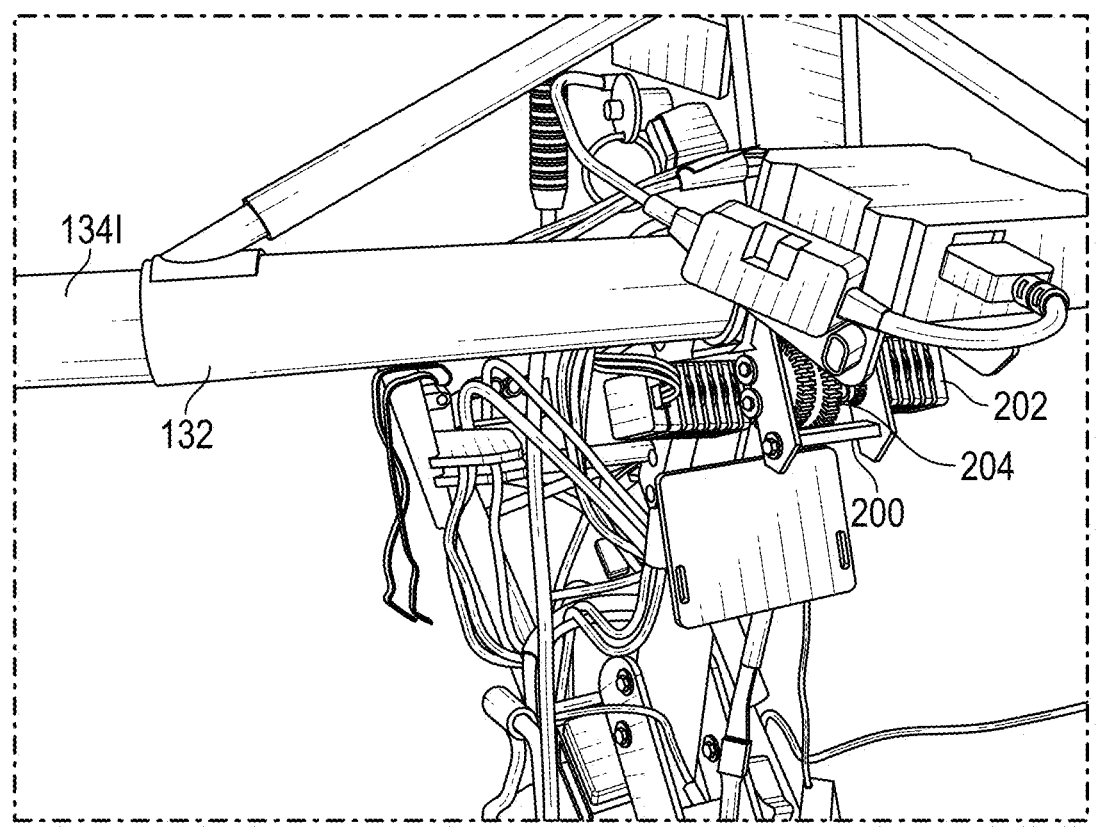
FIG. 7 depicts a medial portion of the lateral boom of an example aircraft including proprotor support and control components located thereon.
Figure 8:
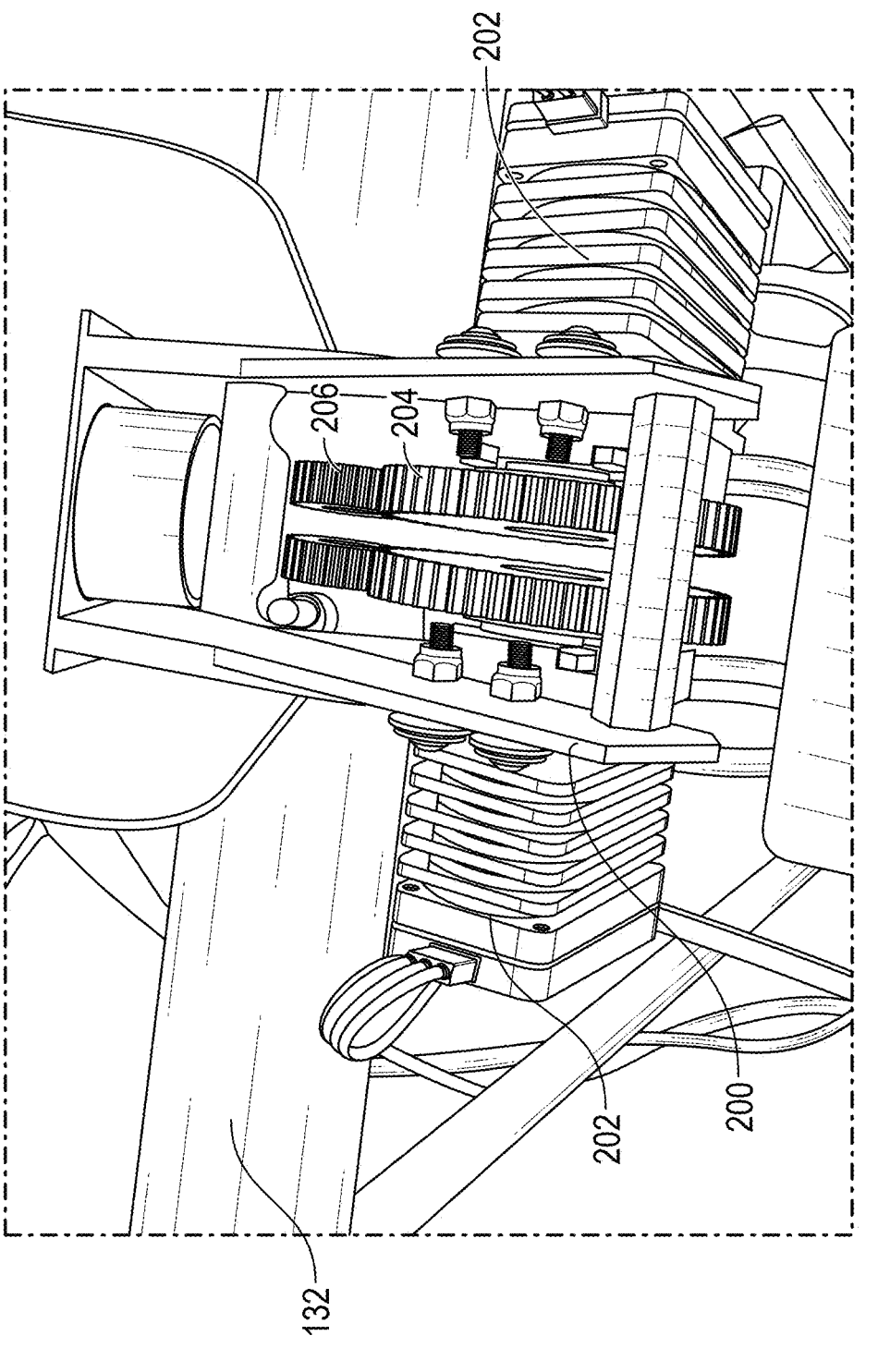
FIG. 8 is a detailed view of certain proprotor support and control components of FIG. 7.

Throughout the preceding disclosure, proprotors 136*l*, 136*r* are described as being independently tiltable and controllable in order to achieve various flight control functions. FIGS. 7-10 further illustrate example components configured to implement the proprotor control features described herein. FIG. 7 depicts a medial portion of the lateral boom 132 of an example aircraft 100 including proprotor support and control components located thereon. FIG. 8 is a detailed view of the proprotor support and control components of FIG. 7. As shown in FIG. 7, in some embodiments, the boom 132 may comprise a tubular medial structure, and the distal arms 134*l*, 134*r* may be narrower tubular components coaxially mounted partially within the tubular medial structure. As shown in FIGS. 7 and 8, the aircraft 100 includes a gearbox 200, which may be located within the proprotor tilt control housing 130 illustrated in FIGS. 1-4. As shown in FIG. 8, the gearbox 200 includes master gears 204 independently driven by proprotor tilt servos 202. The master gears 204 are positioned so as to mesh with slave gears 206, which are coaxial with and rotationally fixed to inner ends of the distal arms 134*l*, 134*r*. Thus, the tilt servos 202 can tilt the proprotors 136*l*, 136*r* by rotating the master gears 202.

Figure 9:
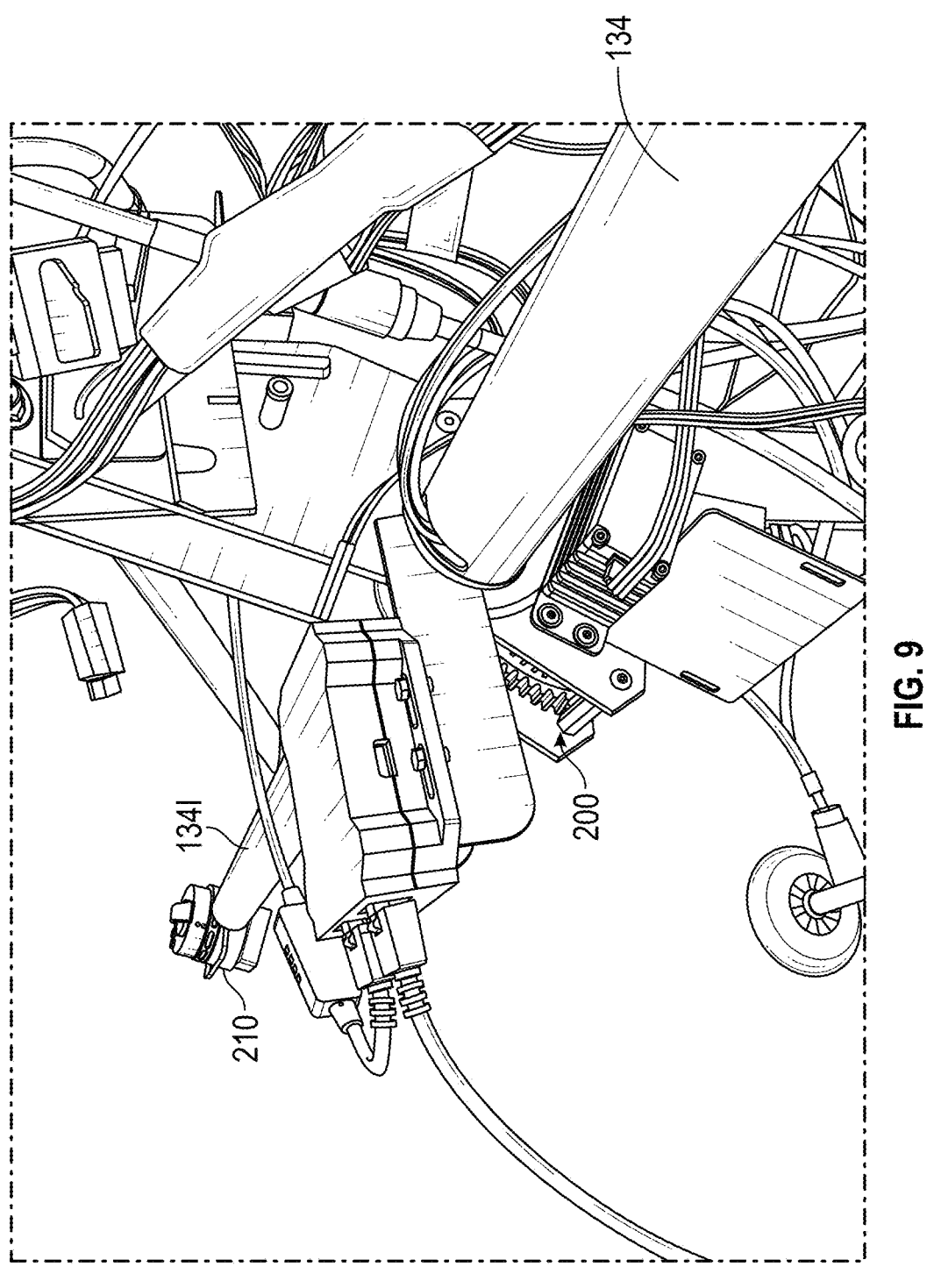
FIG. 9 depicts medial and lateral portions of the lateral boom of the example aircraft of FIGS. 7 and 8 including proprotor support and control components located thereon.
Figure 10:
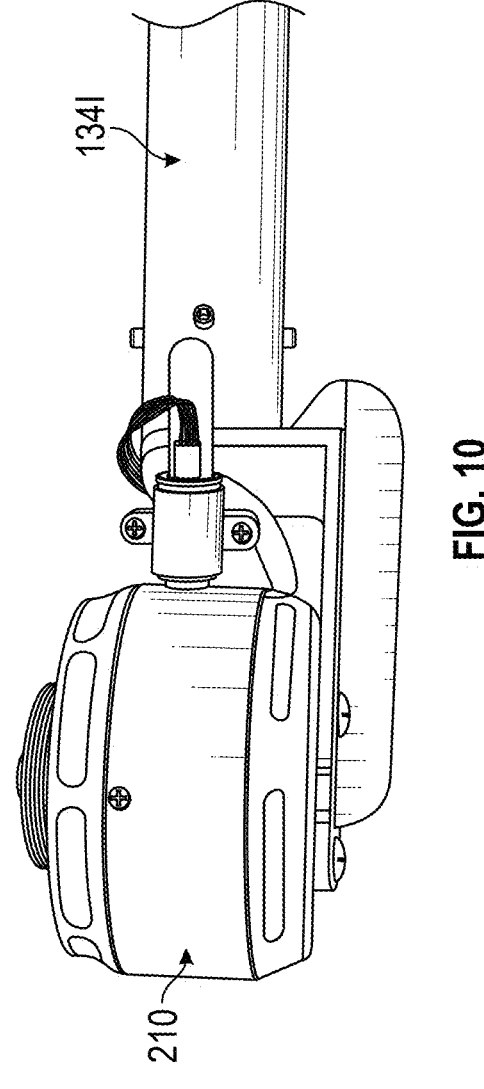
FIG. 10 depicts a lateral portion of the lateral boom of the example aircraft of FIGS. 7-9 including proprotor support and control components located thereon.
Figure 11:
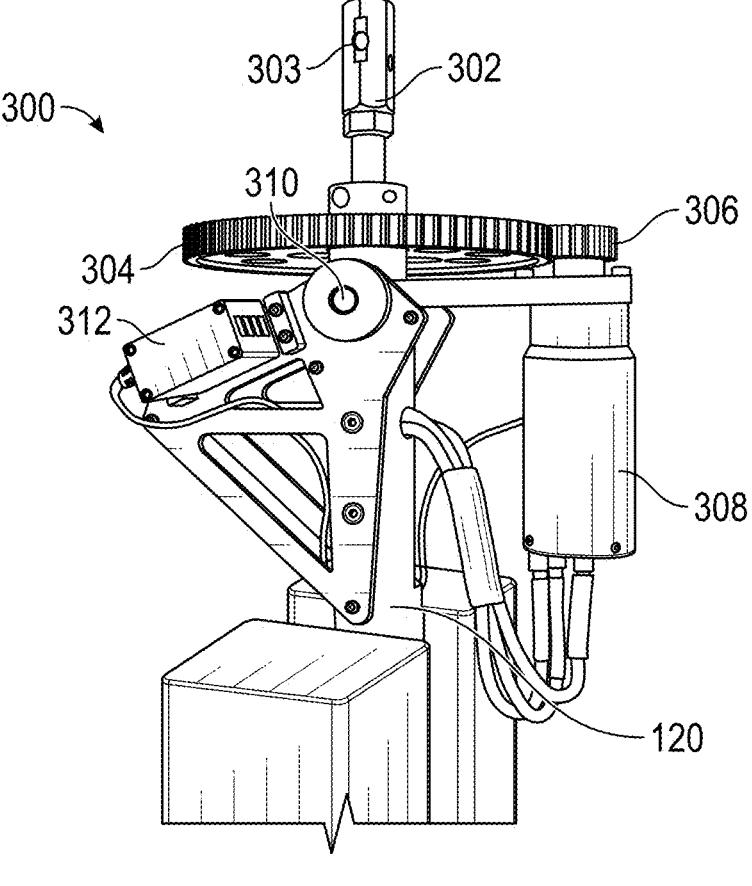
FIG. 11 depicts a side view of a lower rotor hub of an example aircraft.
Figure 12:
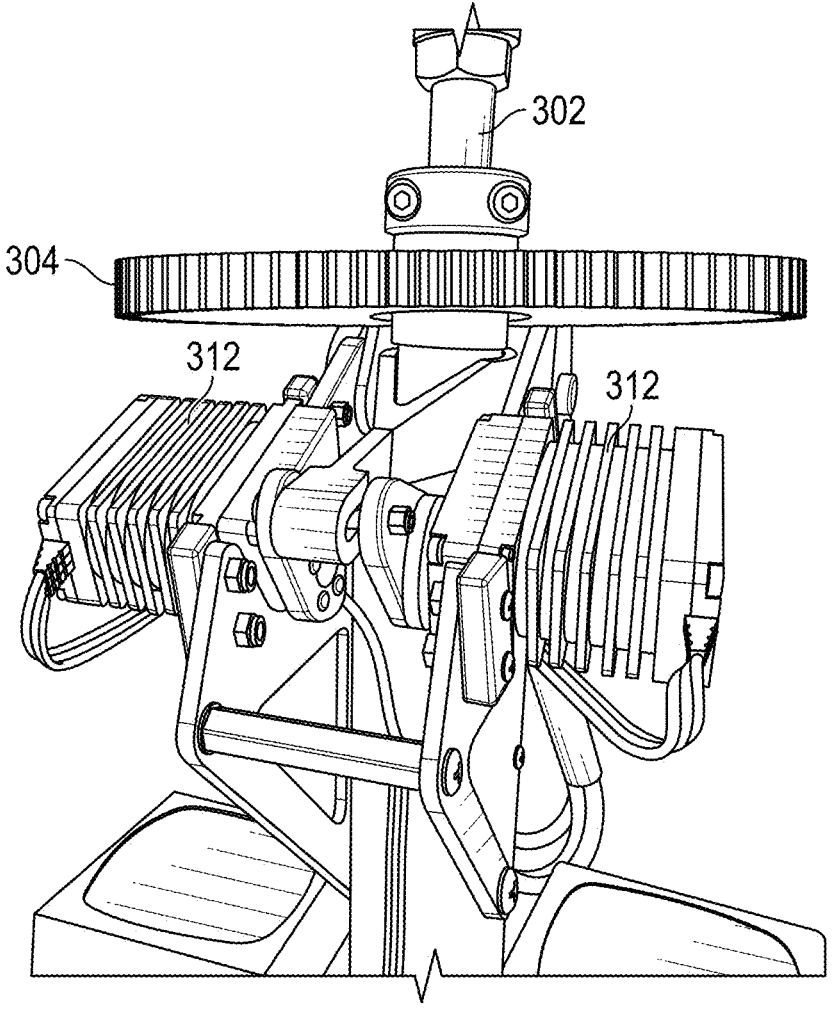
FIG. 12 depicts a rear view of the lower rotor hub of the example aircraft of FIG. 11.
Figure 13:
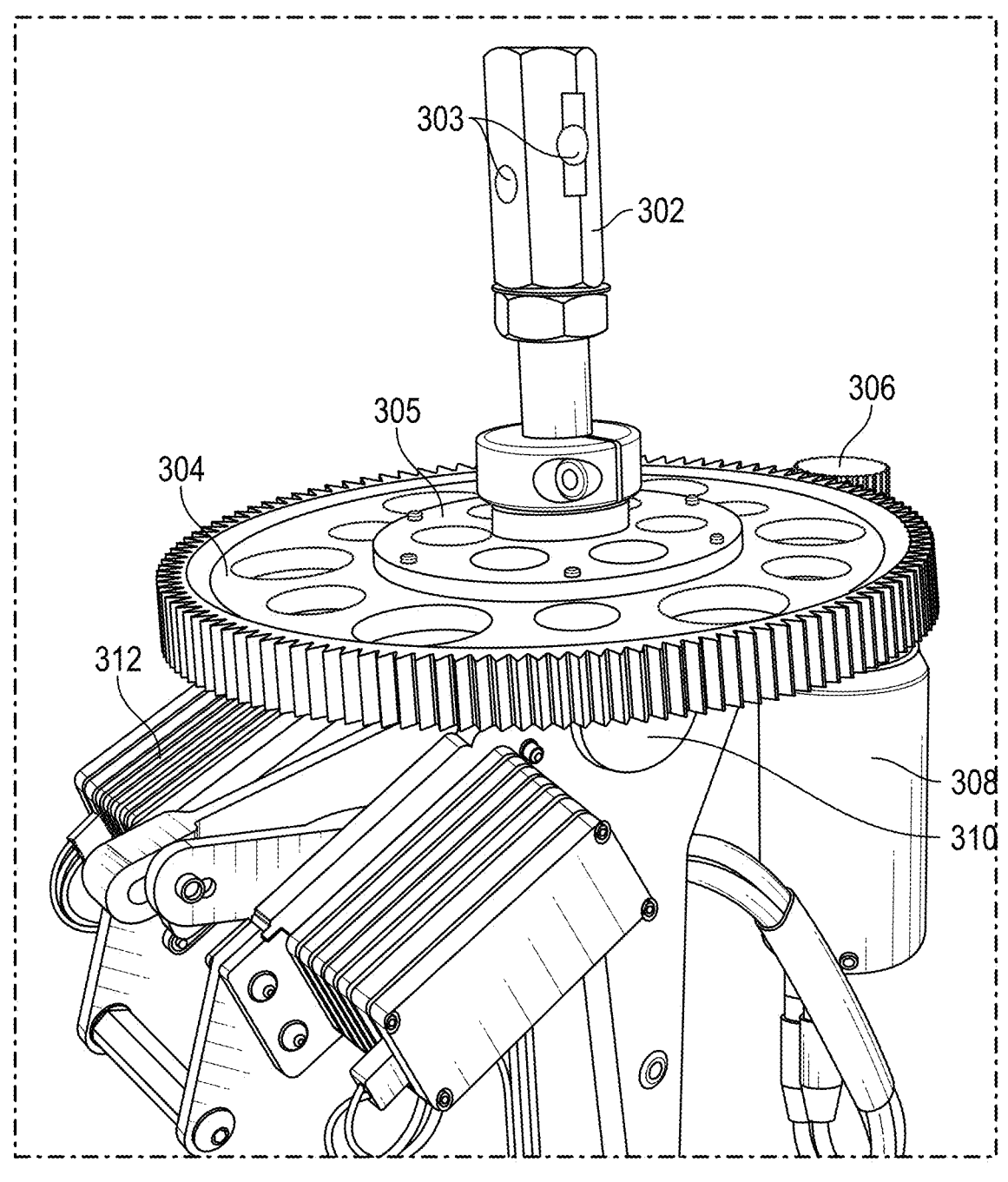
FIG. 13 depicts a top perspective view of the lower rotor hub of the example aircraft of FIGS. 11 and 12.

As shown in FIGS. 9 and 10, a proprotor motor 210 is disposed at an outer end of each distal arm 134*l*, 134*r* of the boom 132. Each proprotor motor 210 is rotationally fixed with respect to the corresponding distal arm 134*l*, 134*r*, such that the rotational axis of the proprotor motor 210 is perpendicular to the lateral axis along the distal arm 134*l*, 134*r*. Thus, rotation of a distal arm 134*l*, 134*r* about the lateral axis, under control of the proprotor tilt servos 202, produces fore and aft tilting of the rotational axis of the proprotor motor 210. Accordingly, each of the tilting operations described above with respect to the proprotors 136*l*, 136*r* may be achieved by actuating the proprotor tilt servos 202 individually or simultaneously.

FIGS. 11-15 illustrate an example lower rotor hub 300 of an example aircraft such as the aircraft 100. As described above, the lower rotor hub 300 serves as an attachment point for the upper rotor hub assembly 400 and the central rotor 140. The lower rotor hub 300 is also configured to provide tilting and powered rotation of the central rotor 140, as will now be described. The lower rotor hub 300 includes a rotor mount shaft 302 having one or more mounting pin holes 303 extending therethrough, a central rotor slave gear 304 meshed with a central rotor master gear 306, a central rotor drive motor 308, a tilt bearing 310, and a central rotor tilt servo 312.

The rotor mount shaft 302 serves as a mounting point for the central rotor 140. The central rotor 140, not shown in FIGS. 11-15, may be mounted to the aircraft 100 by coupling the upper rotor hub assembly 400 to the rotor mount shaft 302 and securing the upper rotor hub assembly 400 using one or more pins extending through mounting pin holes 303. Pin-based mounting of the upper rotor hub assembly 400 allows the central rotor 140 to be easily and quickly attached to or detached from the aircraft 100 for transportation.

The central rotor slave gear 304 is coaxial with the rotor mount shaft 302 and is configured to transfer rotational motion of the central rotor master gear 306 to the rotor mount shaft 302 to drive the central rotor 140 during powered operation of the central rotor 140. In some embodiments, the central rotor slave gear 304 is coupled to the rotor mount shaft 302 by a clutch mechanism and/or a one-way bearing (e.g., a one-way bearing 305) such that rotational motion of the central rotor slave gear 304 in a first direction (e.g., clockwise) is transferred to the rotor mount shaft 302, but the rotor mount shaft 302 is free to spin in the same direction (e.g., clockwise) when the central rotor slave gear 304 is not rotating or is rotating more slowly than the rotor mount shaft 302. Thus, the central rotor drive motor 308 can power the central rotor 140 (e.g., during vertical flight and/or during the transition from vertical flight to forward flight) by turning the central rotor master gear 306, which in turn causes the central rotor slave gear 304 and rotor mount shaft 302 to rotate.

The central rotor tilt servo 312 is configured to tilt the lower rotor hub 300 relative to the mast 120. Actuation of the central rotor tilt servo 312 causes rotation of the lower rotor hub 300 about the tilt bearing 310, which accommodates motion about a lateral axis perpendicular to the rotor mount shaft 302.

Figure 14:
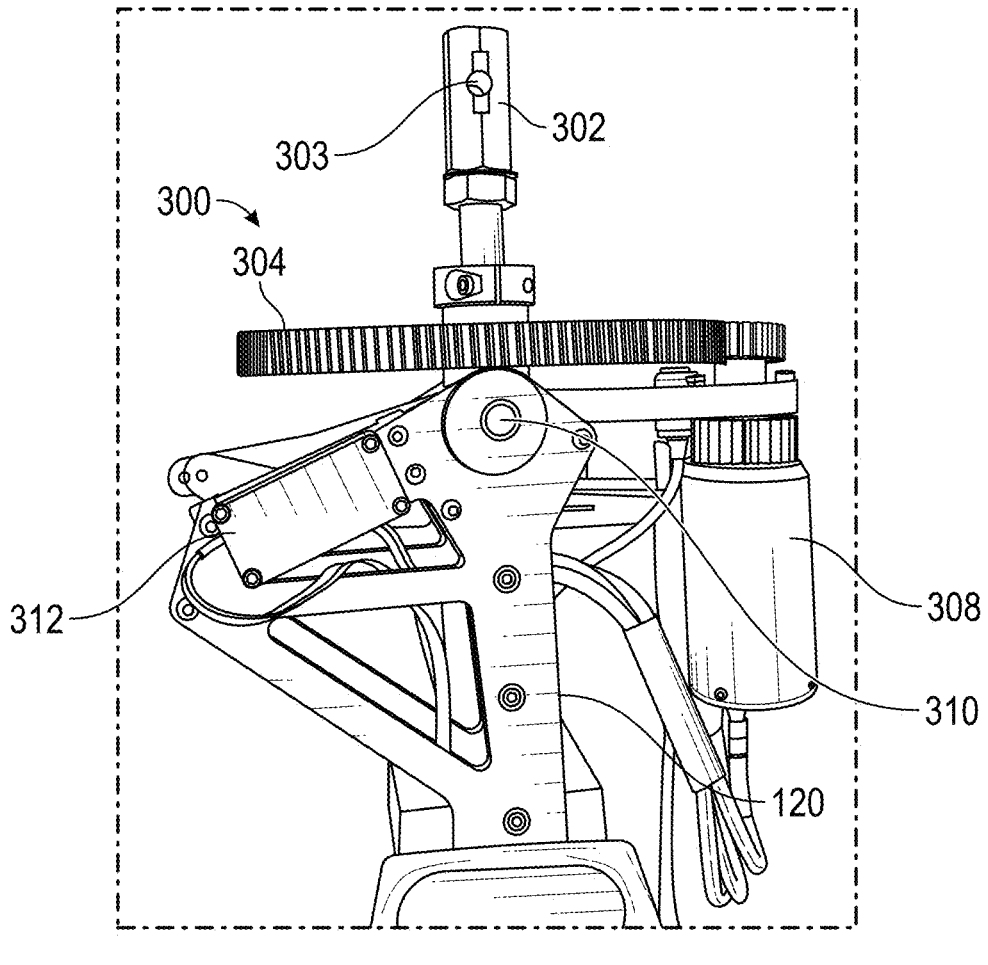
FIG. 14 depicts a side view of the lower rotor hub of the example aircraft of FIGS. 11-13 in a vertical configuration.

FIG. 14 illustrates an example forward-most tilt position of the lower rotor hub 300. In the tilt position illustrated in FIG. 14, the rotor mount shaft 302 is substantially aligned with a vertical axis of the aircraft 100, and a spinning central rotor 140 attached to the lower rotor mount 300 would produce a lifting force directly upward. The tilt position illustrated in FIG. 14 may be used, for example, during vertical flight while the proprotors 136*l*, 136*r* are in the VTOL/hover position illustrated in FIG. 6.

Figure 15:
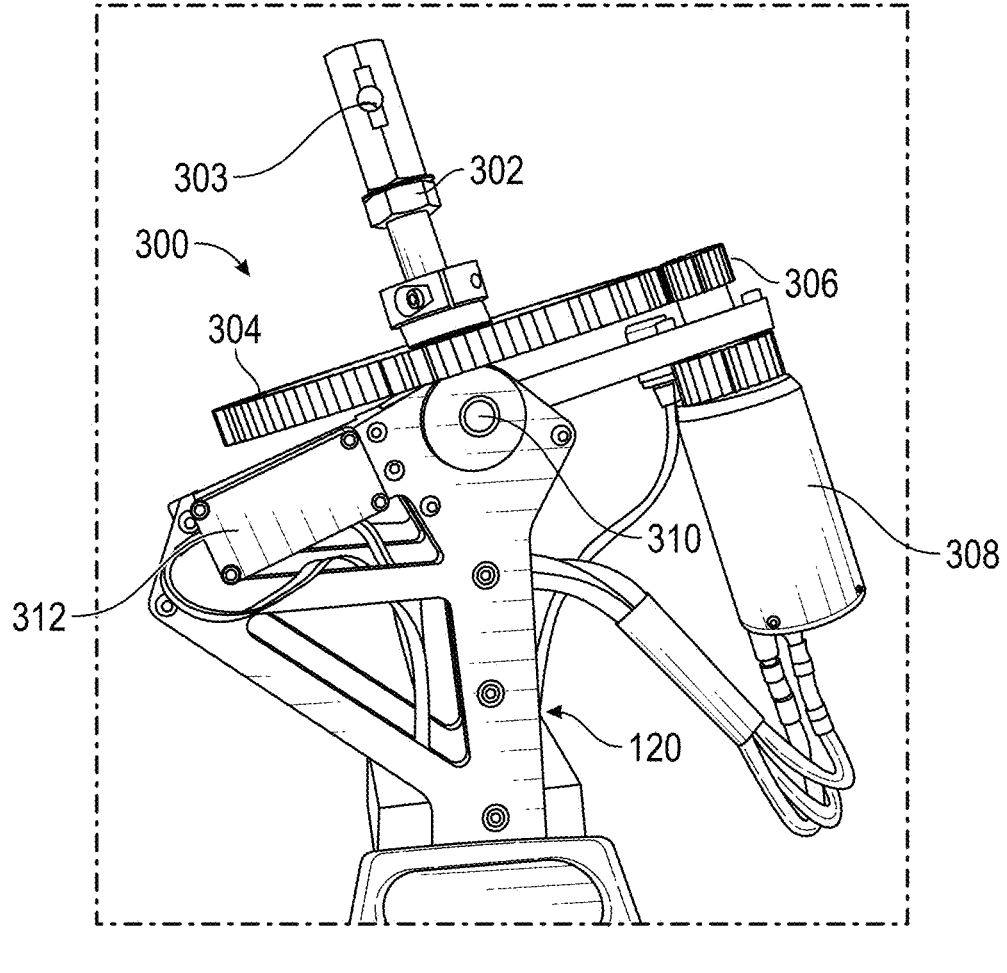
FIG. 15 depicts a side view of the lower rotor hub of the example aircraft of FIGS. 11-14 in a tilted configuration.

FIG. 15 illustrates an example rear-most tilt position of the lower rotor hub 300. In the tilt position illustrated in FIG. 15, the rotor mount shaft 302 is tilted rearward approximately 20 degrees relative to vertical, such that a spinning central rotor 140 attached to the lower rotor mount 300 would rotate within a plane tilted approximately 20 degrees relative to a longitudinal axis of the aircraft 100. The tilt position illustrated in FIG. 15 may be used, for example, during horizontal flight while the proprotors 136*l*, 136*r* are in the forward flight position illustrated in FIG. 6. The central rotor tilt servo 312 tilts the lower rotor hub 300 between the positions illustrated in FIGS. 14 and 15 when the aircraft 100 transitions from vertical flight to forward flight, or from forward flight to vertical flight, as described above.

Figure 16:
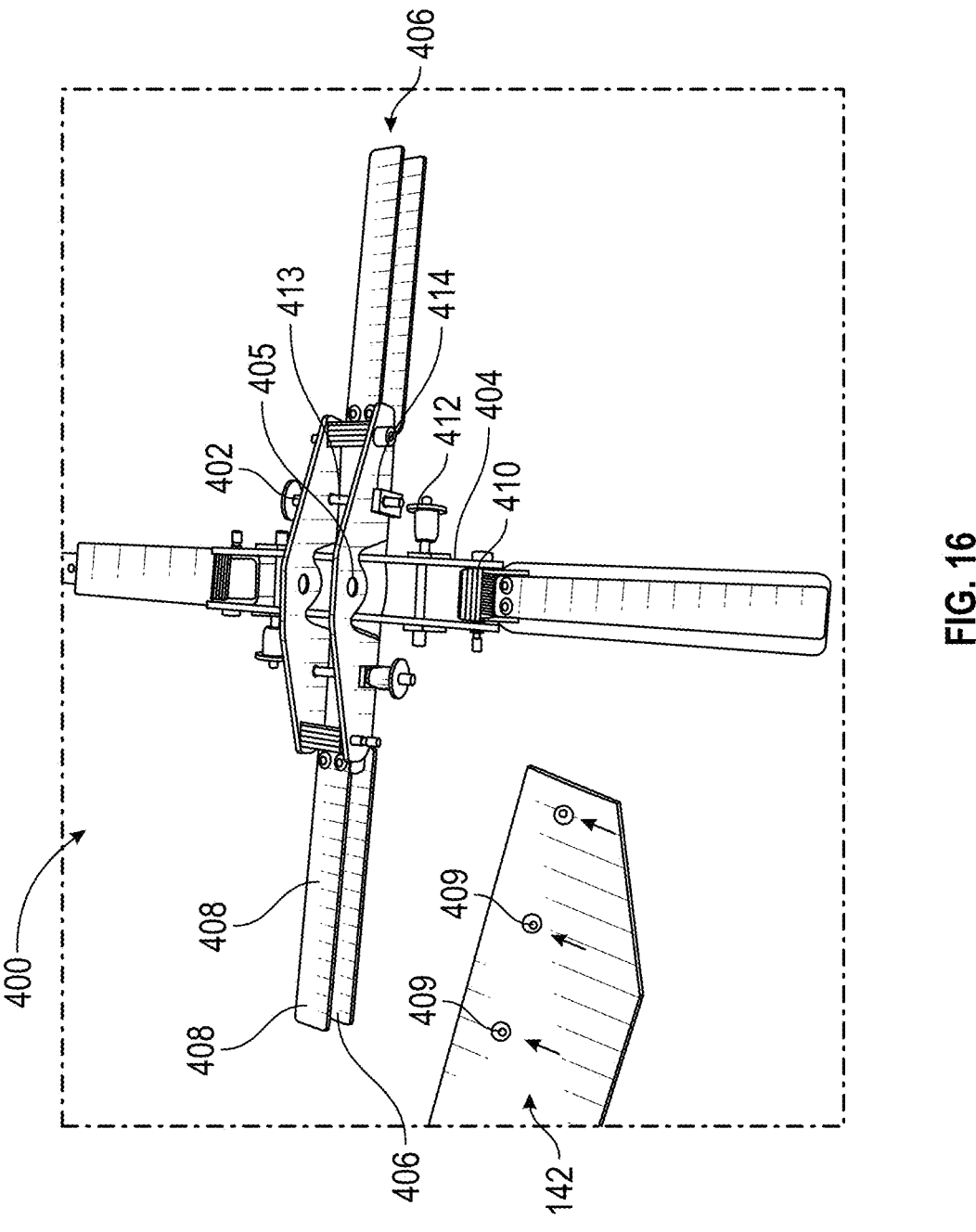
FIG. 16 depicts an upper rotor hub assembly including two mounting members coupleable to the lower rotor hub of FIGS. 11-15.
Figure 17:
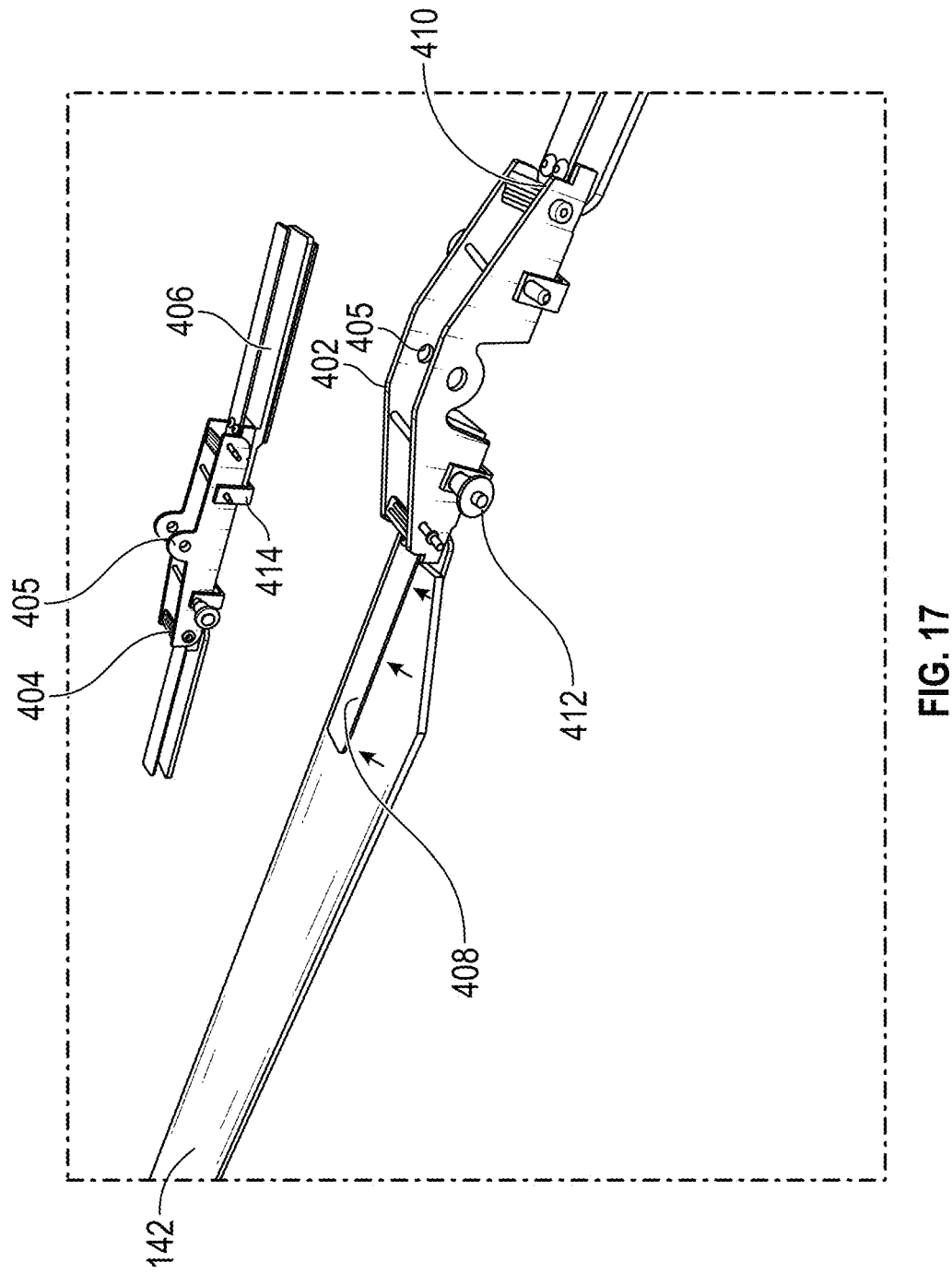
FIGS. 17 and 18 depict a rotor blade mounted to a blade arm of a mounting member in accordance with an example embodiment.
Figure 18:
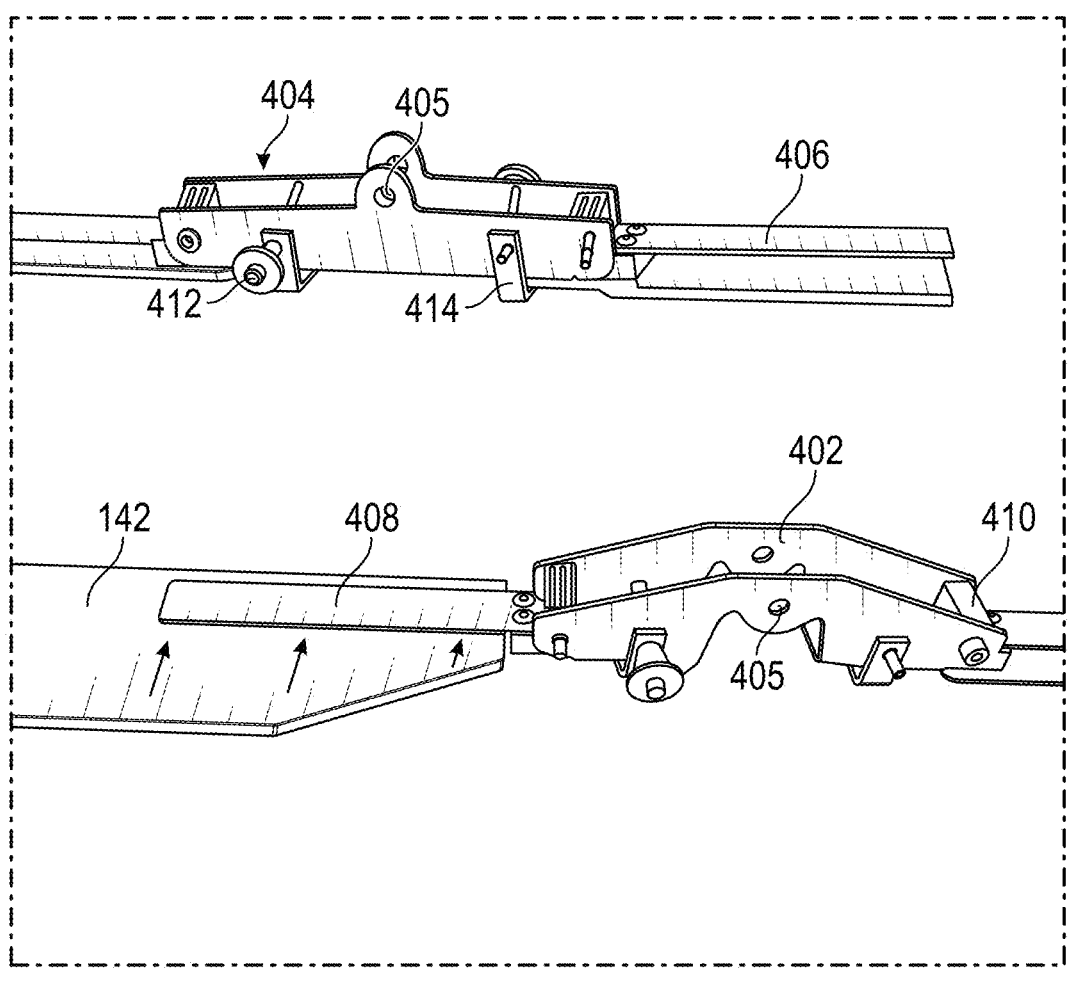
Figure 19:
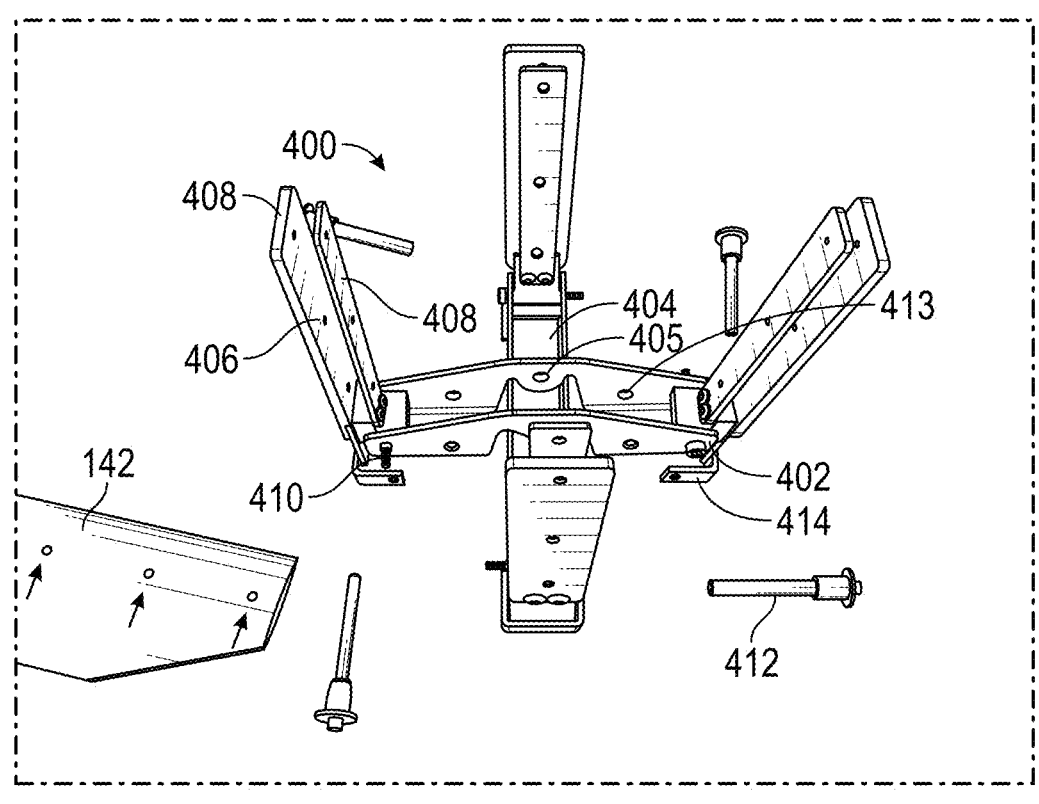
FIGS. 19 and 20 depict the upper rotor hub assembly in a folded configuration.
Figure 20:
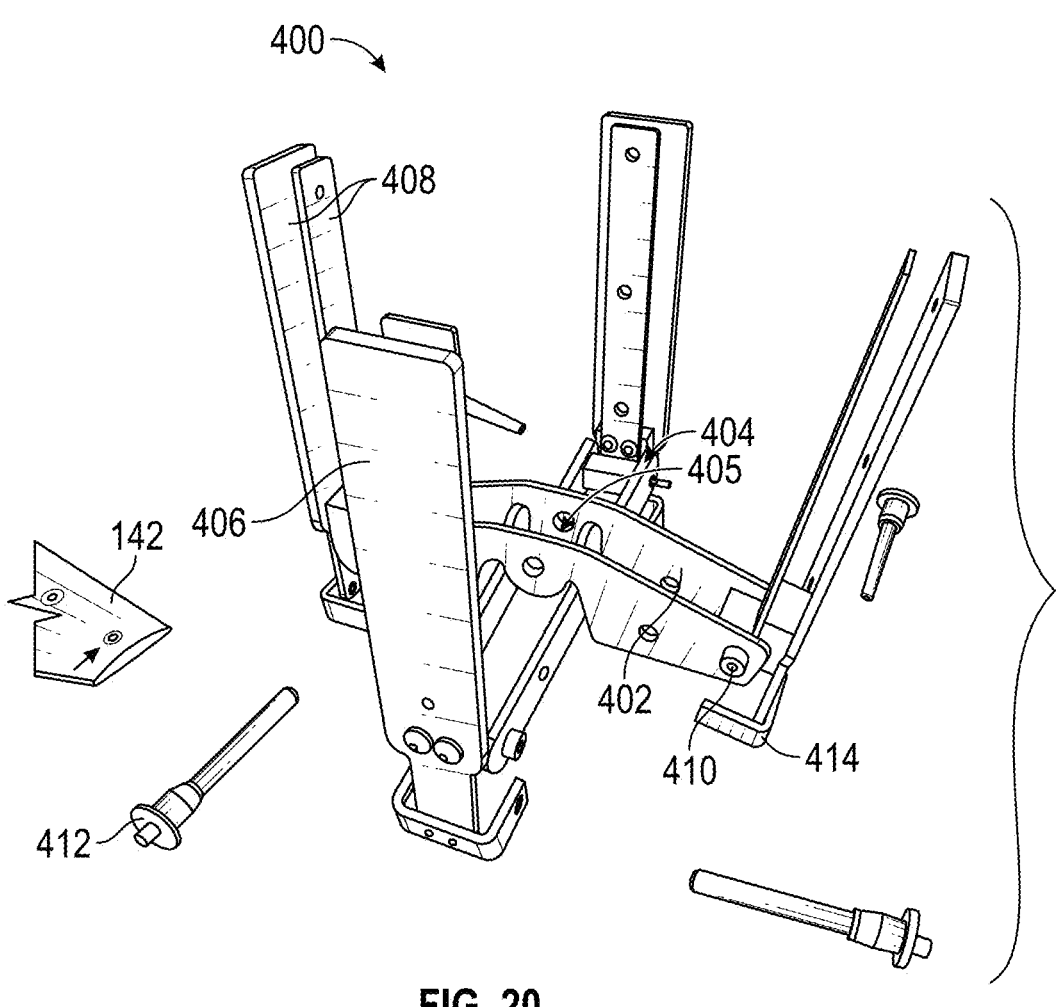

FIGS. 16-20 depict an example upper rotor hub assembly such as the upper rotor hub assembly 400 of the aircraft 100. FIG. 16 depicts the upper rotor hub assembly 400 including two mounting members 402, 404 couple able to the lower rotor hub 300 of FIGS. 11-15, as well as an inner portion of a rotor blade 142 of the central rotor 140. FIGS. 17 and 18 depict the mounting members 402, 404 separately, including an example rotor blade 142 mounted to the first mounting member 402. FIGS. 19 and 20 depict the upper rotor hub assembly 400 in a folded configuration.

As described above, the central rotor 140 of the aircraft 100 functions similarly to the rotor of a gyroplane when the aircraft 100 is in a forward flight mode. In contrast to helicopter rotors, in which blades may be hinged or otherwise able to move vertically and/or horizontally relative to the main rotor hub, gyroplane rotors perform most efficiently when the blades are rigidly fixed relative to the central hub and each pair of opposing blades remains symmetrically opposed. While not required, exact alignment of the blades may substantially improve performance. Thus, if compact transportation of the aircraft 100 is desired, it may be cumbersome to remove the blades 142 from the upper rotor hub assembly 400 for transport due to the time required to carefully align the blades 142 when reattaching them. As will now be described, the upper rotor hub assembly 400 is easily detachable from and attachable to the lower rotor hub 300, and may be folded such that the entire central rotor 140 and upper rotor hub assembly 400 may be transported in a compact form while the blades 142 remain attached to the mounting members 402, 404.

The upper rotor hub assembly 400 includes a first mounting member 402 and a second mounting member 404. The mounting members 402, 404 each include mounting pin holes 405 configured to align with the mounting pin holes 303 of the lower rotor hub 300 of FIGS. 11-15. As shown in FIG. 16, the mounting members 402, 404 are shaped so as to nest together when both mounting members 402, 404 are mounted to the lower rotor hub 300. In addition, the mounting members 402, 404 are shaped such that, when nested together in a mounted configuration, each mounting member 402, 404 can teeter independently about the axis of its mounting pin. In some embodiments, the aircraft 100 can be operated with only two blades 142 by using only the first mounting member 402 or only the second mounting member 404. Two-bladed operation is associated with less lift and less induced drag during forward flight, and may be desirable when the aircraft 100 is carrying a relatively light load and less lifting capacity is required; four-bladed operation is associated with more lift and more induced drag during forward flight, and may be desirable when the aircraft 100 is carrying a relatively heavy load and greater lifting capacity is required.

Each mounting member 402, 404 includes two mounting brackets 406 disposed on opposite sides of the mounting member 402, 404 about the center of the hub. Each mounting bracket 406 includes two or more mounting holes 408 spaced apart to align with corresponding mounting holes 409 within the rotor blades 142. In some embodiments, more than two mounting holes 408, 409, such as three or more mounting holes, are provided in order to form a structurally robust connection between the rotor blades 142 and the mounting brackets 406.

The mounting members 402, 404 each include two hinges 410 disposed between the mounting brackets 406 and the central portion of the mounting members 402, 404. The hinges 410 allow the mounting brackets 406 and rotor blades 142 to be folded about the axis of the hinges 410 while the aircraft is not in flight. Each mounting bracket 406 is rigidly coupled to locking plates 414 having holes located to align with locking pin holes 413 of the central portion of the mounting members 402, 404. When a hinge 410 is in the fully extended position (e.g., for flight), the hinge 410 may be locked in the fully extended position by inserting a locking pin 412 through locking pin holes 413 and the adjacent locking plates 414. The locking pins 412 may include a retaining mechanism such as spring-loaded retaining balls or the like, to prevent the locking pins 412 from pulling out during operation.

In some embodiments, instead of or in addition to being foldable, the mounting members 402, 404 may also permit the rotor blades 142 to be removed from the mounting members 402, 402 in a manner that retains the alignment of the rotor blades 142 when they are reinserted. For example, the rotor blades 142 may be slidably mounted along one or more rails disposed within the mounting brackets 406. Each mounting bracket 406 may include a release button which, when depressed, permits a rotor blade 142 within the mounting bracket 406 to slide outward to be removed. In some embodiments, the mounting brackets 406 and/or the mounting members 402, 404 may include a bayonet-type mounting system which maintains the appropriate alignment between opposing rotor blades 142. Bayonet-type mounting systems will be described in greater detail with reference to FIGS. 25 and 26.

FIGS. 19 and 20 illustrate the folded configuration of mounting members 402, 404. As shown in FIGS. 19 and 20, the removal of the locking pins 412 from the mounting members 402, 404 allows the locking plates 414 to move away from the locking pin holes 413, allowing the mounting members 402, 404 to fold at the hinges 410 into a folded configuration. In the folded configuration, both mounting brackets 406 and rotor blades 142 attached to each mounting member 402, 404 are substantially parallel. Thus, a two-bladed or four-bladed central rotor 140 can be transported within a relatively narrow rectangular container having a length only slightly longer than each of the rotor blades 142. This folding configuration is substantially more efficient than transporting the central rotor 140 in a flight configuration, which would require a container having two perpendicular dimensions of at least twice the length of each rotor blade 142. Moreover, in some cases it may be desirable to fold the central rotor 140 while the central rotor 140 remains attached to the aircraft 100. The folding mechanism described herein permits the two or four rotor blades 142 to be folded upward such that the horizontal footprint of the aircraft 100 may be minimized while it is being stored on the ground.

Figure 21:
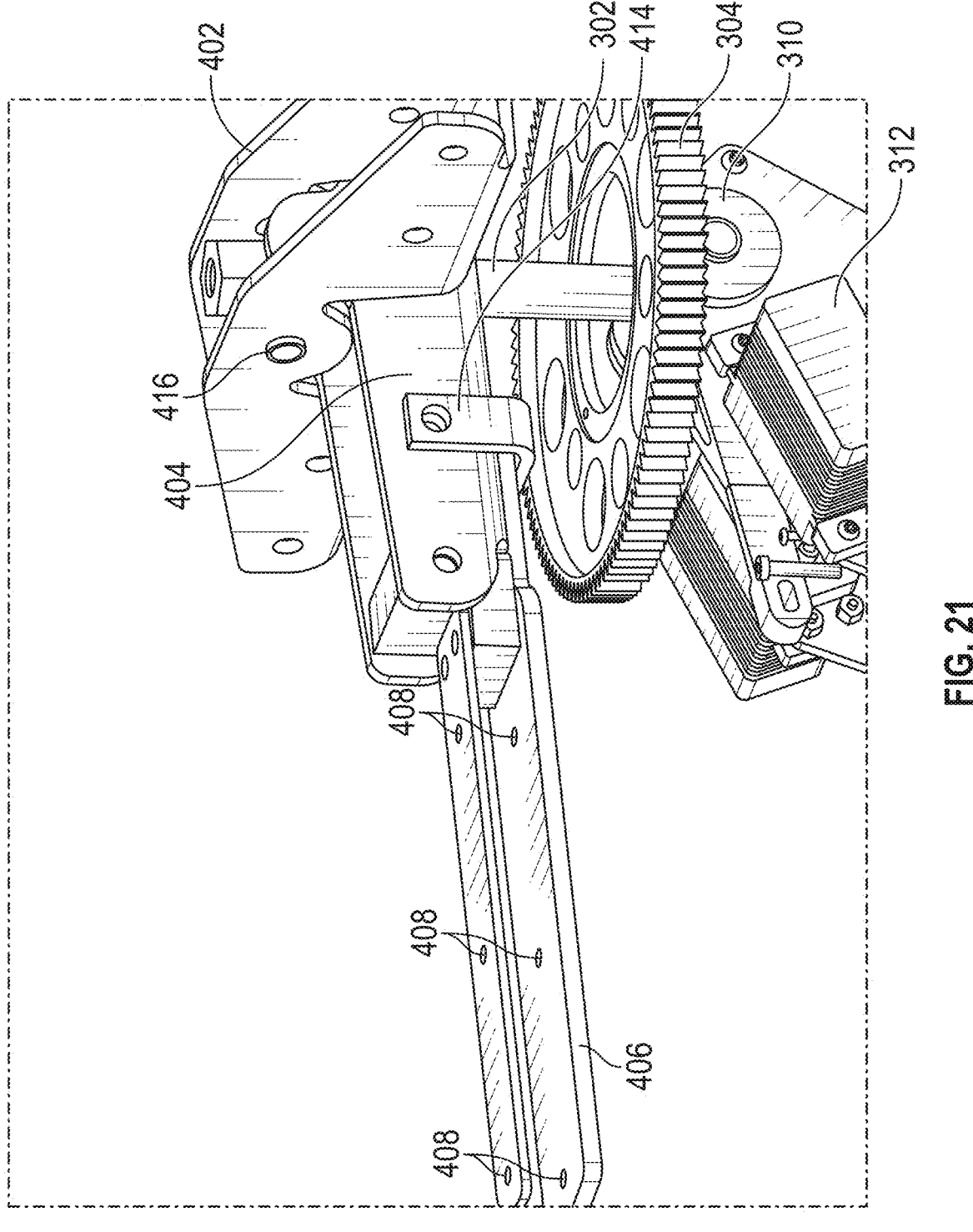
FIG. 21 depicts a partial isometric view of the upper rotor hub assembly of FIGS. 16-20 coupled to the lower rotor hub of FIGS. 11-15.
Figure 22:
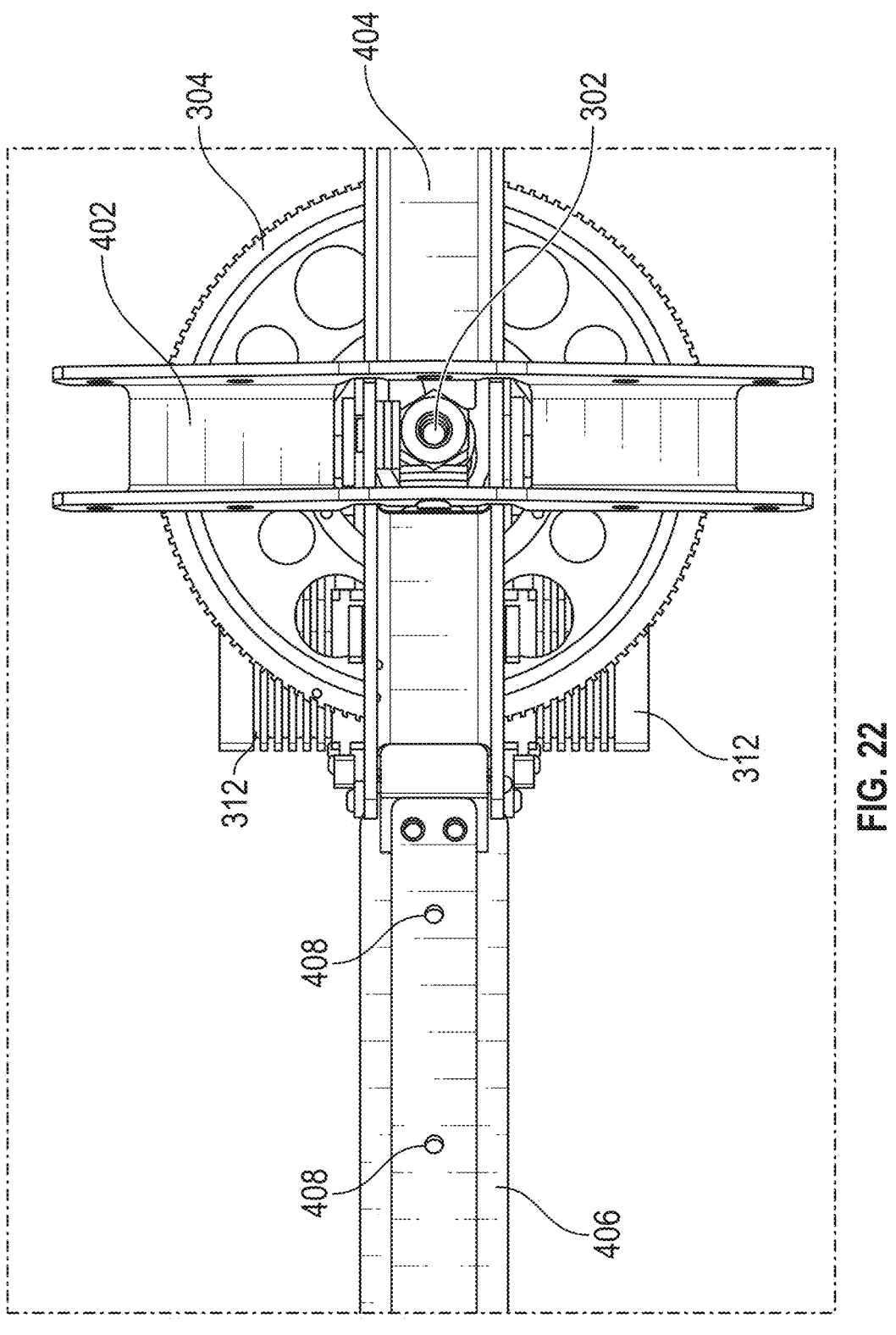
FIG. 22 depicts a partial top view of the upper rotor hub assembly of FIGS. 16-20 coupled to the lower rotor hub of FIGS. 11-15.

FIGS. 21 and 22 depict the upper rotor hub assembly 400 of FIGS. 16-20 coupled to the lower rotor hub 300 of FIGS. 11-15. Each mounting member 402, 404 is coupled to the lower rotor hub 300 by a mounting pin 416 passing through the mounting pin holes 405 of the mounting member 402, 404 and the mounting pin holes 303 of the lower rotor hub 303. Similar to the locking pins 412 that lock the mounting members 402, 404 in the fully extended position, the mounting pins 416 may include a retaining mechanism such as spring-loaded retaining balls or the like, to prevent the mounting pins 416 from pulling out during operation.

Figure 23:
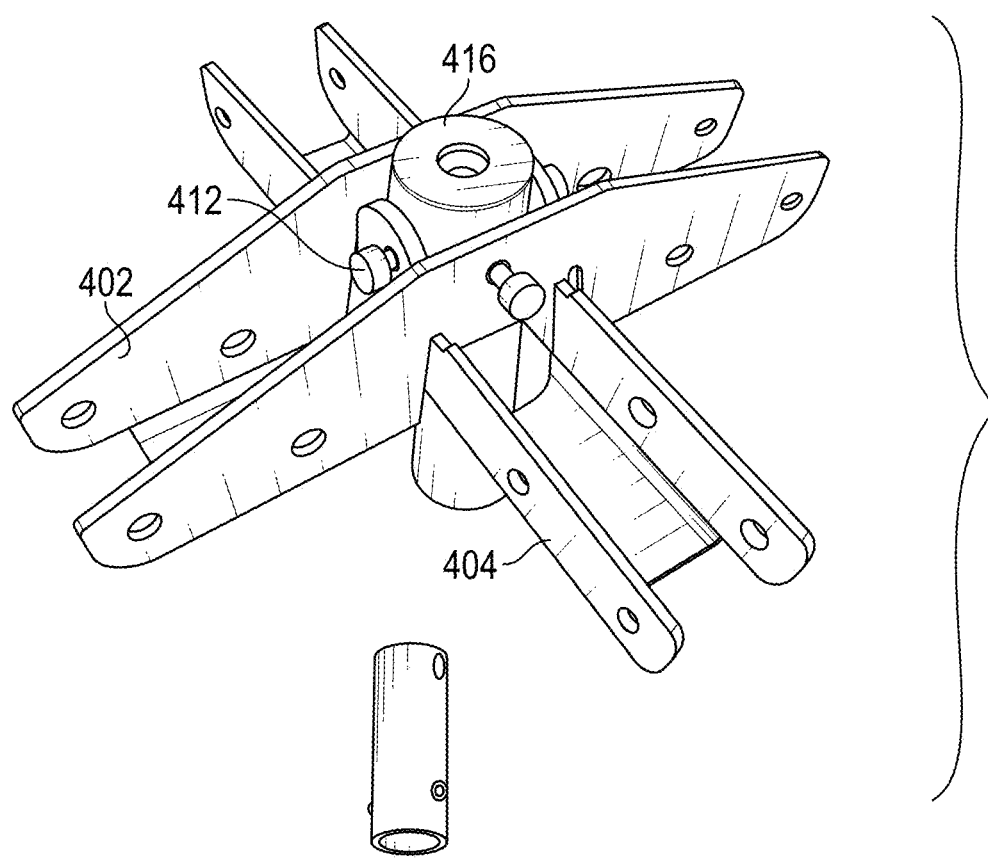
FIG. 23 depicts a perspective view of a portion of an upper rotor hub assembly in accordance with some embodiments.
Figure 24:
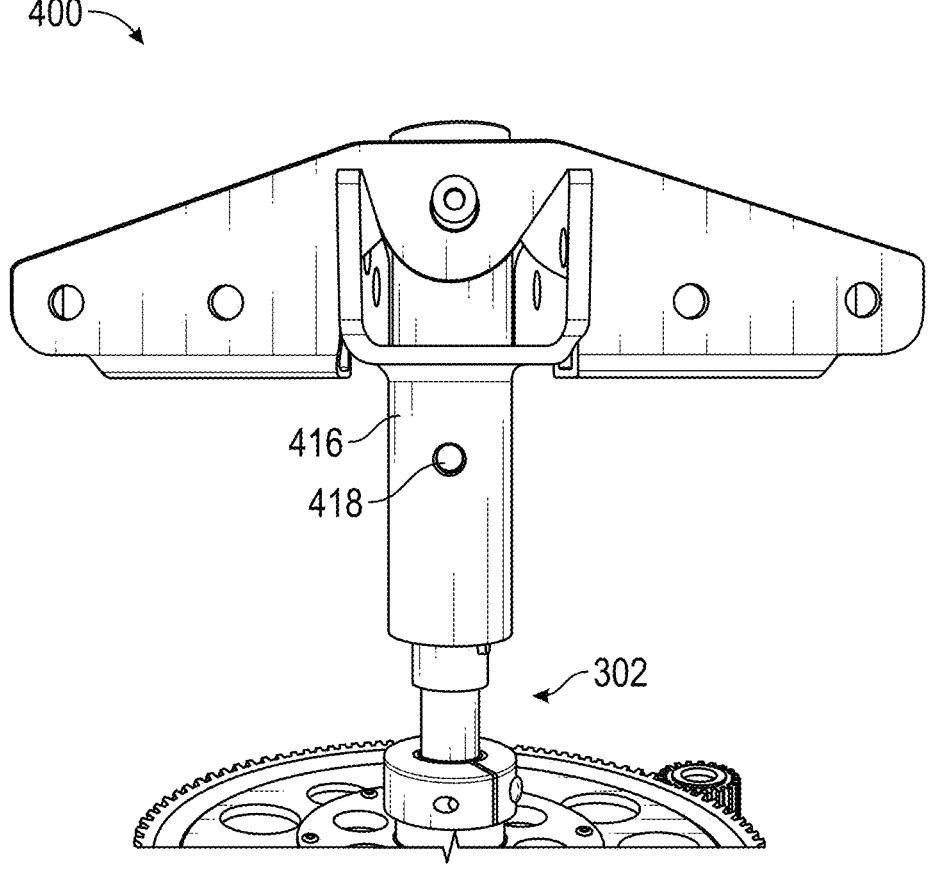
FIG. 24 depicts a side view of the portion of an upper rotor hub assembly of FIG. 23 coupled to the lower rotor hub of an example aircraft.

FIGS. 23 and 24 illustrate a further example configuration of an upper rotor hub assembly 400. The example upper rotor hub assembly 400 of FIGS. 23 and 24 further includes an upper rotor hub 416 which serves as a removable attachment point for the mounting members 402, 404. The mounting members 402, 404 may be coupled to the upper rotor hub 416 such as by similar mounting pins 412. In some embodiments, the mounting pins 412 coupling the mounting members 402, 404 to the upper rotor hub 416 may be permanent or semi-permanent pins, rather than the easily removable pins of FIGS. 16-22.

As shown in FIG. 24, the upper rotor hub 416 may in turn be connected to the rotor mount shaft 302 of the lower rotor hub by a further mounting pin 418, which may similarly include spring-based or other retaining elements configured to be quickly releasable. Thus, the entire upper rotor mount hub assembly 400 may be folded and subsequently removed from the aircraft by removing a single mounting pin 418.

Figure 25:
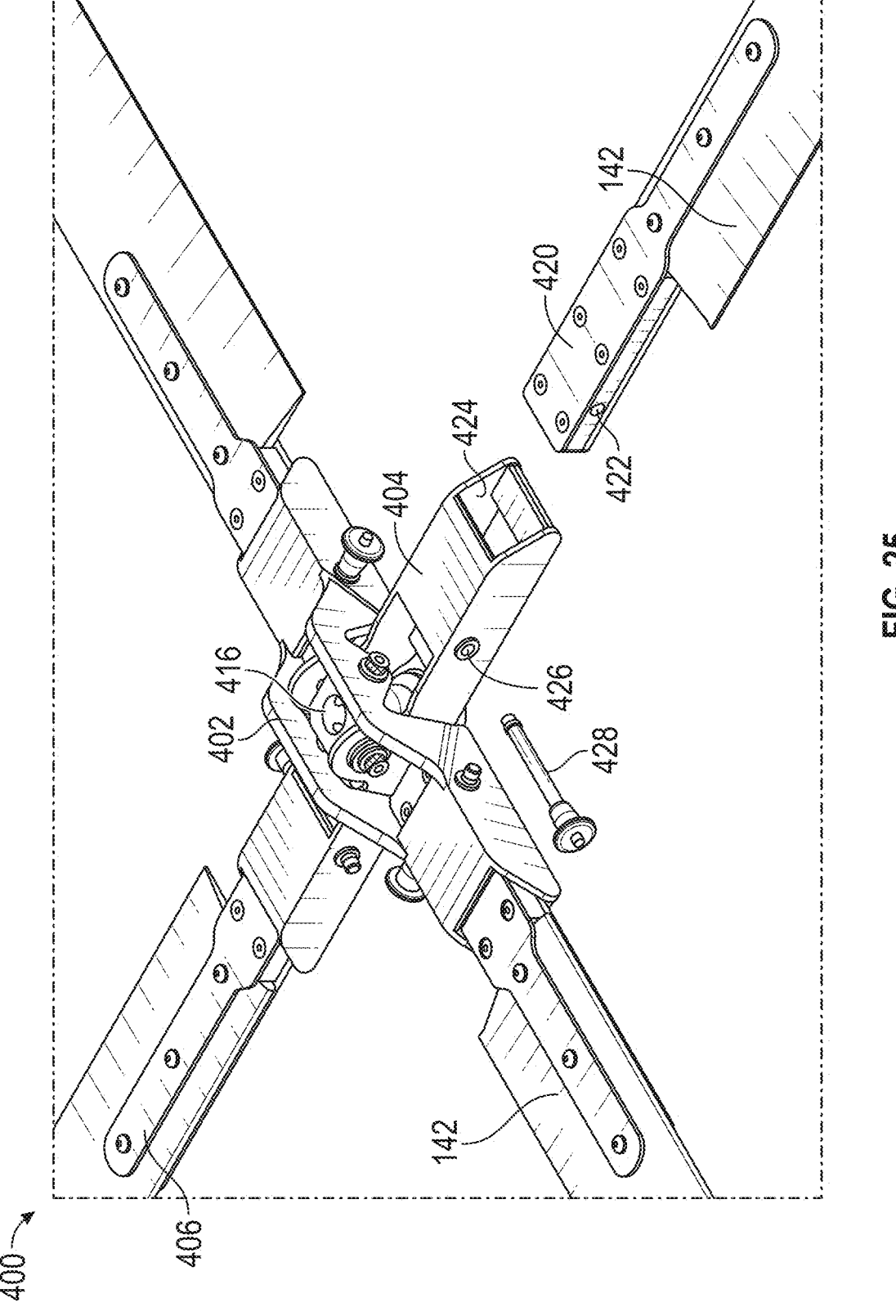
FIGS. 25 and 26 depict an example embodiment of an upper rotor hub assembly with a bayonet-type blade mounting system.
Figure 26:
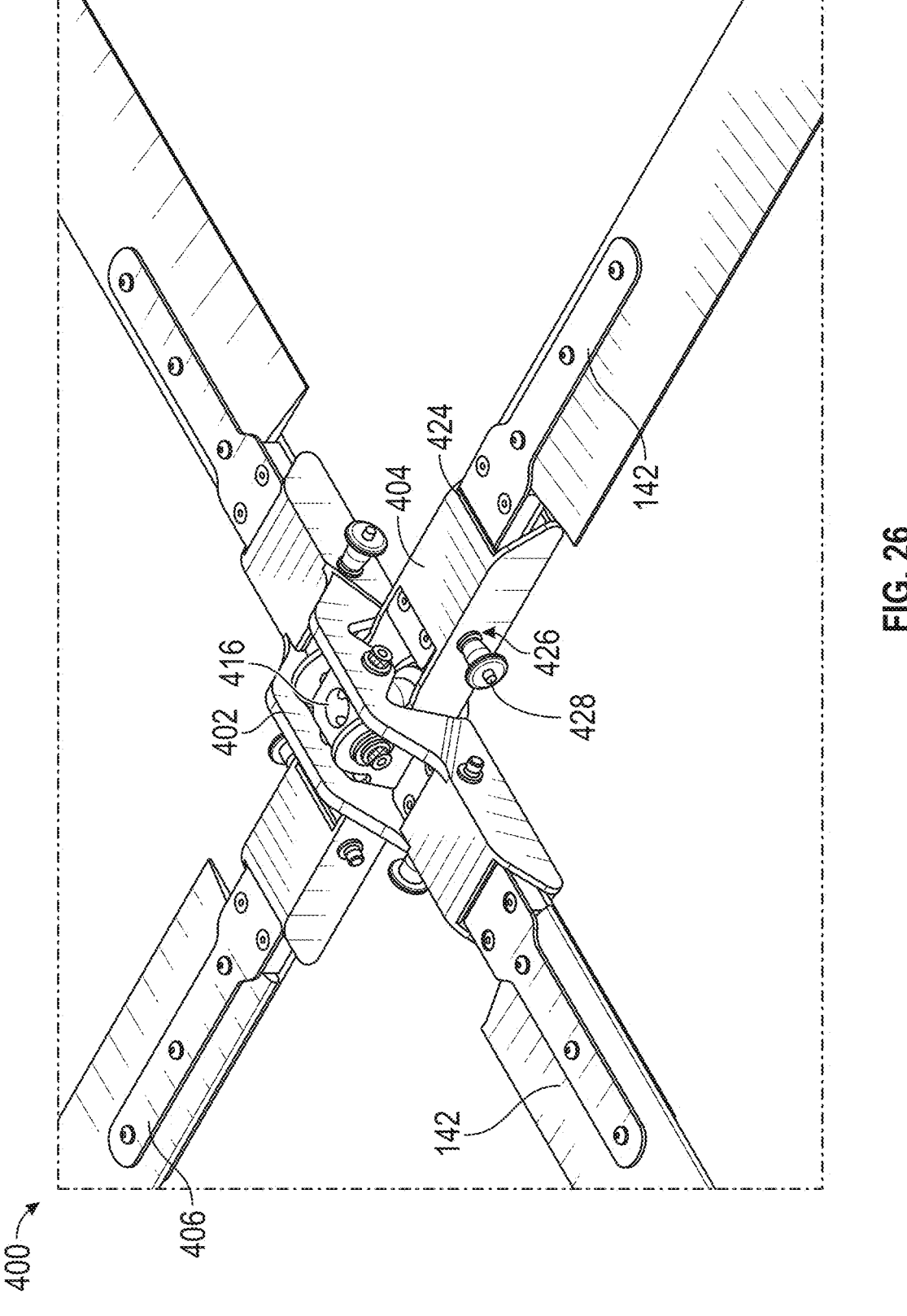

FIGS. 25 and 26 illustrate a further example configuration of an upper rotor hub assembly 400 in which a bayonet-type mounting system allows the rotor blades 142 to be attached and detached from the upper rotor hub assembly 400. Similar to the configuration of FIGS. 23 and 24, the upper rotor hub assembly 400 of FIGS. 25 and 26 includes two mounting members 402, 404 attached to an upper rotor hub 416. Each rotor blade 142 is mounted to a mounting bracket 406 by two, three, or more fasteners. Each mounting bracket 406 is fixed to a mounting body 420, a portion or all of which may be integrally formed with the mounting bracket 406. A blade attachment pin hole 422 extends laterally through the mounting body 420.

Each opposing end of each mounting member 402, 404 includes a mounting body opening 424 sized and shaped to receive a mounting body 420. Additional blade attachment pin holes 426 extend laterally through the sides of the mounting members 402, 404. Thus, as illustrated by the transition from FIG. 25 to FIG. 26, each rotor blade 142 may be mounted by sliding the mounting body 420 into a mounting body opening 424 until the blade attachment pin holes 422 are substantially aligned with blade attachment pin holes 426. A blade attachment pin 428 may then be inserted through the blade attachment pin holes 422, 426 to secure the rotor blade 142 to the upper rotor hub assembly 400. Dismounting of the blades, such as for storage, transport, etc., may be accomplished by removing the blade attachment pin 428 from the blade attachment pin holes 422, 426 and subsequently sliding the mounting body 420 out of the mounting body opening 424.

As described above, it is typically desirable for the rotor to have a positive blade pitch when operating in vertical powered flight, such as in a hover or VTOL phases of flight. In contrast, when autorotation is used, such as in forward flight of a gyroplane, it is desirable for the rotor blades to have a flat or zero pitch, or a substantially less positive pitch than in vertical flight. Accordingly, some embodiments of the present technology include rotor assemblies configured to selectively change the pitch angle of the rotor blades while maintaining the teetering motion desirable for low-pitch forward flight. Advantageously, the embodiments disclosed herein accomplish blade pitch control without requiring the weight and complexity of a swashplate as is typically utilized for blade pitch control in helicopters.

Figure 27:
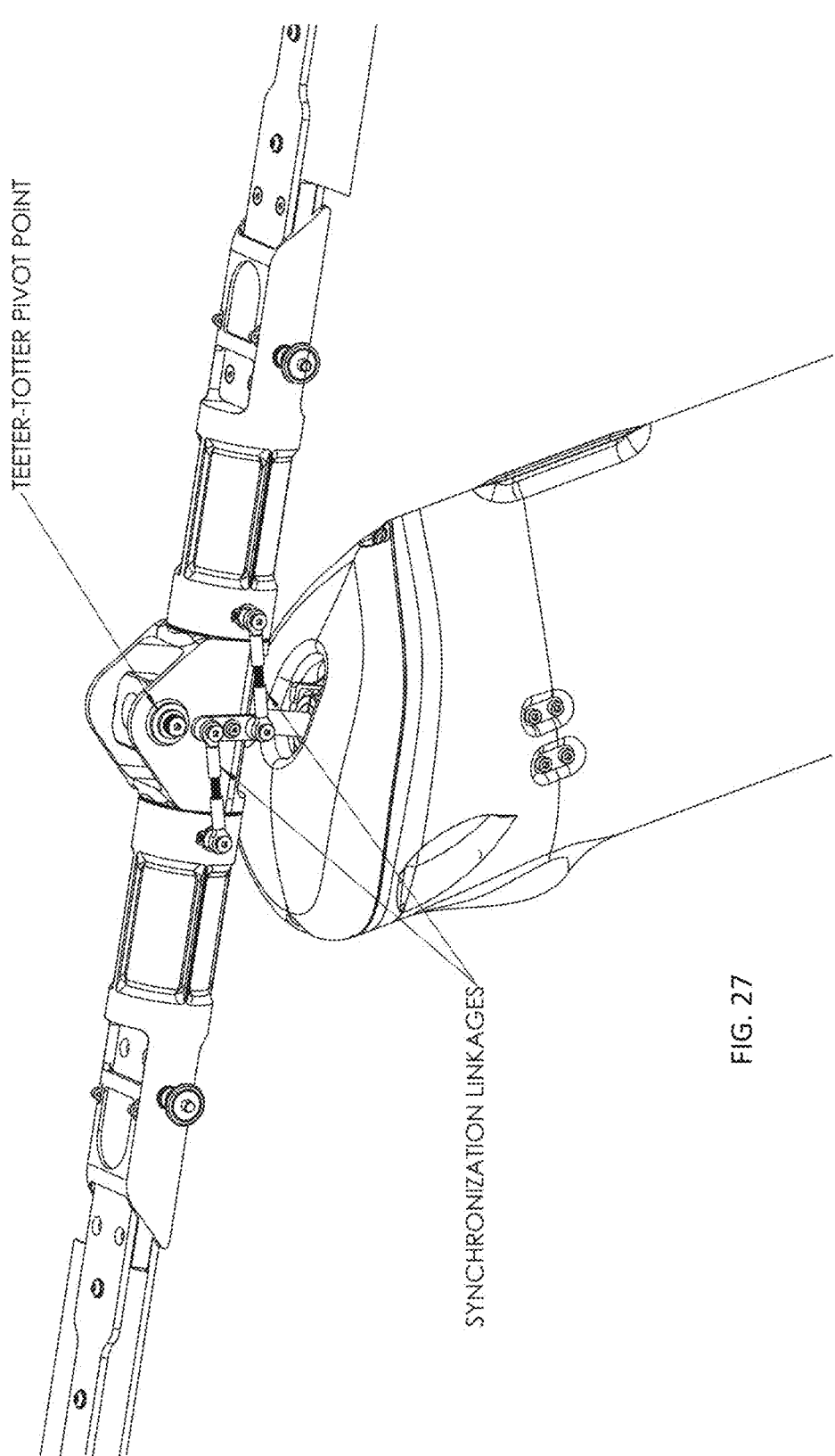
FIG. 27 depicts an example embodiment of a rotor hub assembly including a teetering pivot point.
Figure 28:
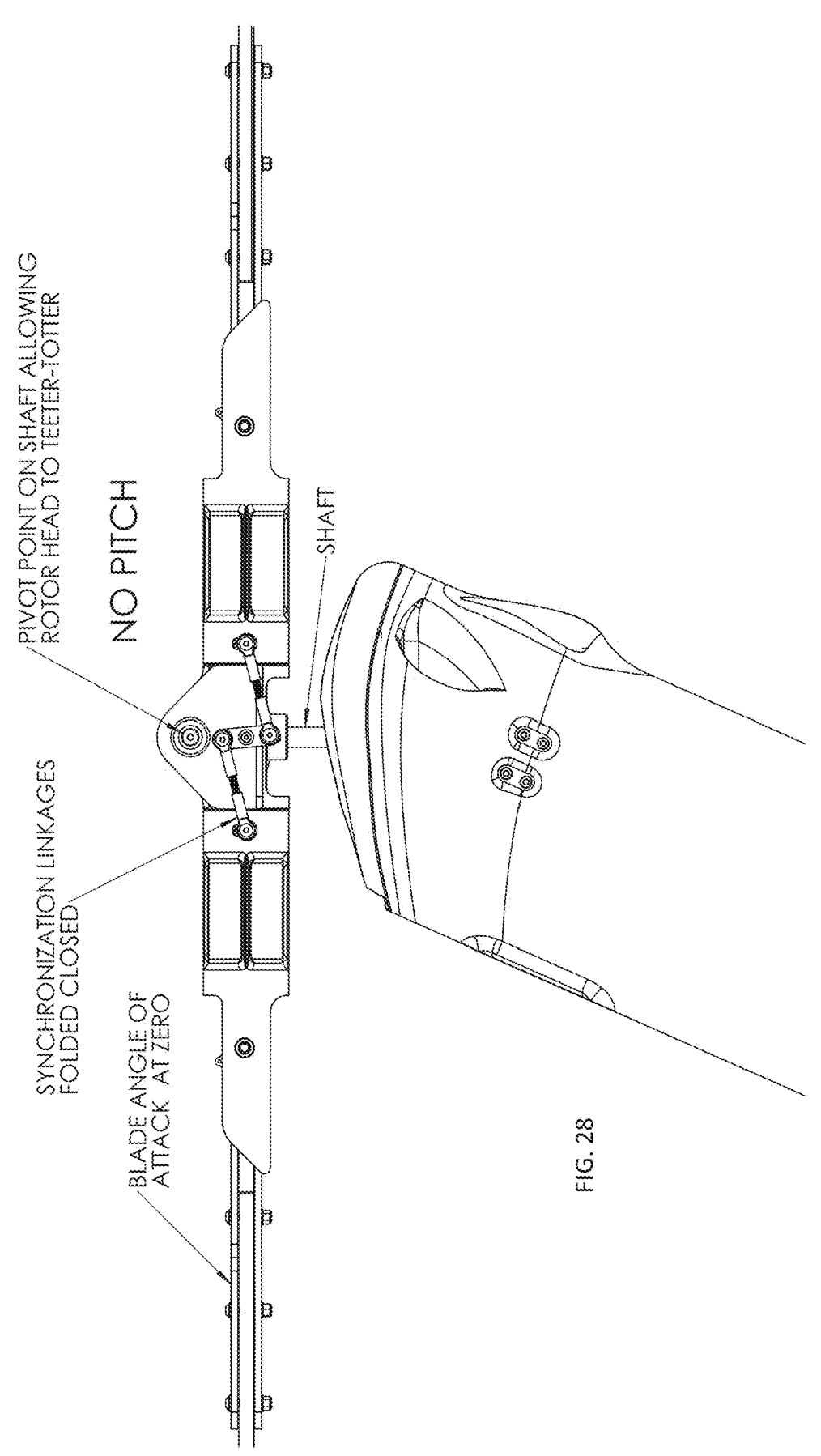
FIGS. 28 and 29 illustrate side and cross-sectional views of the rotor hub assembly of FIG. 27 in a zero pitch configuration.
Figure 29:
Figure 30:
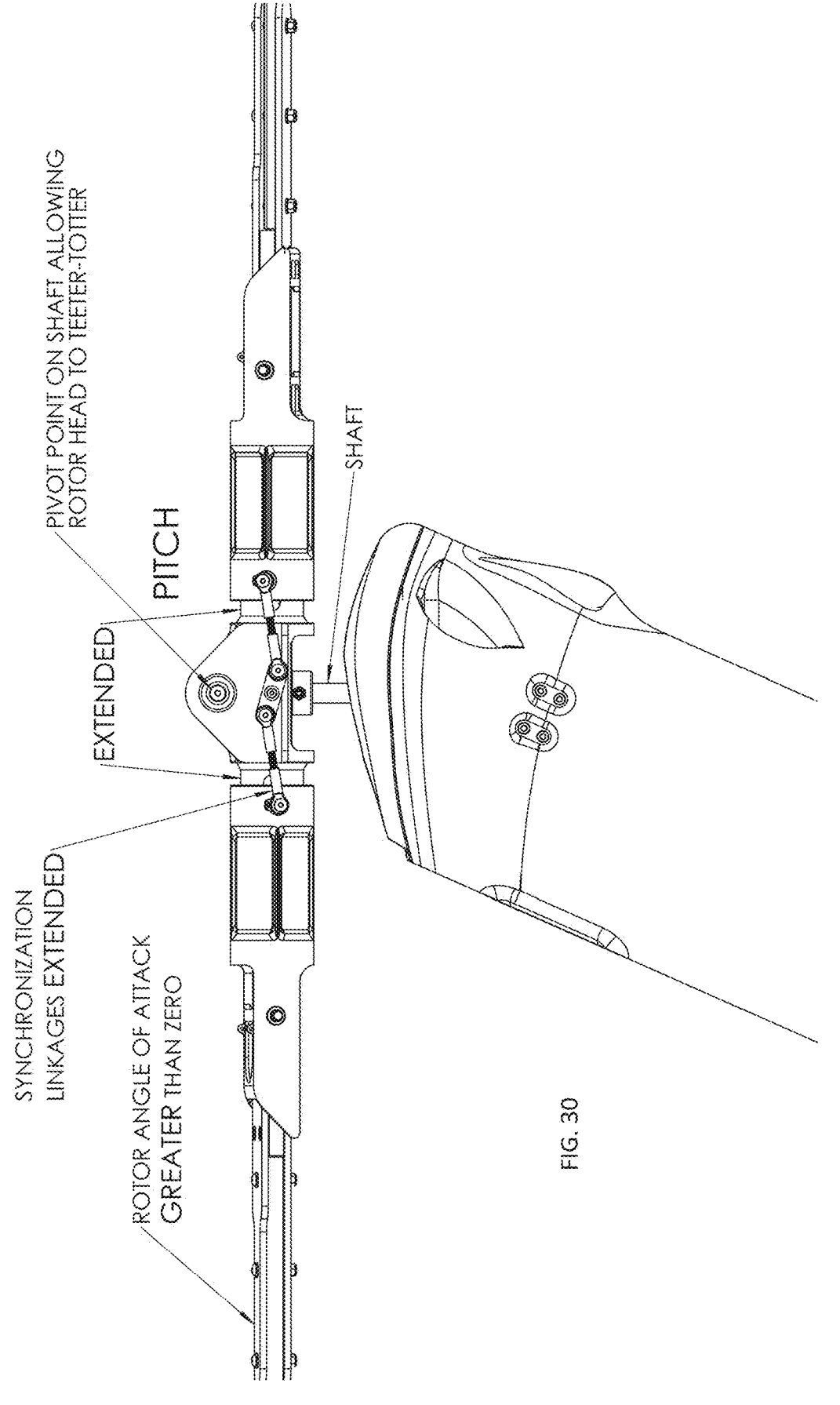
FIGS. 30 and 31 illustrate side and cross-sectional views of the rotor hub assembly of FIGS. 27-29 in a positive pitch configuration.
Figure 31:
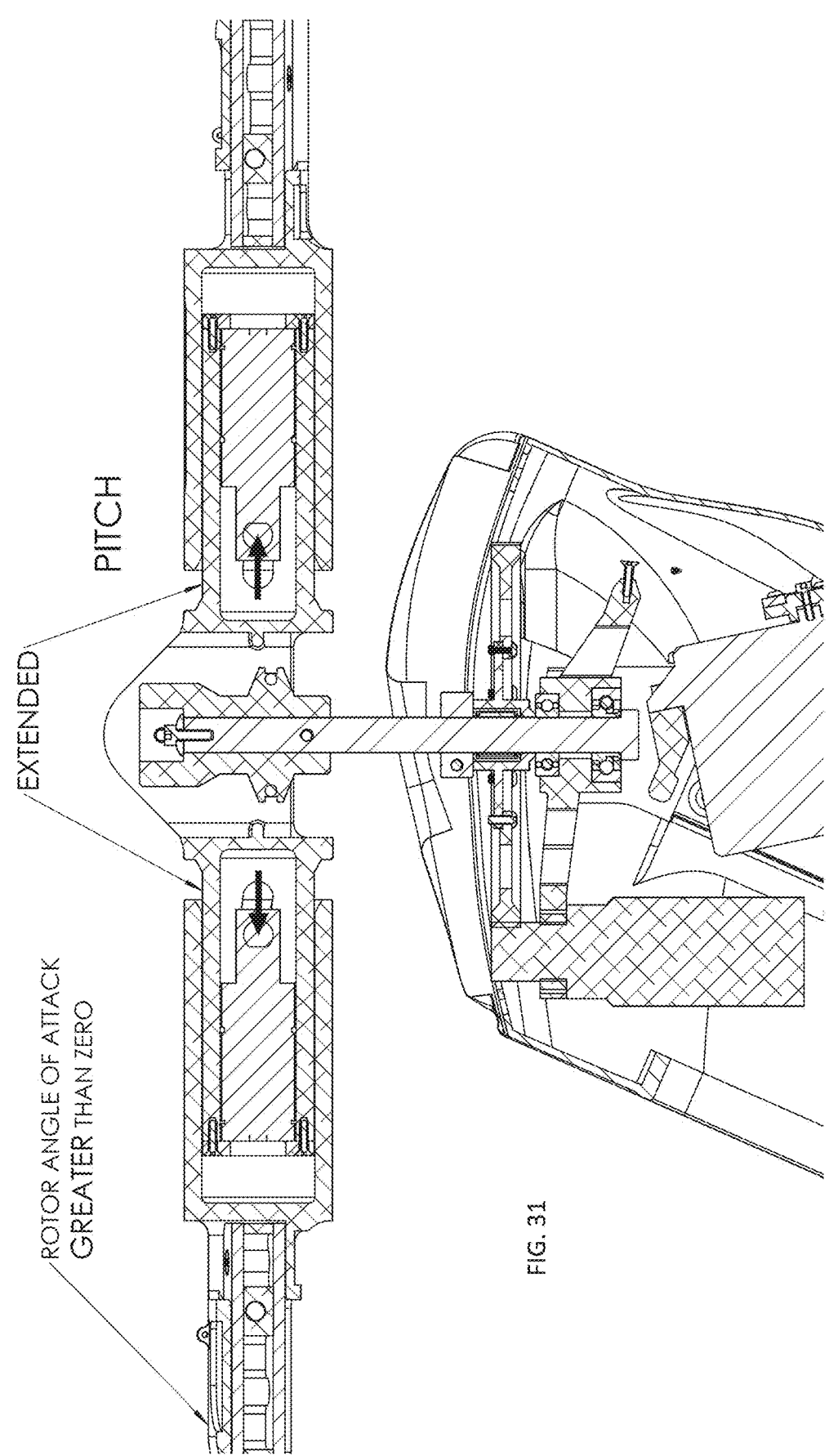
Figure 32:
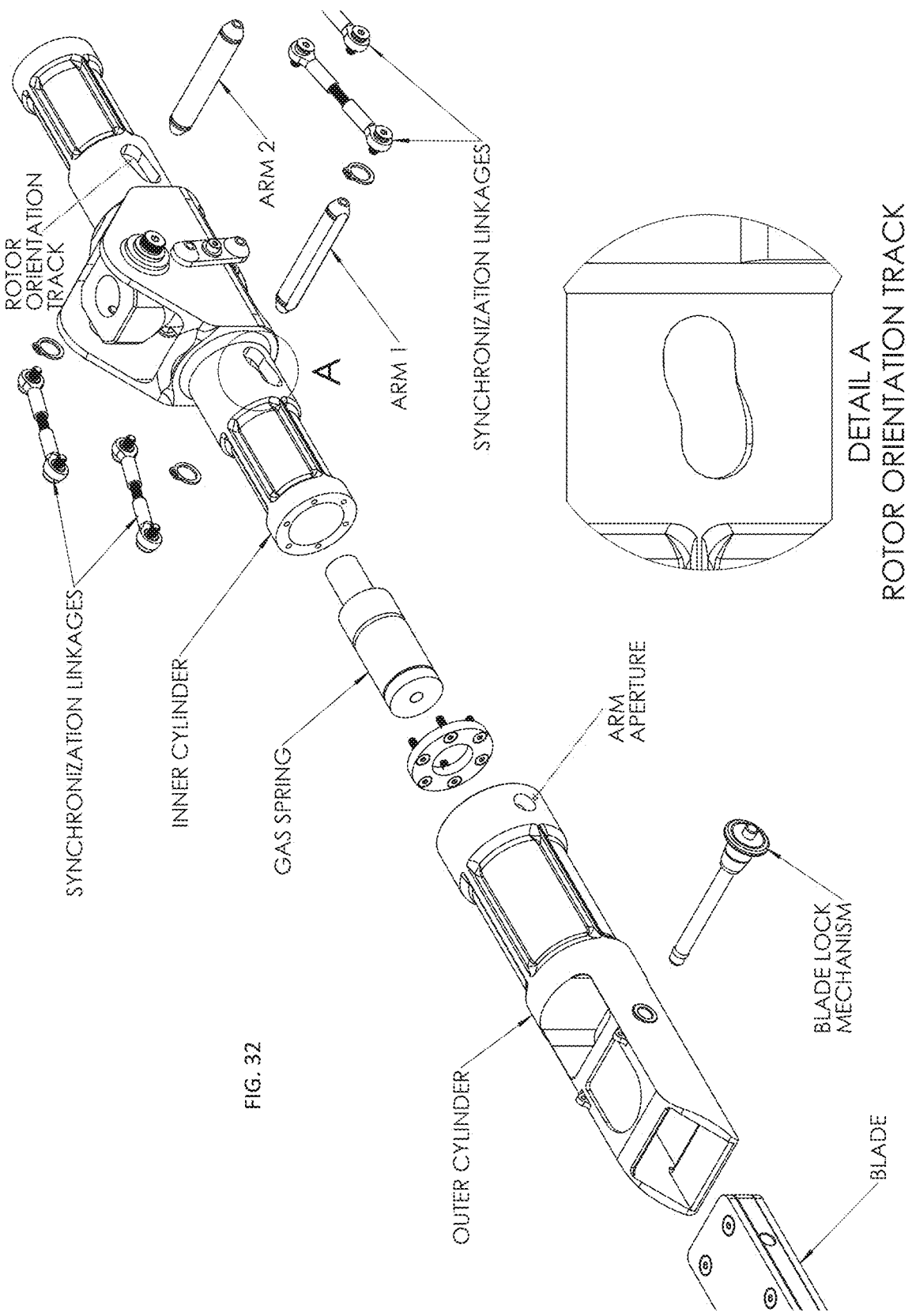
FIG. 32 depicts an exploded view of the rotor hub assembly of FIGS. 27-31.

FIG. 27 depicts an example embodiment of a rotor hub assembly including a teetering pivot point and synchronization linkages for controlling the pitch of the rotor blades. FIGS. 28 and 29 illustrate side and cross-sectional views of the rotor hub assembly of FIG. 27 in a zero pitch configuration. FIGS. 30 and 31 illustrate side and cross-sectional views of the rotor hub assembly of FIGS. 27-29 in a positive pitch configuration. FIG. 32 depicts an exploded view of the rotor hub assembly of FIGS. 27-31. The rotor assembly illustrated in FIGS. 27-32 may be implemented in conjunction with any of the aerial vehicles disclosed herein.

In order for a gyrocopter rotor assembly to generate upward thrust, the pitch of the blades is increased from zero or approximately zero to a selected pitch angle greater than zero. Additionally, the rotor is turned at an RPM that will generate enough thrust to lift the weight of the aircraft and payload. FIGS. 28 and 29 illustrate the assembly with the rotor blades being at a zero-degree pitch, and FIGS. 30 and 31 illustrate the assembly with the rotor blades being at a higher pitch that creates lift.

As shown in FIGS. 28, 30, and 32, the rotor head assembly includes a teetering pivot point attached to the rotating shaft, such that the rotor head can teeter freely during forward flight. The rotor head assembly further includes synchronization linkages connecting the two opposing arms of the rotor head that holds the two rotor blades. These linkages synchronize the movement of the two arms as they slide out and twist to create the desired pitch.

Each arm of the rotor assembly includes an outer cylinder configured to retain a removable rotor blade, as described in greater detail with reference to FIGS. 25 and 26, and an inner cylinder sized and shaped to at least partially fit within the outer cylinder. A biasing element such as a gas spring is disposed between an end backstop of the inner cylinder and an inward-facing surface of the outer cylinder arm. The outer cylinder arm is connected on both ends to the synchronization linkages via arms 1 and 2 extending through arm apertures in the outer surface of the outer cylinder. Each arm passes through the two arm apertures of the corresponding outer cylinder and the two rotor orientation tracks of the corresponding inner cylinder, and is coupled at each end to an outer end of a synchronization linkage.

Advantageously, the rotor assembly mechanism of FIGS. 27-32 can provide for automatic adjustment of blade pitch based on the rotational speed of the rotor assembly, without requiring a servo or other control mechanism to adjust the blade pitch. For example, the gas spring and associated components can cause the blade pitch to increase automatically at higher RPM, and to decrease automatically at low RPM. The gas spring is rated to collapse at a certain pound force. Thus, as the rotational speed of the rotor increases in a powered vertical flight mode, the corresponding increase in centrifugal force causes the gas spring to at least partially collapse, letting the outer cylinder slide outwards. As the outer cylinder slides outward, the slope of the rotor orientation tracks causes the outer cylinder and attached rotor blade to twist, creating a desired pitch for the blade. The synchronization linkages simultaneously slide outwards and twist to the desired pitch for lift generation, and maintain an equal or substantially equal blade pitch between the two blades. As the RPM is subsequently reduced, the outer cylinders slide inwards through the assistance of the two gas springs, bringing the blade angle back to zero as arms 1 and 2 slide within the rotor orientation tracks, allowing the gyrocopter to fly forward with the aid of the pusher motor/propeller assembly or, in any of the various embodiments including two laterally mounted tiltable or non-tiltable proprotors (e.g., proprotors 136l, 136r), allowing the gyrocopter to fly forward with the aid of the left and right proprotors.

In some embodiments, the gas spring may be configured to collapse when a predetermined outward force (e.g., radially outward from the center of the rotor assembly toward the blade) is applied. The predetermined force may be selected, based at least partially on the mass of the outer cylinder and blade, such that the outer cylinder collapses and increases the rotor blade pitch at a predetermined range of rotational speeds. In one particular example, the predetermined force is selected such that a lower RPM range, such as 250-450 RPM, does not create sufficient centrifugal force to collapse the gas spring outward, while a higher RPM range, such as above 550 RPM, creates sufficient centrifugal force to cause the gas spring to remain collapsed. The aircraft may thus be controlled to operate with the main rotor turning at 450 RPM or slower while in horizontal flight, and with the main rotor turning at 550 RPM or faster while in vertical or hovering flight. In some embodiments, the aircraft may be configured to avoid operating for extended periods with the main rotor turning at speeds in an intermediate or safety RPM range (e.g., between 450 RPM and 550 RPM in the particular example above) at which the centrifugal force created by the rotor blades and outer cylinders may be great enough to partially collapse the gas spring, but may not be sufficient to fully collapse the gas spring.

Figure 33:
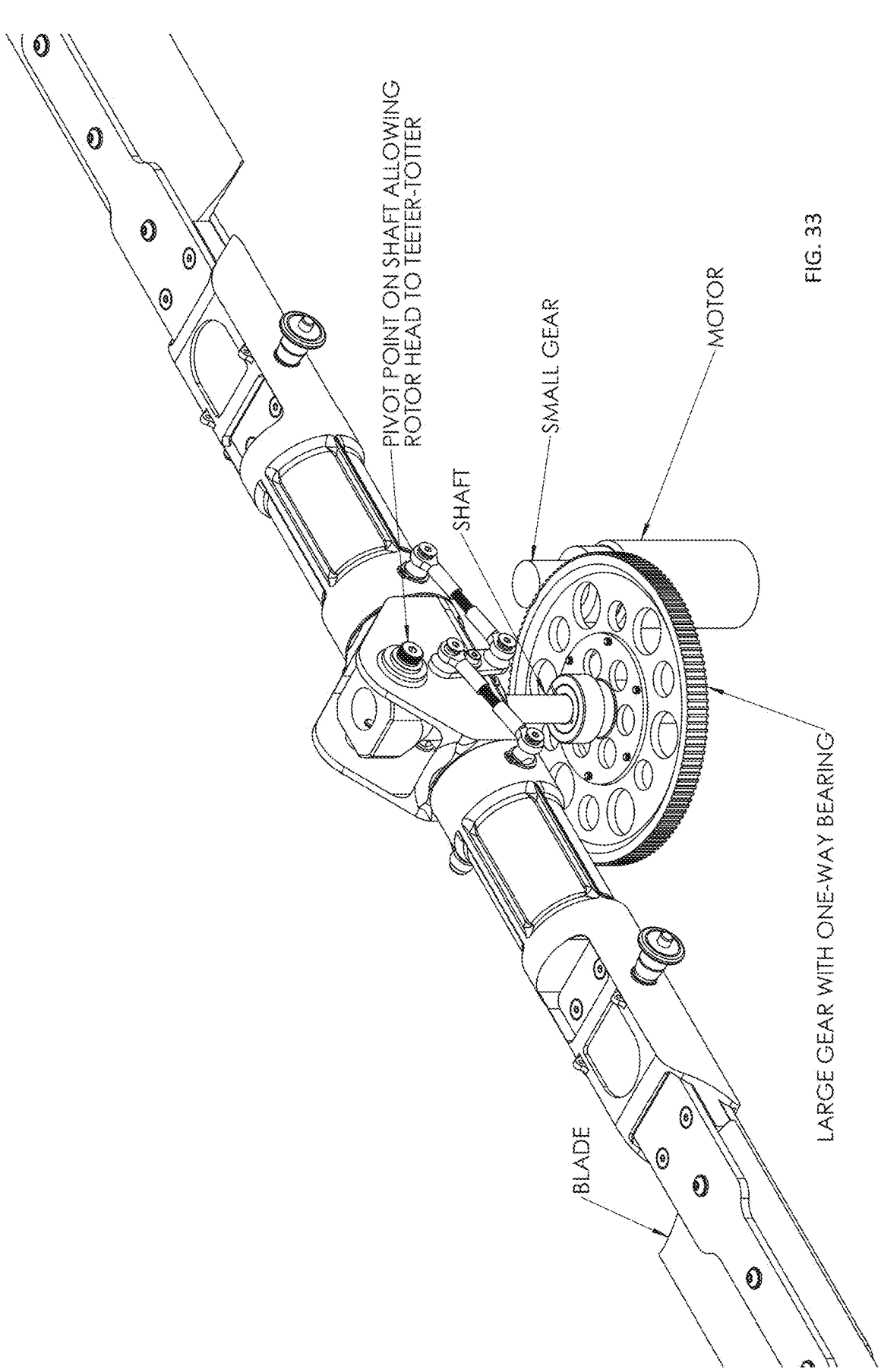
FIG. 33 illustrates an example gearing system for turning the upper rotor hub assembly of FIGS. 27-32.
Figure 34:
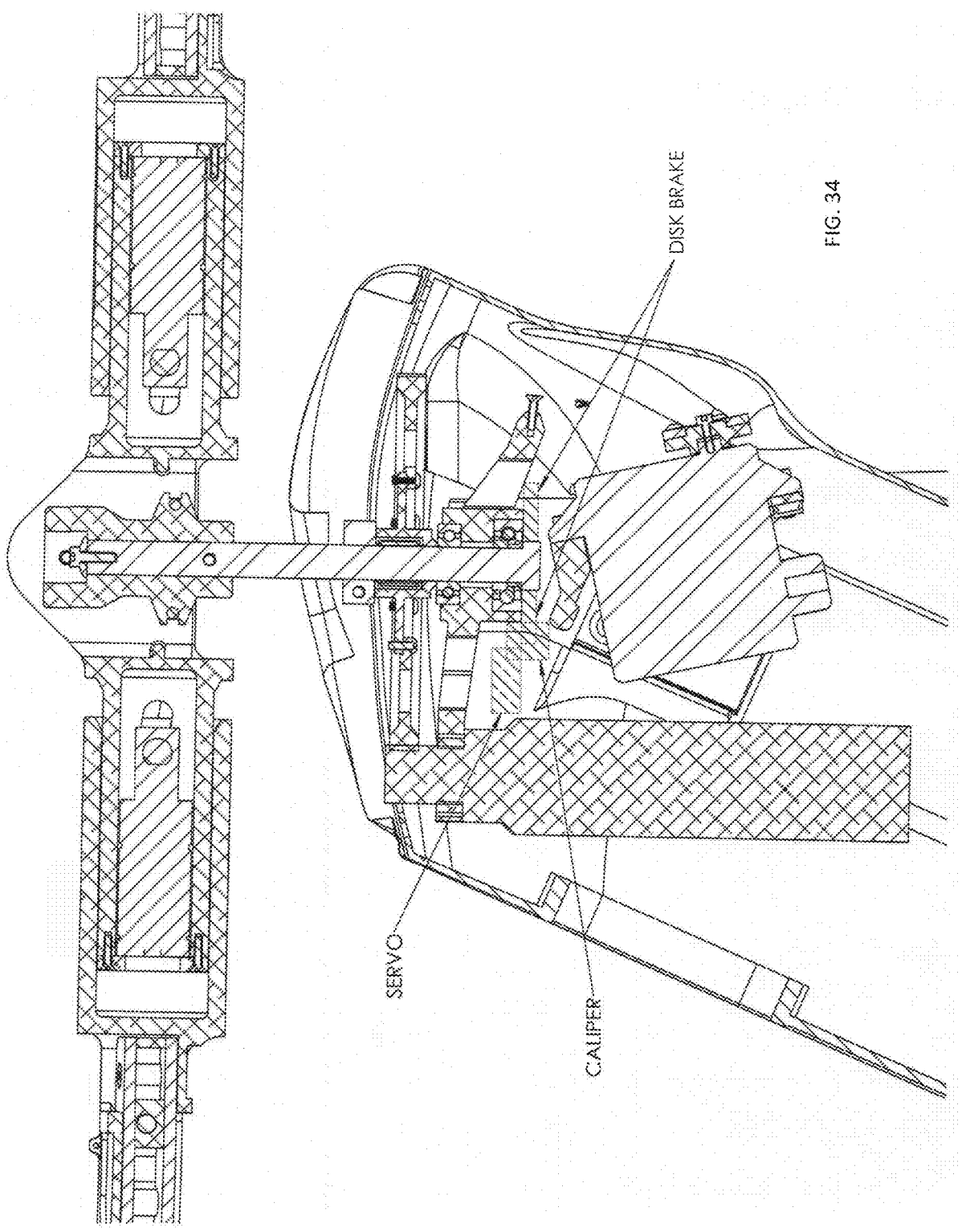
FIG. 34 is a cross-sectional view illustrating a braking system for reducing the rotational speed of the upper rotor hub assembly of FIGS. 27-32.

Consistent with the automatic control of blade pitch based on rotor RPM, it may be desirable to increase and decrease the rotational speed of the rotor on command. In addition, it may be desirable to increase or decrease rotor RPM during flight in order to achieve desirable or optimized flight characteristics. FIG. 33 illustrates an example gearing system for increasing the RPM of the upper rotor hub assembly of FIGS. 27-32. FIG. 34 is a cross-sectional view illustrating a braking system for reducing the rotational speed of the upper rotor hub assembly of FIGS. 27-32.

As shown in FIG. 33, rotational speed of the rotor may be increased by a motor via a large gear having a one-way bearing, as described elsewhere herein. When that motor is powered and turns the rotor head and blades attached to the rotor head, it generates a significant torque that if not countered, will spin the aircraft uncontrollably. In order to avoid undesirable spinning, the two proprotors that are located on either side of the vehicle (e.g., as shown in FIGS. 1-4) at a specific CG (center of gravity) location, can operate independently at different speeds so as to offset the torque created by the rotor head assembly. The rotational speeds of the proprotors are variable in order to match the counter torque force required based on the torque created by the rotor head assembly. In some embodiments, depending on the amount of torque generated by the rotor head assembly, one proprotor (e.g., the left proprotor) may operate at up to full speed while the other proprotor operates at a lower RPM, at a full stop, or in a reversed direction, in order to fully counter the torque of the rotor head assembly. Thus, the two proprotors can be independently controlled to operate at different rotational velocities and/or in different rotational directions. In some embodiments, the other proprotor (e.g., the right proprotor) may even be rotated 180 degrees and operated at a suitable RPM to further provide counter torque. When the aircraft transitions to forward flight, the proprotors can transition to turn at the same RPM so as to provide stability and maneuverability during the horizontal phase of flight.

Referring now to FIG. 34, in order to slow down or control the rotor RPM, a disk brake is located at the bottom of the rotor shaft. The disk brake is coupled with a bracket that is part of the pivoting assembly bracket and which holds the brake pads, calipers, and brake servo. The calipers that hold the brake pads are activated by the brake servo and are activated at any time in order to slow down the rotor or assist in stopping it completely once the aircraft has landed safely. This bracket assembly allows the rotor head to move forwards and backwards as required for the desired flight mode.

Figure 35:
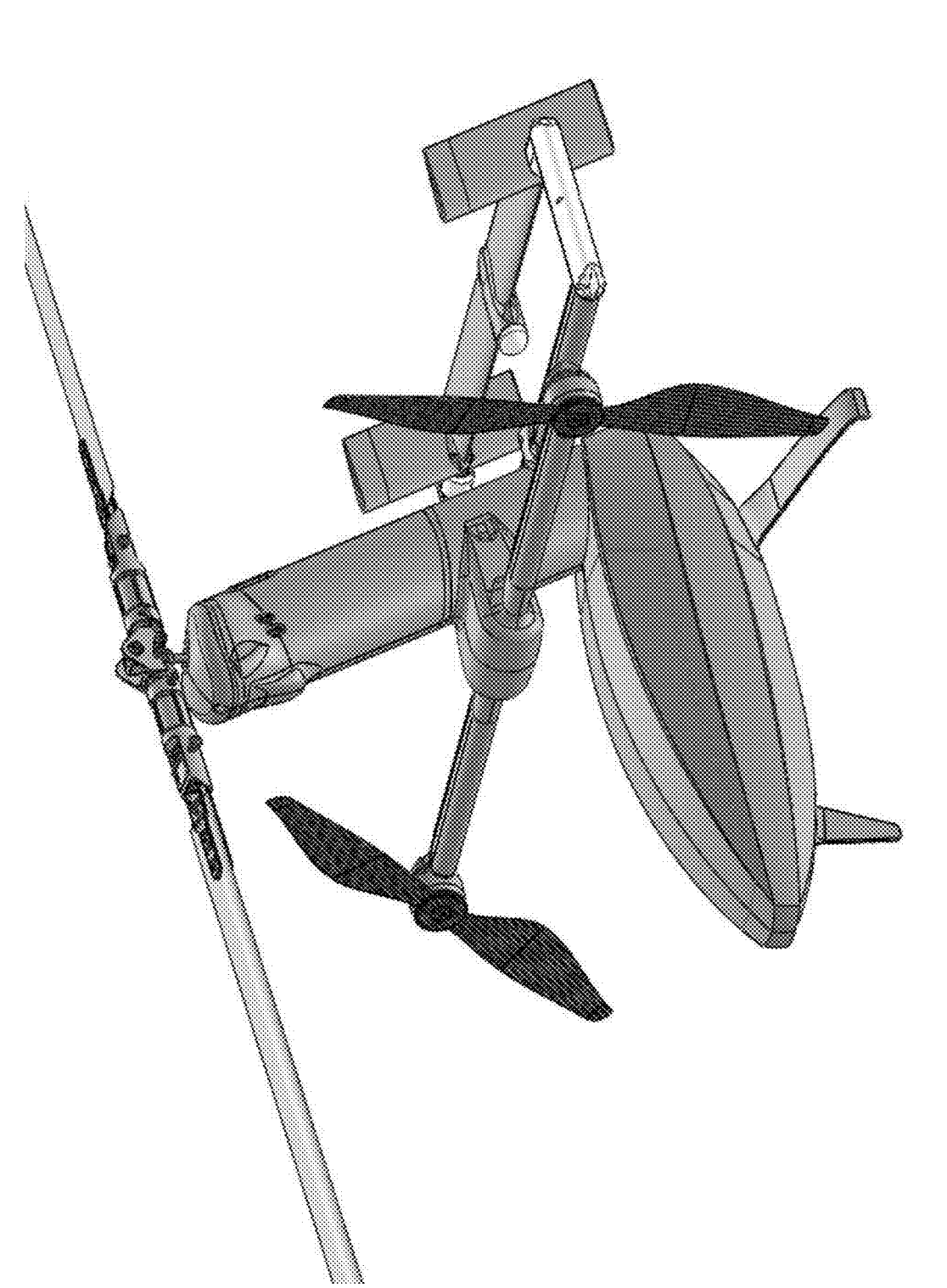
FIGS. 35-37 illustrate an example aircraft including a tiltable empennage.
Figure 36:
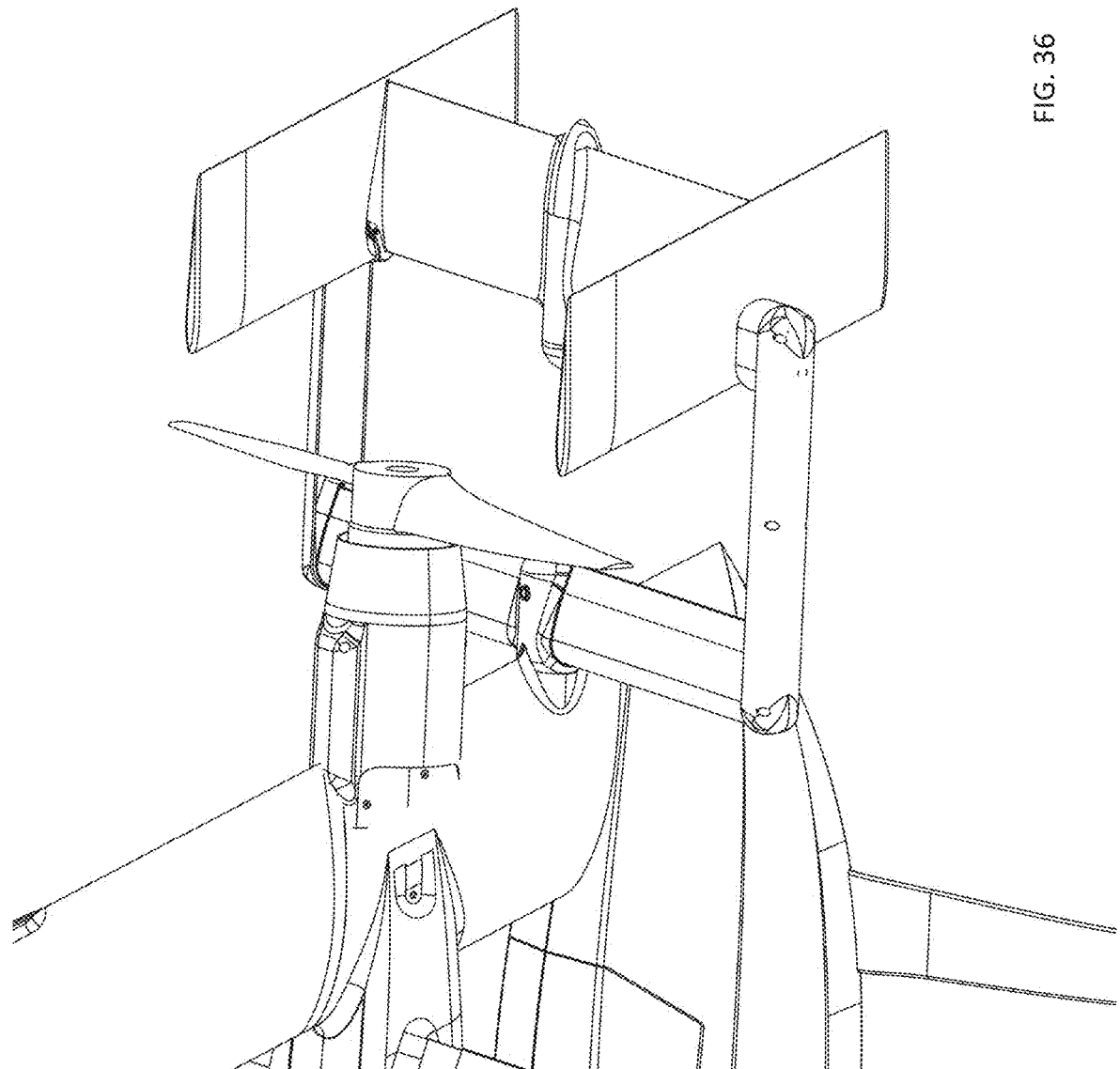
Figure 37:
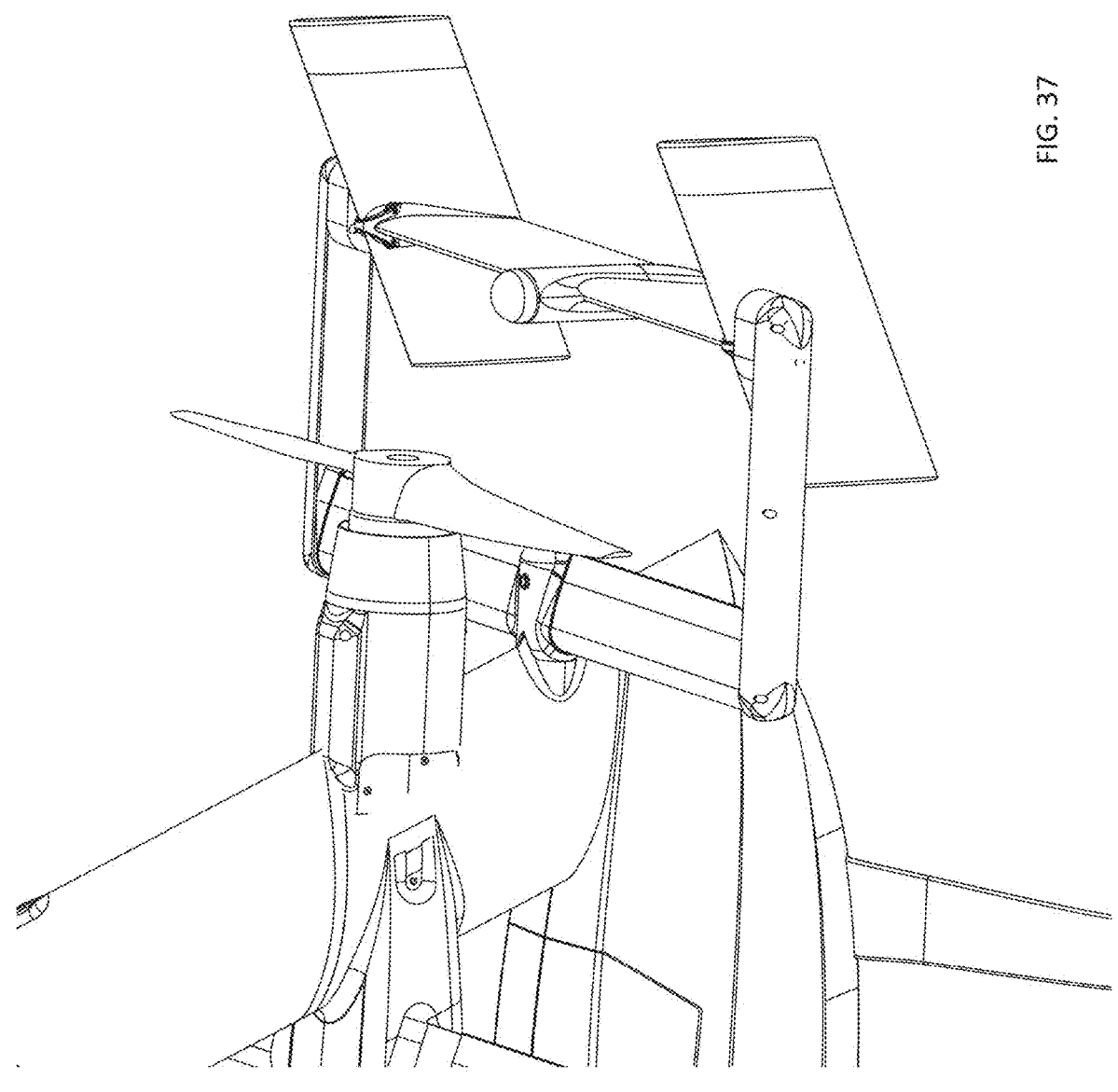

FIGS. 35-37 illustrate an example aircraft including a tiltable empennage. In some embodiments, the empennage, including the horizontal stabilizer and one or two rudders, are turned 90 degrees downwards during vertical flight, thereby streamlining the airflow created by the downwards thrust from the rotating blades of the main rotor. The empennage may be rotatable about a lengthwise axis of the horizontal stabilizer (e.g., a lateral axis with regard to the aircraft). FIGS. 35 and 36 illustrate the empennage in an upright position, such as for forward flight. FIG. 37 illustrates the empennage in a lowered position, tilted approximately 90 degrees forward or backward such that the horizontal stabilizer is oriented substantially within a vertical plane. Once the tail assembly is in the lowered position, it has two additional functions: First, by changing the angle of the stabilizer from 90 degrees plus/minus, it will move the gyrocopter forwards or backwards in a controlled manner. Second, the rudders allow for additional counter torque fine tuning and being able to turn the aircraft left or right. The down turned wings have the same capability but have the primary counter torque function. Moreover, the vertical orientation of the horizontal stabilizer in the lowered position reduces interference with the downward airflow created by the rotor, improving vertical and hover flight efficiency. The rotation of the tiltable empennage between upright and lowered positions may be actuated by an empennage tilt servo disposed within the aircraft.

FIGS. 38-41 illustrate a further example embodiment of an aerial vehicle including a single proprotor and pivotable wings configured to operate as control surfaces. The aerial vehicle of FIGS. 38-41 includes a central rotor and a single proprotor mounted to the mast so as to provide centerline thrust for the aerial vehicle. Independently pivotable wings are mounted at the sides of the mast. It will be understood that the single proprotor configuration of FIGS. 38-41 may be implemented with any of the aerial vehicle embodiments disclosed herein.

Figure 38:
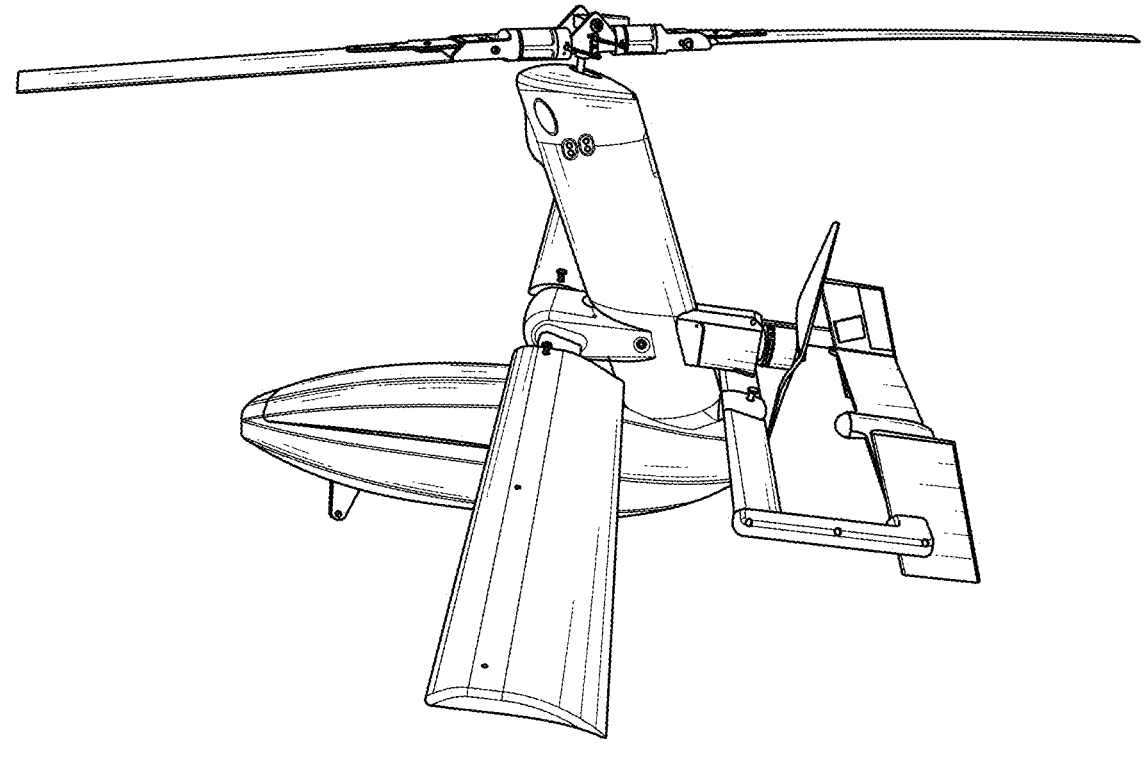
FIGS. 38-41 illustrate an example aircraft including a single proprotor and pivotable wings configured to operate as control surfaces.
Figure 39:
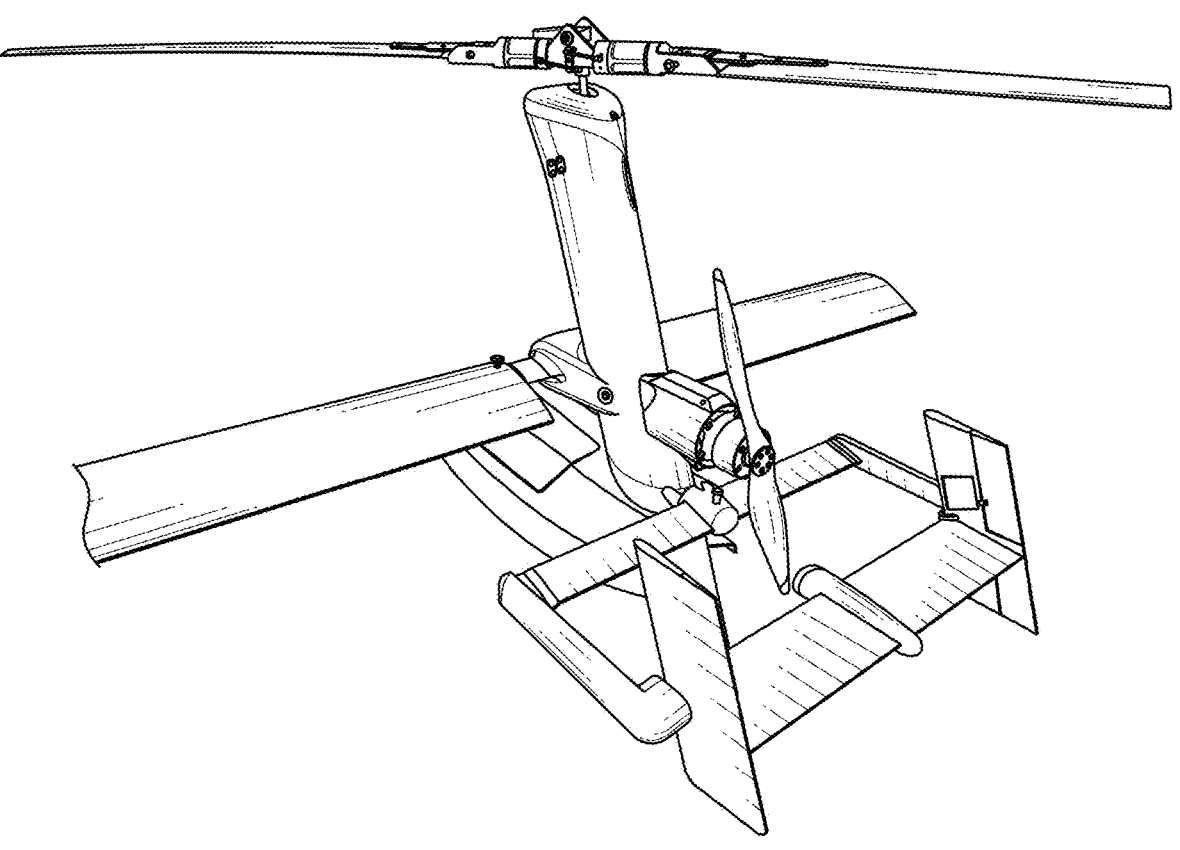

As shown in FIGS. 38 and 39, in horizontal forward flight, the two wings have substantially the same horizontal orientation such that the wings are streamlined for forward flight. In some embodiments, the wings may further be used for flight control functionality in forward flight, such as to provide a rolling or pitching moment.

Figure 40:
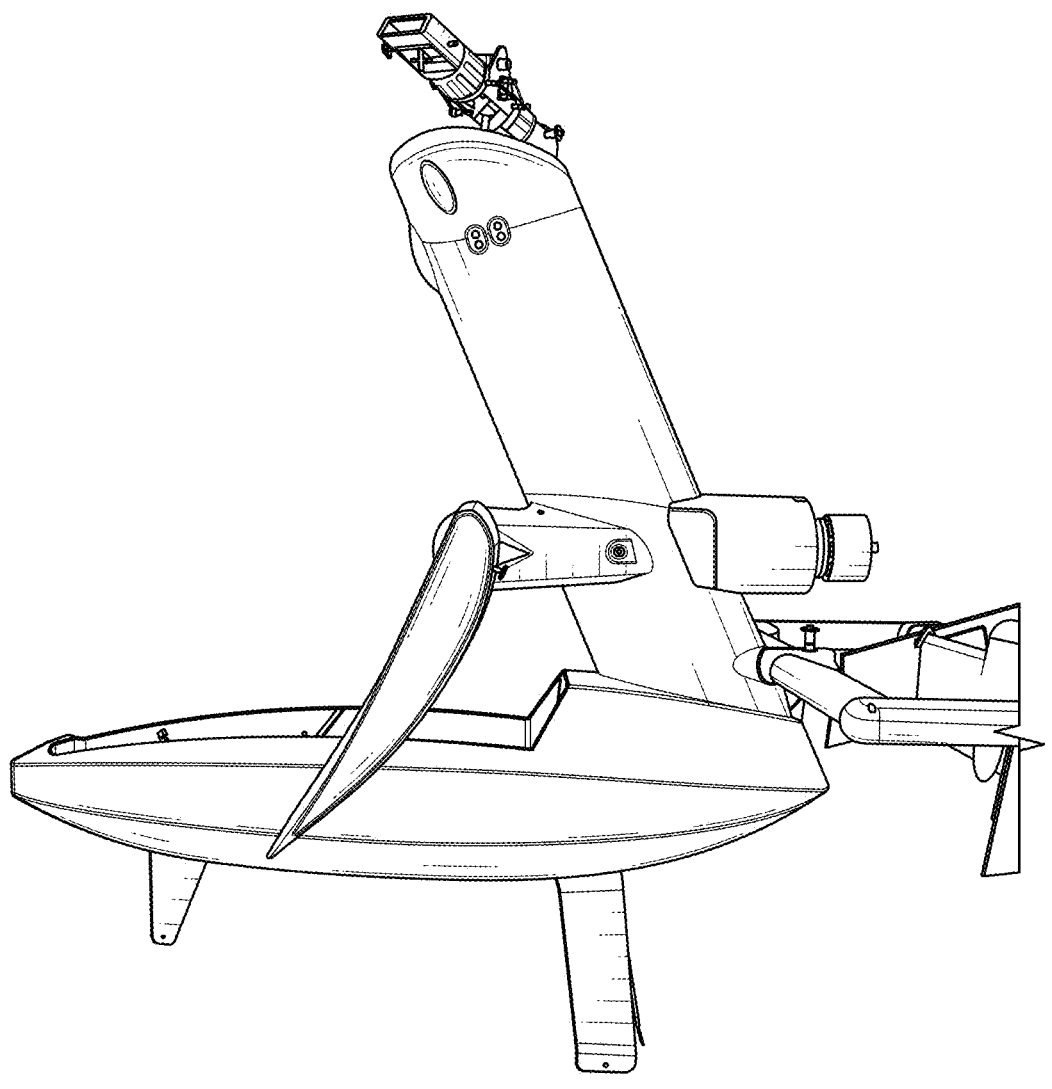
Figure 41:
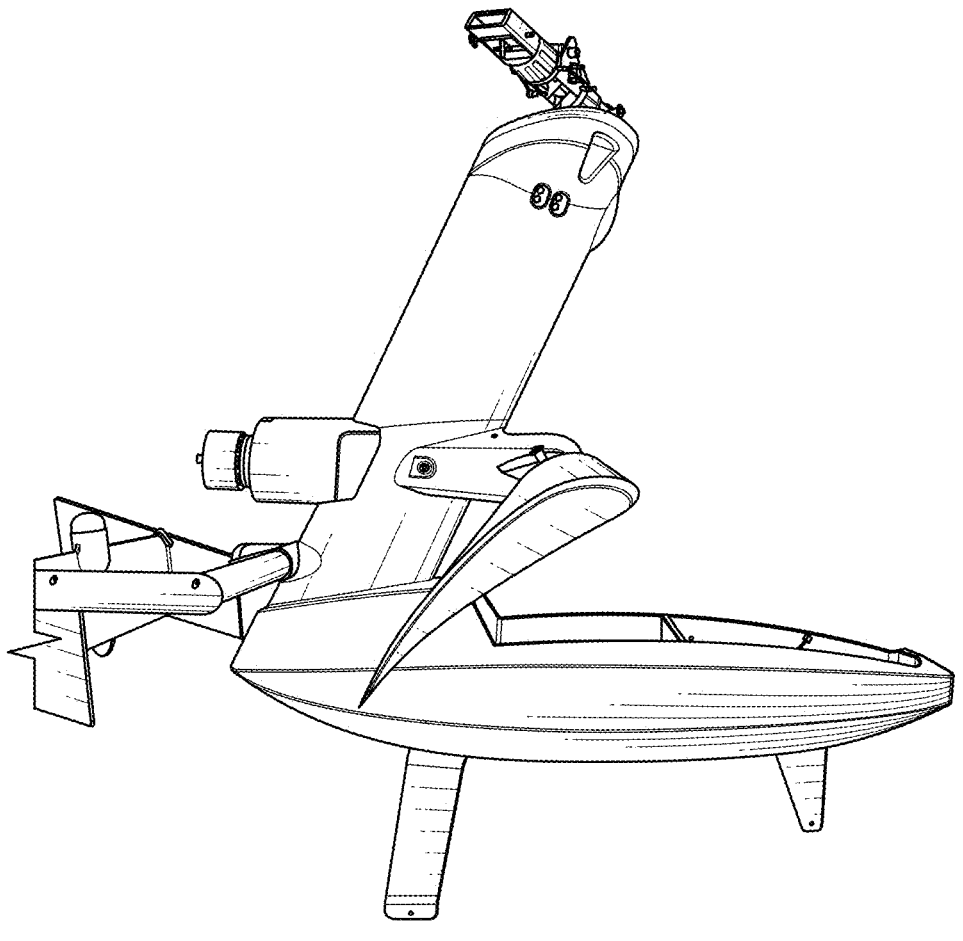

As shown in FIGS. 40 and 41, the two wings can be differentially positioned so as to provide a counter torque moment while the main rotor is powered in vertical or hovering flight phases. In this counter torque position, the left wing is pivoted by more than 90 degrees and the right wing is pivoted by less than 90 degrees, such that the left wing deflects the rotor downwash forward and the right wing deflects the rotor downwash aft. Thus, the counter torque configuration of FIGS. 40 and 41 creates a counter-clockwise torque that counters the clockwise torque created by the powered rotor.

Figure 42:
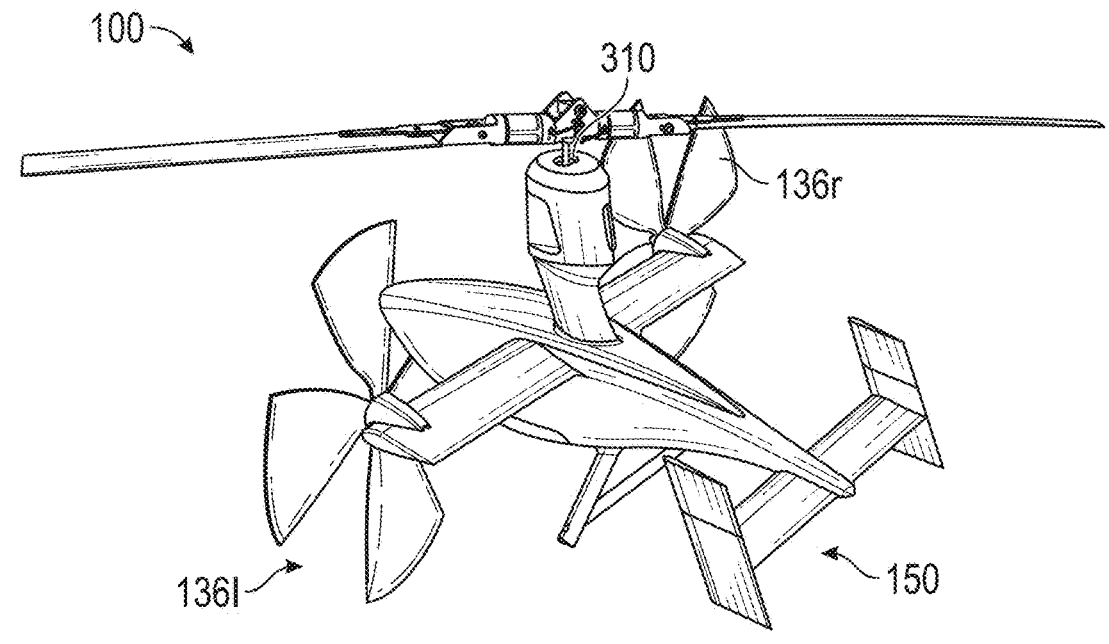
FIGS. 42 and 43 illustrate a further example configuration of an aircraft in accordance with the present technology.
Figure 43:
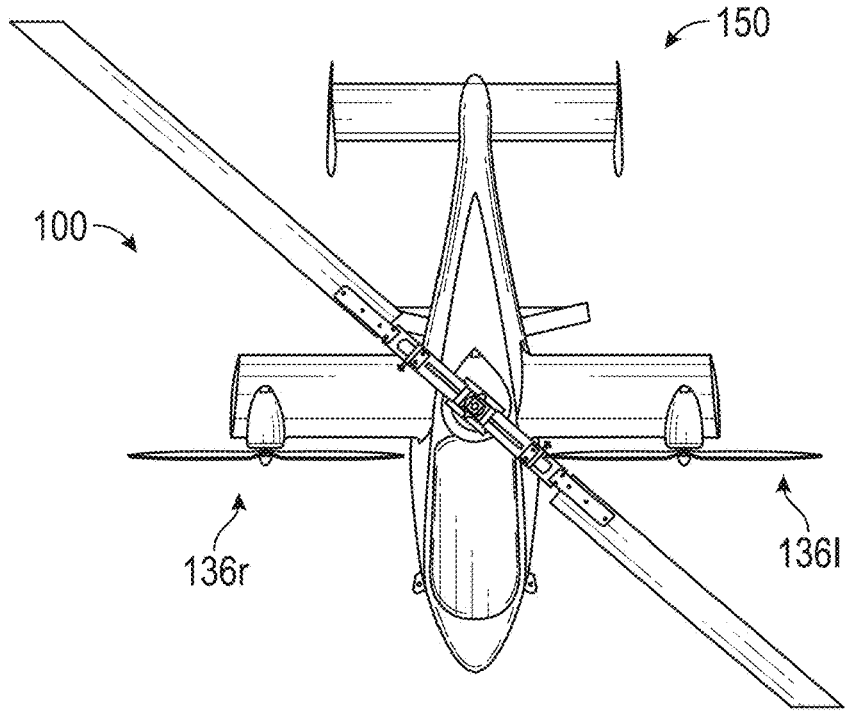

FIGS. 42 and 43 illustrate a further example configuration of an aircraft 100 in accordance with the technology described herein. As shown in FIGS. 42 and 43, the aircraft 100 includes side-mounted proprotors 136*l*, 136*r* in a fixed (e.g., non-tiltable) configuration. Empennage 150 is fixed relative to the aircraft 100 and can be free of control surfaces such as rudders or elevators. A tilt bearing 310 is configured to allow fore-aft tiling, lateral tilting, and/or a combination of fore-aft and lateral tilting of the central rotor. Motors driving the proprotors 136*l*, 136*r* may be configured to individually and/or differentially control the speed and/or rotational direction of proprotors 136*l*, 136*r*. For example, to create a yawing moment to counter the torque created by a clockwise-rotating central rotor, the left proprotor 136*l* may be powered to rotate in a first direction at a desired rotational speed to produce forward thrust while the right proprotor 136*r* is powered to rotate in a second direction opposite the first direction (e.g., a reversed rotational direction) at a desired rotational speed to produce reverse thrust, or is powered to rotate in the first direction at a lower rotational speed relative to the rotational speed of the left proprotor 136*l*, such that a rightward yawing moment is created. An opposite counter-torque scheme may be implemented for a counterclockwise-rotating central rotor. The variable rotational speeds and/or directions of the proprotors 136*l*, 136*r* may be controlled in coordination with fore-aft and/or lateral tilting of the central rotor at the tilt bearing 310 (e.g., under control of an autopilot or other control circuitry) to selectively control roll, pitch, yaw, and thrust of the aircraft during forward flight, as described elsewhere herein.

Figure 44:
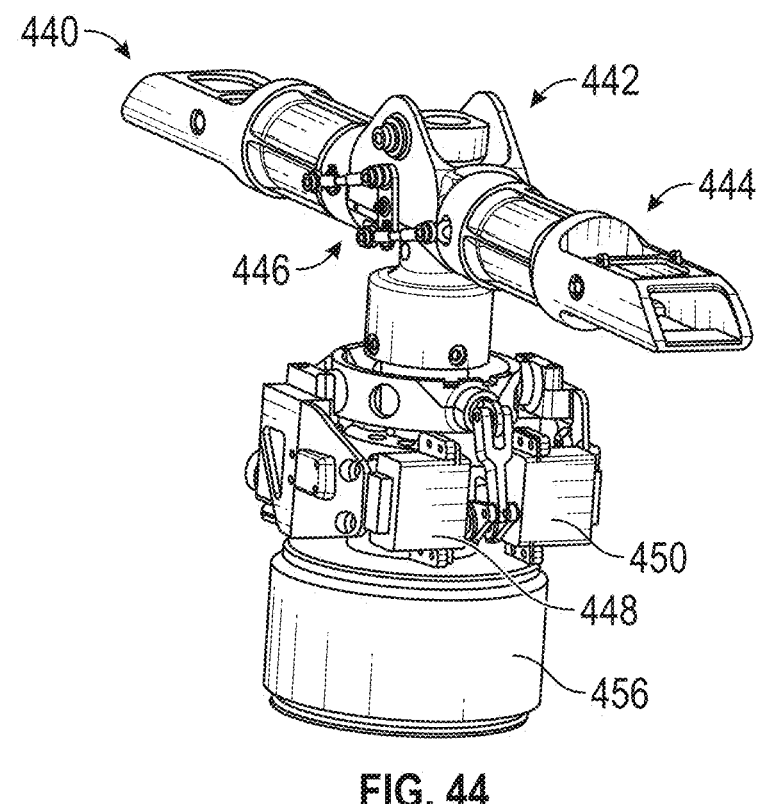
FIGS. 44 and 45 illustrate a further example configuration of a rotor head assembly in accordance with the present technology.
Figure 45:
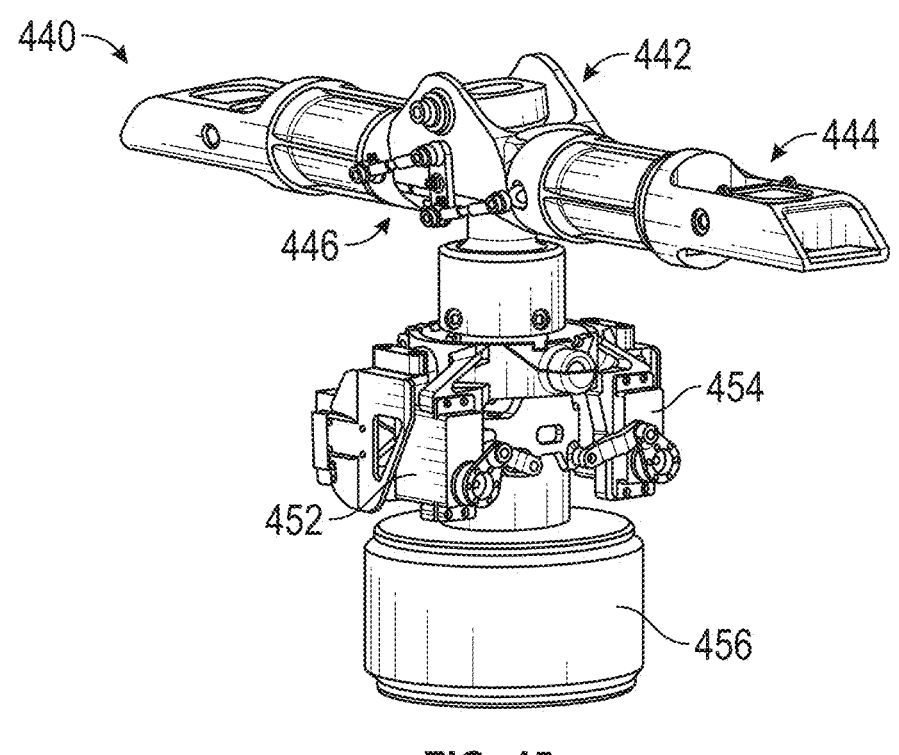

FIGS. 44 and 45 illustrate an example rotor assembly 440 in accordance with the present technology. An upper rotor hub assembly includes a central section 442 and mounting brackets 444 configured as a bayonet-type blade mounting system and configured to receive rotor blades therein, as described herein with reference to FIGS. 25 and 26. A blade pitch adjustment system 446 provides for automatic adjustment of rotor blade pitch based on rotational velocity, as described herein with reference to FIGS. 27-32. Rotor tilt servos 448, 450, 452, and 454 are provided to control fore-aft and/or lateral tilting of the upper rotor hub assembly. Thus, a motor 456 or corresponding lower rotor hub assembly may remain fixed relative to a fuselage of an aircraft (e.g., aircraft 100 as described elsewhere herein) in which the rotor assembly 440 is installed, while rotor tilt servos 448, 450, 452, 454 selectively tilt the upper rotor hub assembly and connected rotor blades to control pitch and/or roll of the aircraft. In some embodiments, the rotor assembly 440 may include only two tilt servos, for example, servos 448 and 450, with one of servos 448 and 450 oriented to control fore-aft tilting, and the other one of servos 448 and 450 oriented to control lateral tilting. Additional tilt servos 452, 454 may be included for redundancy and/or for additional stability when controlling tilt of the upper rotor hub assembly.

Referring now to FIGS. 46A-50, in some embodiments, one or more proximity sensing devices, such as hall effect sensors, can be implemented for tracking the rotational speed and/or the blade pitch status of a rotor. In some embodiments, blade pitch status detection can be implemented with a hall effect sensor in combination with a magnet disposed on a movable component of a blade pitch adjustment linkage, such that a first blade pitch status of the rotor assembly causes the magnet to trigger the hall effect sensor during rotation of the rotor assembly, while a second blade pitch status of the rotor assembly causes the magnet not to trigger the hall effect sensor during rotation of the rotor assembly. For example, in some cases the magnet can be disposed on a component of a blade pitch adjustment linkage that rotates or translates as the blade pitch adjustment linkage transitions between a zero pitch status and a positive pitch status. In such an implementation, the hall effect sensor may also be configured as an RPM detection apparatus, such that a detection of a rotor RPM by the hall effect sensor also serves as a detection that the rotor is in a first blade pitch status (e.g., zero pitch); if the hall effect sensor ceases detecting a rotor RPM (e.g., because the magnet does not come close enough to trigger the hall effect sensor during rotation), the lack of detection of a rotor RPM also serves as a detection that the rotor is in a second blade pitch status (e.g., positive pitch).

Figure 46A:
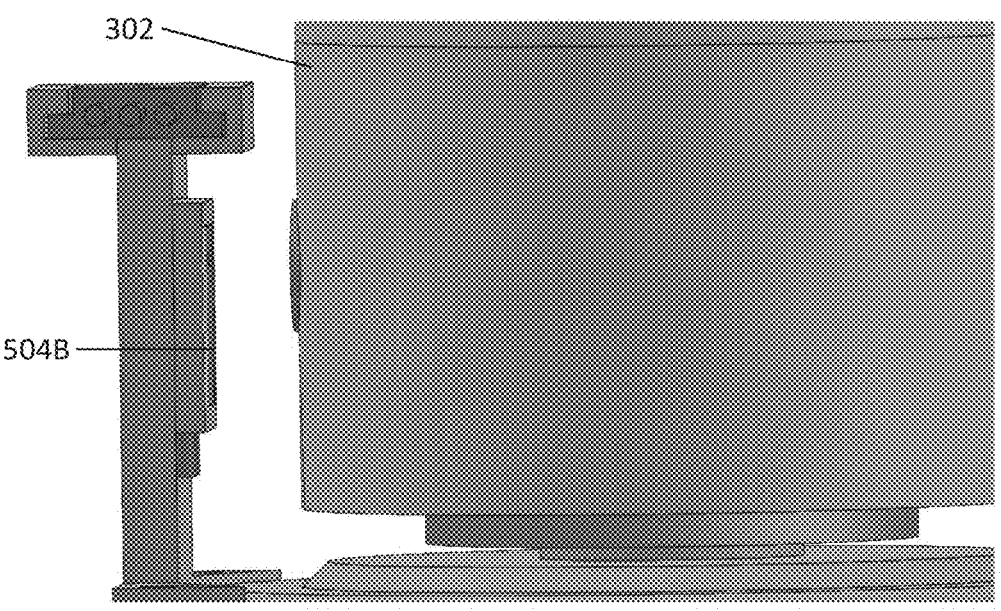
FIG. 46A and FIG. 46B depict an RPM detection hall effect sensor and magnet combination in an active detection mode and an inactive detection mode respectively.
Figure 46B:
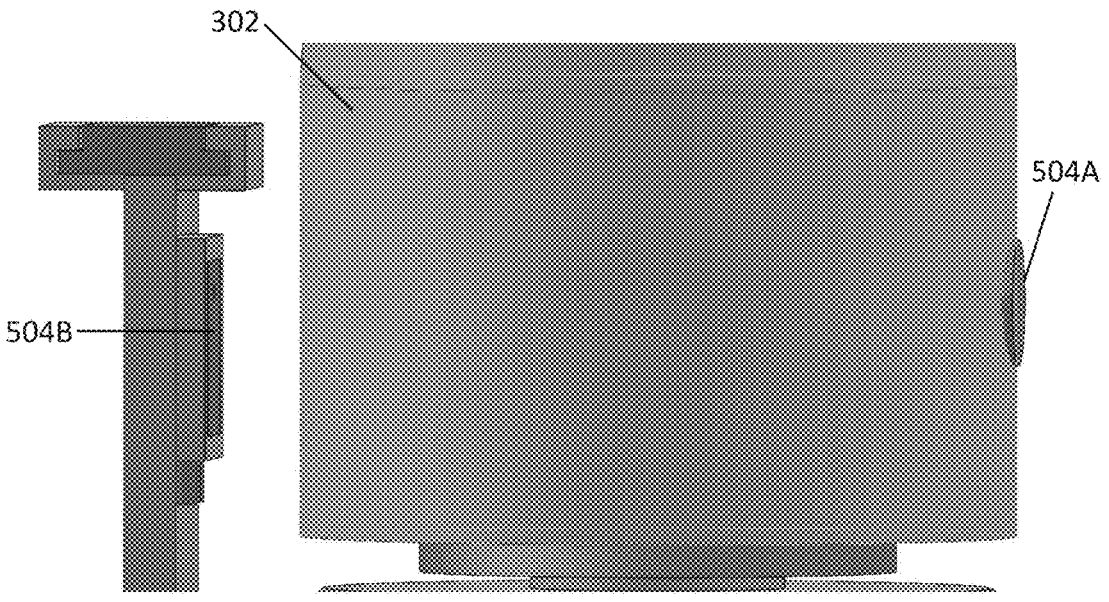
Figure 49:
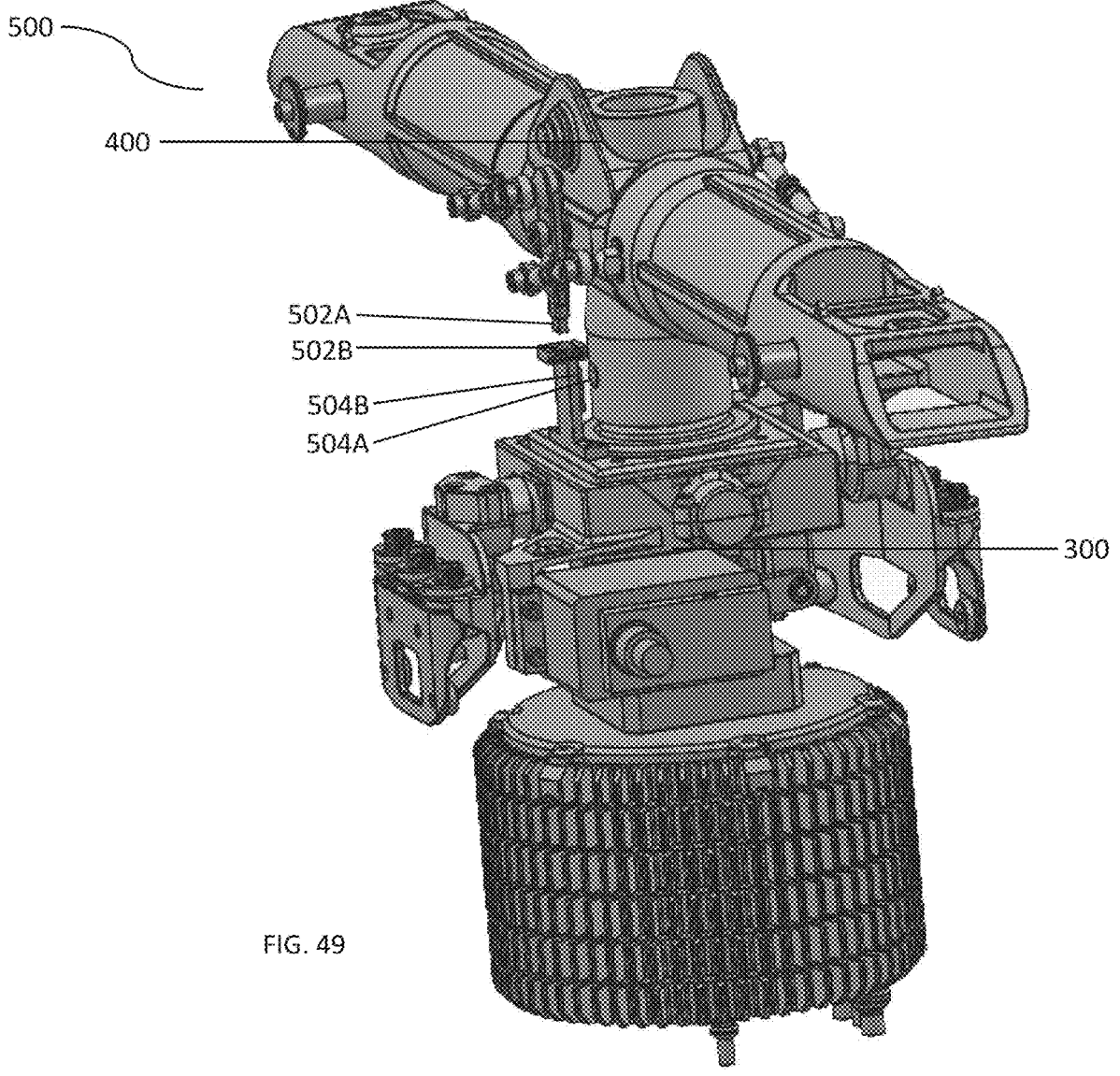
FIG. 49 depicts an isometric view of an example rotor hub assembly including the pitch detection and RPM detection hall effect sensors and magnets located thereon.
Figure 50:
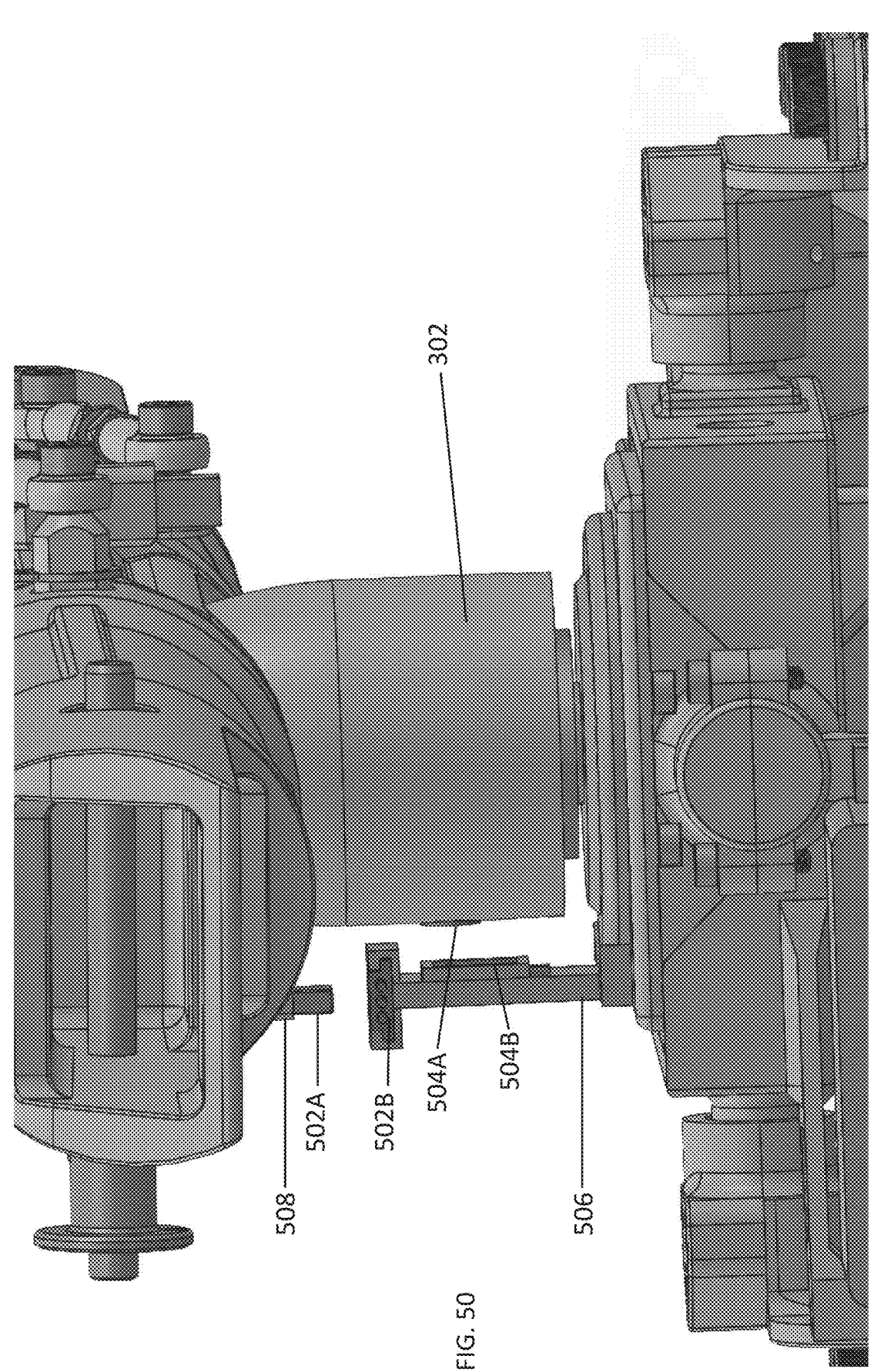
FIG. 50 depicts the pitch detection and RPM detection hall effect sensors and magnets positioned on the rotor hub assembly of FIG. 49.

FIG. 46A and FIG. 46B illustrate an example RPM detection apparatus in accordance with the present disclosure in an active detection mode and an inactive detection mode, respectively. A magnet 504A is positioned on a shaft 302 of a rotor assembly (e.g., rotor assembly 500 as shown in FIGS. 49-50). A hall effect sensor 504B is positioned such that the hall effect sensor 504B is in line with the magnet 504A and such that the hall effect sensor 504B is within a magnetic field of the magnet 504A when the magnet 504A is facing the hall effect sensor 504B (e.g., in the active detection mode shown in FIG. 46A).

The RPM detector can be in an active detection mode when the hall effect sensor 504B is within the magnetic field of the magnet 504A as shown in FIG. 46A. As the shaft 302 rotates during use (e.g., while the rotor of any of the embodiments disclosed herein is rotating under power or by autorotation), the magnet 504A accordingly rotates about the long axis of the of the shaft 302, repeatedly transitioning between the active detection mode of FIG. 46A and the inactive detection mode of FIG. 46B. Each full rotation of the magnet 504A about the axis of the shaft 302 can correspond to one complete rotation of the rotor. During rotation, the magnet 504A can be positioned with respect to the hall effect sensor 504B such that the RPM detection apparatus is in an active detection mode as shown in FIG. 46A or an inactive detection mode as shown, for example, in FIG. 46B. The RPM detection can thereby determine the rotational speed of the shaft 302 (e.g., in RPM or other suitable units) based on the number of times the RPM detection apparatus entered the active detection mode from the inactive detection mode over a period of time. For example, a number of counts recorded by processing circuitry in communication with the hall effect sensor 504B over a particular period of time (e.g., 1 second) can be normalized to a number of counts per 60-second period (e.g., by multiplying the number of counts in 1 second by 60) to determine the rotational speed of the shaft 302 in rotations per minute (RPM). Although FIGS. 46A and 46B show only one pair of a magnet 504A and a hall effect sensor 504B, the RPM detection apparatus can comprise more than one magnet 504A and/or more than one hall effect sensor 504B. It should also be appreciated that the number of magnets 504A does not need to be equal to the number of hall effect sensors 504B. For example, in some embodiments, an RPM detection apparatus can include two magnets 504A configured to be detected by one hall effect sensor 504A.

Figure 47A:
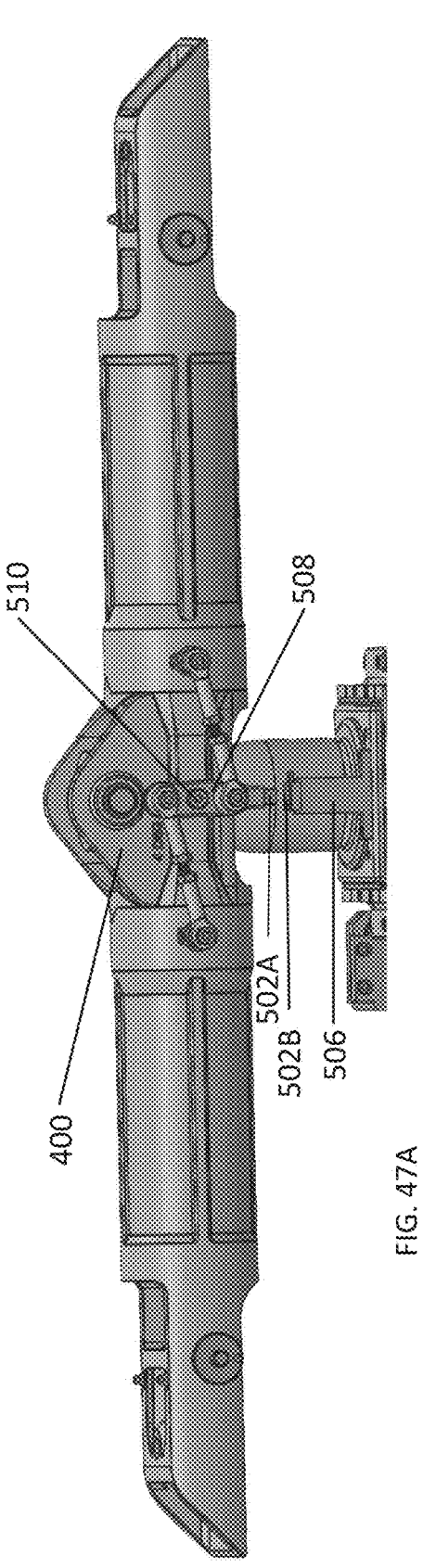
FIG. 47A and FIG. 47B depict a pitch detection hall effect sensor and magnet combination in a zero pitch configuration.
Figure 47B:
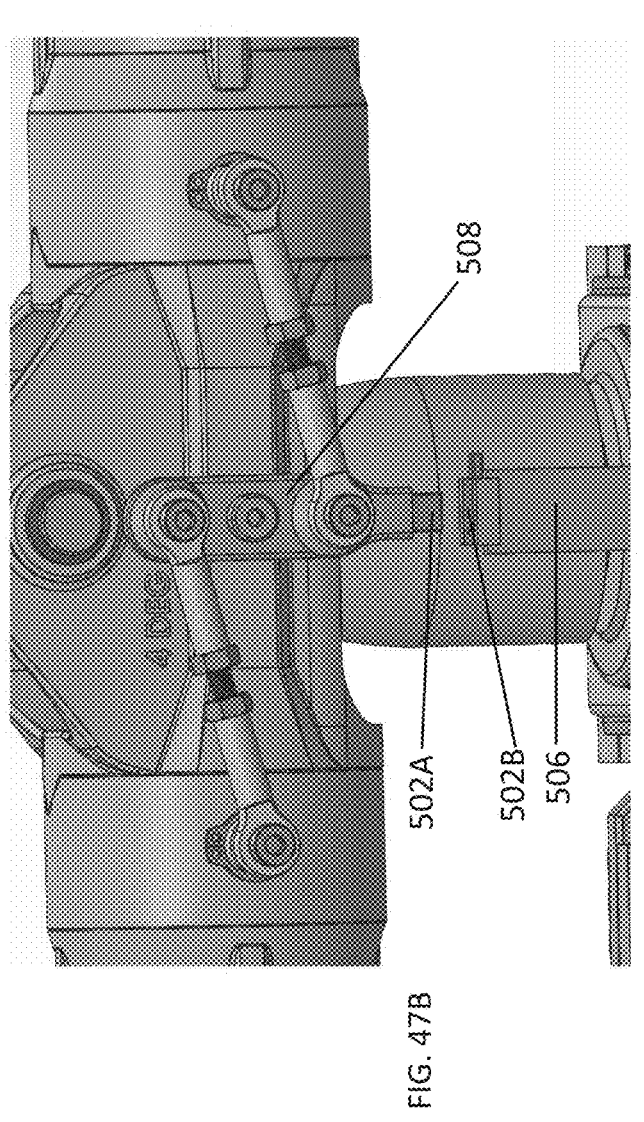
Figure 48A:
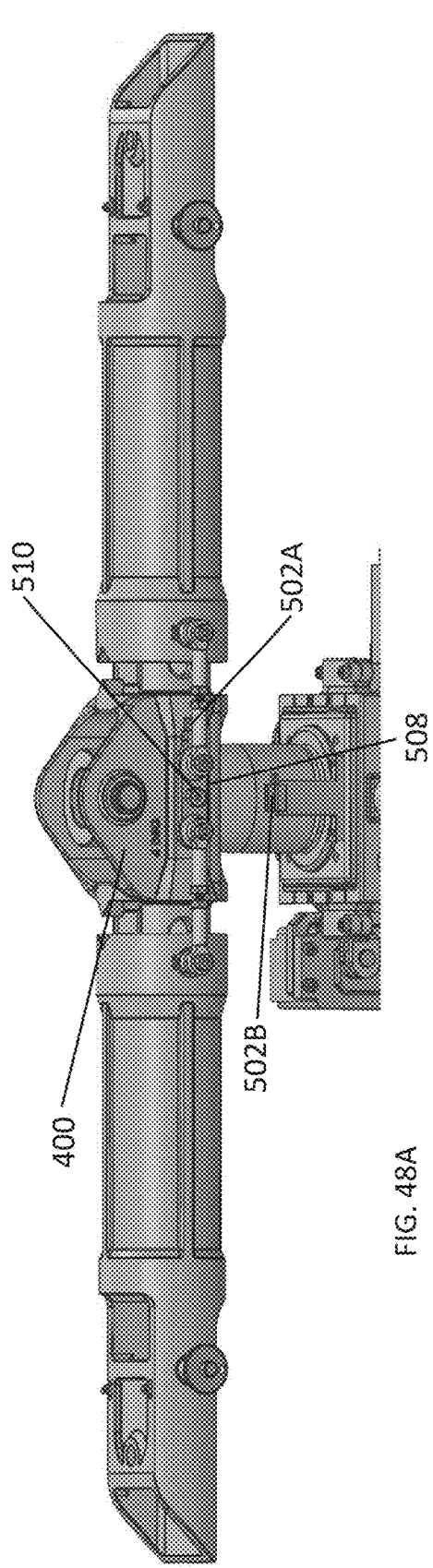
FIG. 48A and FIG. 48B depict the pitch detection hall effect sensor and magnet combination in a positive pitch configuration.
Figure 48B:
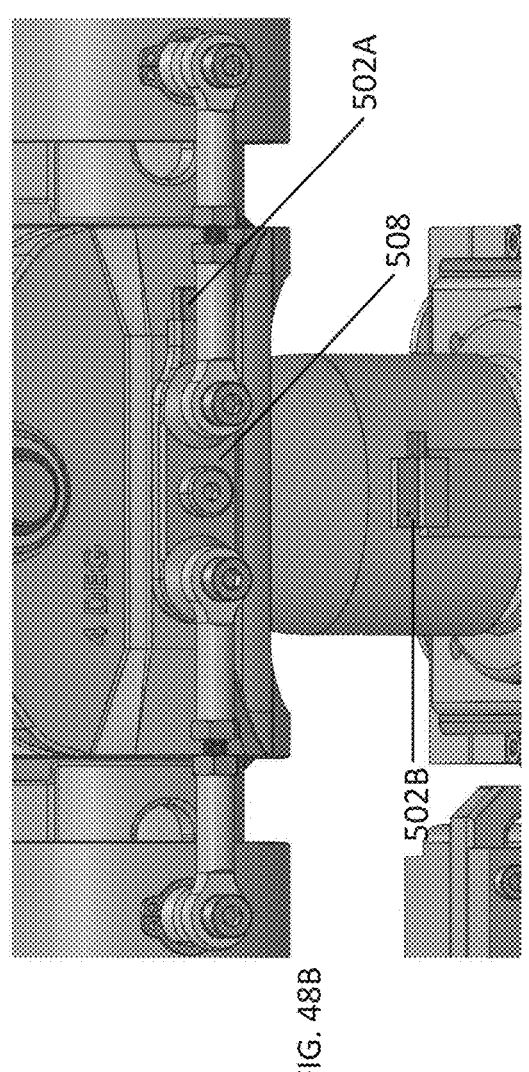

FIGS. 47A-48B illustrate an example configuration in which a hall effect sensor 502A and a magnet 502B are configured as a blade pitch detector of a rotor assembly in accordance with the present disclosure. FIGS. 47A and 47B depict the rotor assembly in a zero-pitch configuration; FIGS. 48A and 48B depict the rotor assembly in a positive pitch configuration. FIG. 47B is a zoomed in partial view of the full assembly depicted in FIG. 47A; FIG. 48B is a similarly zoomed in partial view of the full assembly depicted in FIG. 48A.

As shown in FIGS. 47A-48B, a magnet 502A can be disposed on a movable component of a blade pitch adjustment linkage. For example, the magnet 502A may be positioned on a first end of a synchronization pivot arm 508 which is coupled to the upper rotor hub assembly 400 and configured to pivot about a pivot point 510. As discussed elsewhere herein, the synchronization pivot arm 508 may be connected directly or indirectly to opposite rotor blade mounting members such that the synchronization pivot arm 508 pivots when the rotor blade mounting members move outward or inward. For example, the blade pitch adjustment linkage may be configured such that it is in a vertical position while the rotor blade mounting members and rotor blades are in a zero pitch position, and pivots to a horizontal position when the rotor blade mounting members move outward to a positive pitch position.

A corresponding hall effect sensor 502B can be positioned to be in proximity to the magnet 502A when the synchronization pivot arm 508 is vertically oriented, such as on a distal end of a hall effect sensor hub 506. While the rotor assembly 500 (see FIGS. 49-50) is in the zero pitch configuration as shown in FIG. 47A and FIG. 47B, the hall effect sensor 502B can be positioned in the magnetic field of magnet 502A which can produce a potential difference in the hall effect sensor 502B. If there is a potential difference in the hall effect sensor 502B, the hall effect sensor 502B can detect that the rotor assembly 500 is in a zero pitch configuration. While the rotor assembly is in a zero pitch configuration, the magnet 502A and hall effect sensor 502B can also function as a primary or redundant RPM detection apparatus as the magnet 502A will trigger the hall effect sensor 502B each time the upper rotor hub assembly completes a revolution.

FIG. 48A and FIG. 48B illustrate the blade pitch detector of the rotor assembly while the rotor assembly is in a positive pitch configuration. As described elsewhere herein, a biasing member, such as a gas spring, can collapse to allow the blade pitch to increase to a positive blade pitch once a threshold RPM is reached. If this happens, the outer cylinders can slide outwards which can cause the synchronization pivot arm 508 to rotate about the pivot point 510 such that the synchronization pivot arm 508 is horizontal, or parallel with the outer cylinders, as shown in FIG. 48A and FIG. 48B. Notably, in such a configuration, the magnet 502A can be positioned such that the hall effect sensor 502B is no longer be positioned in the magnetic field of magnet 502A as the magnet 502A passes the hall effect sensor 502B on each revolution or experiences a weaker magnetic field from the magnet 502A. Accordingly, in the positive pitch configuration, there may no longer be a potential difference, or there may be a significantly reduced potential difference, in the hall effect sensor 502B. If there is little to no periodic potential difference in the hall effect sensor 502B, monitoring circuitry in communication with the hall effect sensor 502B can detect that the rotor assembly is in a positive pitch configuration. For example, the monitoring circuitry may be configured to determine that the rotor assembly is in the positive pitch configuration if no signals, or a number of signals lower than a threshold, are received from the hall effect sensor 502B over a predetermined time period. Alternatively or additionally, if a second RPM sensor is present (e.g., in the two-sensor configuration shown in FIGS. 49 and 50), the monitoring circuitry in communication with both sensors may be configured to determine that the rotor assembly is in the positive pitch configuration if a discrepancy exists between the signals from the hall effect sensor 502B and the other sensor (e.g., an RPM difference greater than a predetermined threshold, or a lack of signals from the hall effect sensor 502B while the other RPM sensor continues to determine a rotational speed or to send periodic signals from its hall effect sensor). When the upper rotor hub assembly returns to a zero pitch configuration, the hall effect sensor 502B can begin to generate signals again when the synchronization pivot arm 508 returns to a vertical position such that the magnet 502A again passes in close proximity to the hall effect sensor 502B each time the upper rotor hub assembly rotates. The resumed signal can be used by the associated monitoring circuitry to determine that the blade pitch has returned to zero and/or to determine a rotational speed of the rotor.

It should be appreciated that although the present embodiment shows only one magnet 502A and one hall effect sensor 502B, the blade pitch detector can comprise more than one magnet 502A and more than one hall effect sensor 502B. It should also be appreciated that the number of magnets 502A does not need to be equal to the number of hall effect sensors

502B. For example, an embodiment of the present disclosure can have a blade pitch detector with two magnets 502A and one hall effect sensor 502B.

FIGS. 49 and 50 illustrate an example embodiment of a rotor assembly 500 implementing the RPM detector and the blade pitch detector mechanisms described herein. In some embodiments, the hall effect sensors 502B, 504B and magnets 502A, 504A can detect whether the rotor blades have a positive pitch or zero pitch and the rate at which the shaft 302, and thereby the rotor blades, are spinning.

As shown in FIG. 49, the rotor assembly has two magnets 502A, 504A and two hall effect sensors 502B, 504B. In alternative embodiments, it is possible for the rotor assembly 500 to have more than two magnets 502A, 504A and two sensors 502B, 504B or less than two magnets 502A, 504A and two sensors 502B, 504B. In some embodiments, it is possible for the rotor assembly 500 to have more magnets 502A, 504A than sensors 502B, 504B or more sensors 502B, 504B than it has magnets 502A, 504A. For example, in some embodiments, the rotor assembly may have three magnets 502A, 504A and two hall effect sensors 502B, 504B.

In the example embodiment shown in FIG. 49, magnet 502A corresponds to hall effect sensor 502B to form a blade pitch detector and magnet 504A corresponds to hall effect sensor 504B to form an RPM detector. As shown in FIG. 50, hall effect sensors 502B, 504B are arranged on a hall effect sensor hub 506 having a proximal end attached to the lower rotor hub 300 extending to a distal end. Magnet 502A corresponding to hall effect sensor 502B is positioned on a first end of a synchronization pivot arm 508. Magnet 504A corresponding to hall effect sensor 504B is positioned on the shaft 302.

As the upper rotor hub assembly 400 rotates in a zero pitch configuration, magnet 502A and magnet 504A pass by hall effect sensor 502B and hall effect sensor 504B, respectively, once during each revolution. Monitoring circuitry in communication with the hall effect sensors 502B, 504B may receive signals from each hall effect sensor when its corresponding magnet passes by. Based on the timing of the signals (e.g., a number of counts over a predetermined time period), the circuitry may determine a rotational speed of the rotor (e.g., in RPM) based on the signals received from one or both hall effect sensors. In some embodiments, magnet 502A and hall effect sensor 502B may form a primary RPM detector, and magnet 504A and hall effect sensor 504B may form a redundant or secondary RPM detector.

As the rotational speed of the upper rotor hub assembly 400 is increased, the outer cylinders of the upper rotor hub assembly 400 slide outward to transition to the positive pitch configuration when centrifugal force overcomes the inward bias of a biasing member, as described elsewhere herein. The outward motion of the outer cylinders causes the synchronization pivot arm 508 to rotate to a horizontal configuration (as shown in FIGS. 48A and 48B), such that the magnet 502A does not trigger the hall effect sensor 502B.

Advantageously, in the two-sensor configuration of FIGS. 49 and 50, magnet 504A and hall effect sensor 504B continue to function as an RPM detector regardless of the orientation of magnet 502A. Thus, the monitoring circuitry can be configured to use the signals received from hall effect sensor 504B as a primary RPM indication signal, while using the signals received from hall effect sensor 502B as a backup RPM indication signal while the rotor is in a zero pitch configuration (e.g., during forward flight as described elsewhere herein).

In some aspects, the blade pitch status sensing configurations of the present disclosure may further be configured for determination of the rotational speed at which the blade pitch transition occurs and/or to evaluate a status (e.g., an operation, wear, reliability, etc.) of the biasing members (e.g., springs or gas springs) that control the blade pitch of the rotor blades. For example, as the rotor speed increases and the rotor transitions to a positive pitch configuration, the monitoring circuitry in communication with hall effect sensor 502B can store the most recently determined rotational speed or speeds as an indicator of the rotational speed at which the blade pitch transition begins (e.g., a blade pitch transition speed). Similarly, the monitoring circuitry can store the first rotational speed or speeds determined after a transition from positive blade pitch to zero pitch as another indicator of blade pitch transition speed.

Such indications of the blade pitch transition speed may be analyzed to determine if the blade pitch adjustment mechanism is working as intended. In one example, some or all blade pitch transition speed may be compared to a predetermined intended blade pitch transition speed or blade pitch transition speed range. It may be determined that the biasing members are working as intended if an indicated blade pitch transition speed falls within the predetermined range or matches the intended transition speed (e.g., the difference between the indicated speed and the intended speed is less than a predetermined threshold). Alternatively or additionally, all or some of the indicated blade pitch transition speeds may be stored over time to determine a change, such as wear and tear affecting the operation of the biasing members. For example, it may be observed that the blade pitch transition speed decreases over time, indicating that one or both of the biasing members has worn or deteriorated such that less biasing force is produced and the blade pitch transitions from zero to positive at a lower RPM.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions, and changes in the systems and methods described herein may be made without departing from the spirit of the disclosure. The accompanying claims and their equivalents are intended to cover such forms or modifications as would fall within the scope and spirit of the disclosure. Accordingly, the scope of the present disclosure is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A rotor blade pitch detection apparatus for an aircraft, the rotor blade pitch detection apparatus comprising:
   a magnet coupled to a movable component of a blade pitch adjustment linkage for a plurality of rotor blades of a rotor of the aircraft, the movable component having a first orientation while the plurality of rotor blades are at a first blade pitch and a second orientation while the plurality of rotor blades are at a second blade pitch;
   a sensor coupled to the aircraft and configured to generate a signal in the presence of the magnet, wherein:
      when the movable component is in the first orientation, the magnet repeatedly triggers the sensor to generate the signal while the rotor is rotating, and
      when the movable component is in the second orientation, the magnet does not trigger the sensor while the rotor is rotating; and
   processing circuitry in communication with the sensor and configured to determine whether the plurality of rotor blades are at the first blade pitch or the second blade pitch based on signals received from the sensor.

2. The rotor blade pitch detection apparatus of claim 1, wherein the sensor comprises a hall effect sensor.

3. The rotor blade pitch detection apparatus of claim 1, wherein the movable component is a synchronization pivot arm configured to at least partially synchronize individual blade pitches of the plurality of rotor blades.

4. The rotor blade pitch detection apparatus of claim 1, wherein the processing circuitry is further configured to determine a rotational speed of the upper rotor hub assembly, based on the signals, while the blade pitch adjustment linkage is in the first orientation.

5. The rotor blade pitch detection apparatus of claim 4, wherein the processing circuitry is further configured to determine, based on the determined rotational speed, a pitch transition rotational speed at which the blade pitch begins to transition from the first blade pitch to the second blade pitch.

6. The rotor blade pitch detection apparatus of claim 5, wherein the processing circuitry is further configured to determine an operational status of a biasing element of the blade pitch adjustment linkage by comparing the pitch transition rotational speed to an intended transition speed, a range of intended transition speeds, or one or more previously determined pitch transitional rotational speeds.

7. The rotor blade pitch detection apparatus of claim 1, further comprising a rotational speed detection apparatus comprising:
   a second magnet coupled to a component of the rotor; and
   a second sensor in communication with the processing circuitry, the second sensor coupled to a component of the lower rotor hub assembly and configured to generate a second signal in the presence of the second magnet.

8. The rotor blade pitch detection apparatus of claim 7, wherein the component of the rotor is rotationally fixed to the rotor.

9. The rotor blade pitch detection apparatus of claim 7, wherein the second magnet repeatedly triggers the second sensor to generate the second signal while the rotor is rotating and the plurality of rotor blades are at the first blade pitch and while the rotor is rotating and the plurality of rotor blades are at the second blade pitch.

10. The rotor blade pitch detection apparatus of claim 7, wherein the processing circuitry is configured to determine that the plurality of rotor blades are at the first blade pitch in response to a similarity between a first rotational speed calculated based on the signals from the sensor and a second rotational speed calculated based on the second signals from the second sensor.

11. The rotor blade pitch detection apparatus of claim 7, wherein the processing circuitry is configured to determine that the plurality of rotor blades are at the second blade pitch in response to a discrepancy between a first rotational speed calculated based on the signals from the sensor and a second rotational speed calculated based on the second signals from the second sensor.

12. The rotor blade pitch detection apparatus of claim 1, wherein the processing circuitry is configured to determine that the plurality of rotor blades are at the first blade pitch in response to repeatedly receiving the signals from the sensor.

13. The rotor blade pitch detection apparatus of claim 1, wherein the processing circuitry is configured to determine that the plurality of rotor blades are at the second blade pitch in response to failing to receive at least a threshold number of signals from the sensor over a predetermined time period.

14. The rotor blade pitch detection apparatus of claim 1, wherein the magnet is disposed radially outward from an axis of rotation of the rotor such that the magnet moves repeatedly along a circular path while the rotor is rotating.

* * * * *